(12) United States Patent
Perez, III et al.

(10) Patent No.: US 10,373,342 B1
(45) Date of Patent: Aug. 6, 2019

(54) CONTENT GENERATION IN AN IMMERSIVE ENVIRONMENT

(71) Applicant: Lucasfilm Entertainment Company Ltd., San Francisco, CA (US)

(72) Inventors: Jose Perez, III, San Francisco, CA (US); Peter Dollar, San Francisco, CA (US); Barak Moshe, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 15/730,476

(22) Filed: Oct. 11, 2017

Related U.S. Application Data

(60) Provisional application No. 62/444,708, filed on Jan. 10, 2017.

(51) Int. Cl.
| | |
|---|---|
| *H04N 5/222* | (2006.01) |
| *G06T 7/00* | (2017.01) |
| *G06F 3/0482* | (2013.01) |
| *G06F 3/0484* | (2013.01) |
| *G06T 19/20* | (2011.01) |

(52) U.S. Cl.
CPC .............. *G06T 7/97* (2017.01); *G06F 3/0482* (2013.01); *G06F 3/04842* (2013.01); *G06T 19/20* (2013.01)

(58) Field of Classification Search
CPC ... H04N 5/222; H04N 5/2224; H04N 5/23293
USPC .......................................... 348/333.01, 333.02
See application file for complete search history.

(56) References Cited

U.S. PATENT DOCUMENTS

| | | | | |
|---|---|---|---|---|
| 8,964,052 | B1* | 2/2015 | Wooley | H04N 5/232 348/211.99 |
| 9,619,931 | B1* | 4/2017 | Klabunde | H04N 5/2224 |
| 2008/0158242 | A1* | 7/2008 | St. Jacques | H04N 1/00132 345/589 |
| 2010/0156906 | A1* | 6/2010 | Montgomery | G06T 15/205 345/427 |
| 2011/0102424 | A1* | 5/2011 | Hibbert | G06T 11/60 345/419 |
| 2013/0182225 | A1* | 7/2013 | Stout | G03B 15/10 352/48 |
| 2015/0350628 | A1* | 12/2015 | Sanders | G06T 15/08 345/419 |

* cited by examiner

*Primary Examiner* — Anthony J Daniels
(74) *Attorney, Agent, or Firm* — Kilpatrick Townsend & Stockton LLP

(57) ABSTRACT

Views of a virtual environment can be displayed on mobile devices in a real-world environment simultaneously for multiple users. The users can operate selections devices in the real-world environment that interact with objects in the virtual environment. Virtual characters and objects can be moved and manipulated using selection shapes. A graphical interface can be instantiated and rendered as part of the virtual environment. Virtual cameras and screens can also be instantiated to created storyboards, backdrops, and animated sequences of the virtual environment. These immersive experiences with the virtual environment can be used to generate content for users and for feature films.

20 Claims, 39 Drawing Sheets

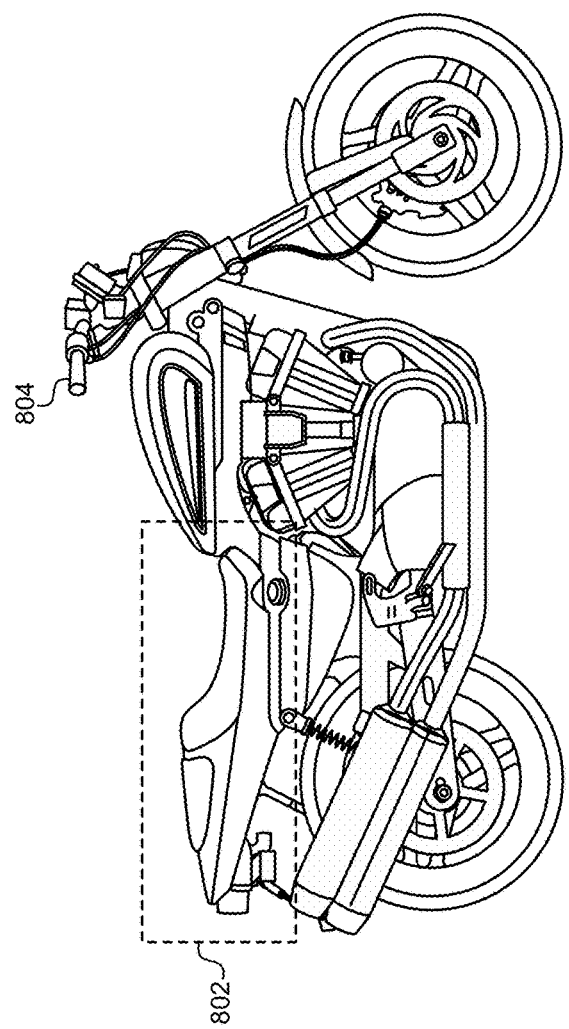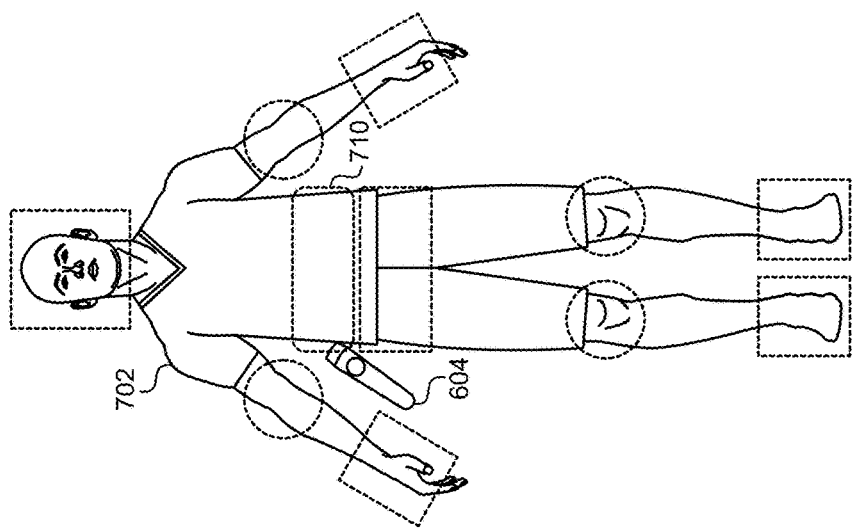
FIG. 8

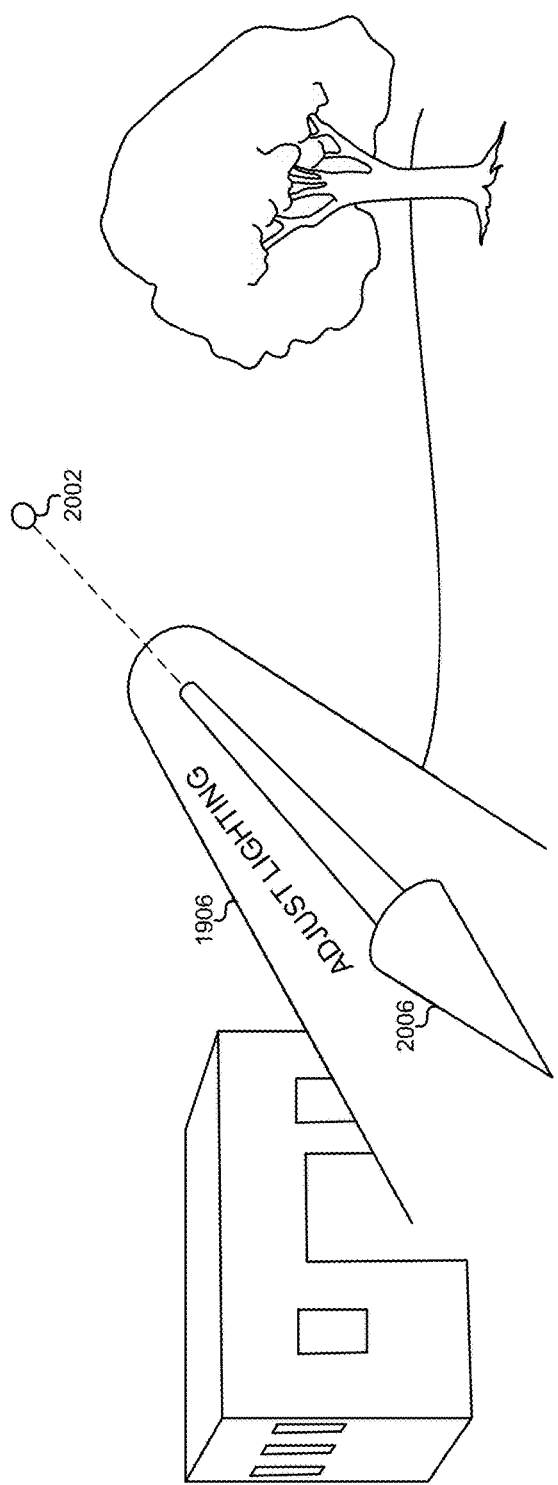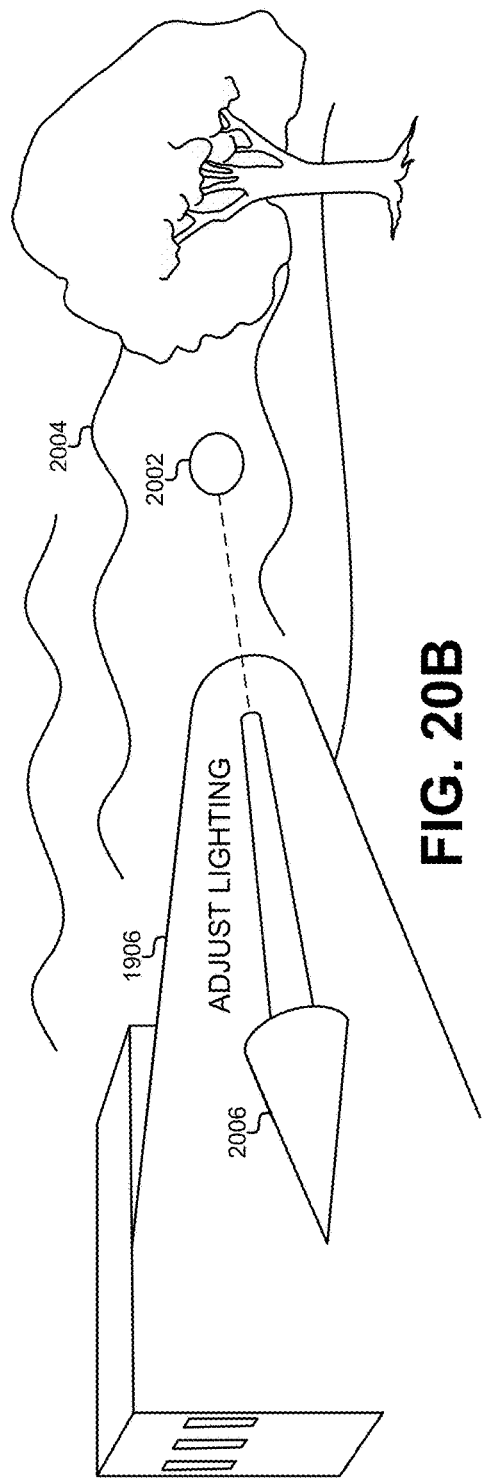

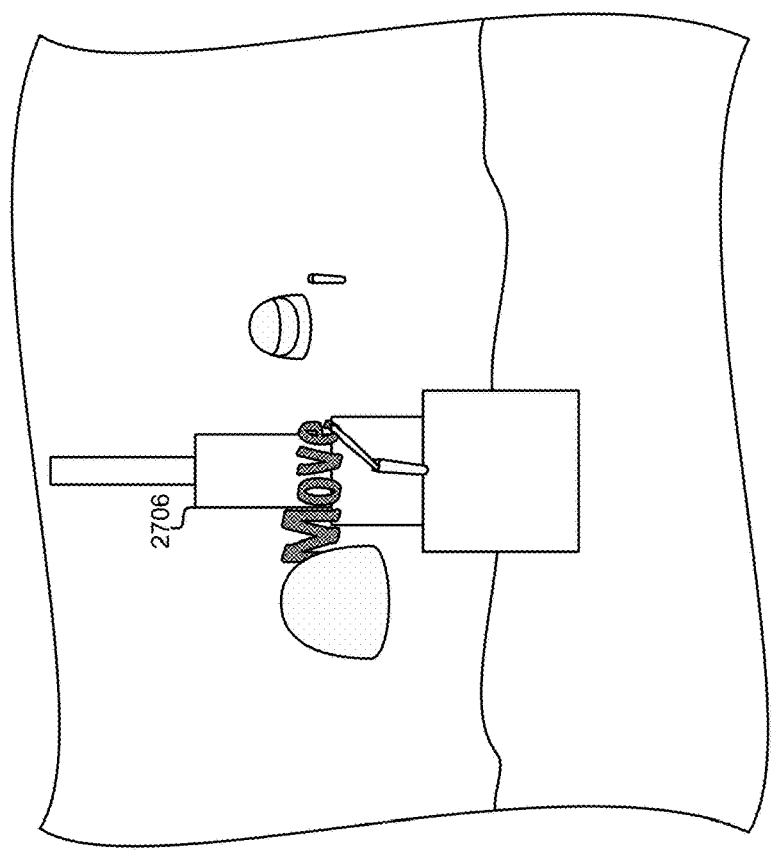
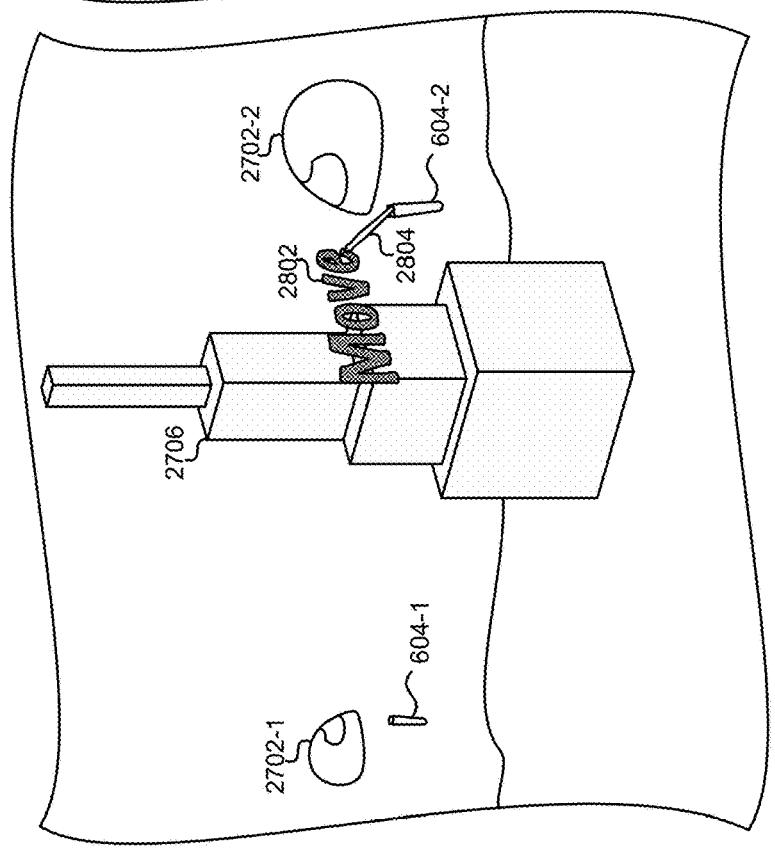
FIG. 28A
FIG. 28B

CONTENT GENERATION IN AN IMMERSIVE ENVIRONMENT

CROSS-REFERENCES TO RELATED APPLICATIONS

This application claims the benefit of the following U.S. Provisional Application:
- U.S. Provisional Application No. 62/444,708, filed on Jan. 10, 2017, entitled "MANIPULATING OBJECTS WITHIN AN IMMERSIVE ENVIRONMENT," by Dollar et al, which is incorporated herein by reference.

The following related U.S. Nonprovisional Applications are being filed on the same day as the present application:
- U.S. Nonprovisional application Ser. No. 15/730,464, filed on Oct. 11, 2017, entitled "MANIPULATING OBJECTS WITHIN AN IMMERSIVE ENVIRONMENT," by Perez et al, which is incorporated herein by reference.
- U.S. Nonprovisional application Ser. No. 15/730,469, filed on Oct. 11, 2017, entitled "VIRTUAL INTERFACES FOR MANIPULATING OBJECTS WITHIN AN IMMERSIVE ENVIRONMENT," by Perez et al, which is incorporated herein by reference.
- U.S. Nonprovisional application Ser. No. 15/730,472, filed on Oct. 11, 2017, entitled "MULTI-DEVICE INTERACTION WITH AN IMMERSIVE ENVIRONMENT," by Perez et al, which is incorporated herein by reference.

TECHNICAL FIELD

This application discloses technology related to the fields of computer animation, virtual reality environments, and digital content generation. Specifically, this application discloses technology for using a virtual reality environment to pose and animate characters during a pre-visualization phase of a content creation pipeline.

BACKGROUND

Previsualization, or "previz", is a method by which complex scenes can be visualized before the creation of digital content. Previsualization has traditionally used still photography, storyboard techniques, and hand sketches to generate a linear sequence of images or scenes that together define a plan for a later sequence of video images. Previsualization allows a director, cinematographer, or visual effects supervisor to not only visualize the way in which a scene may be recorded, but it also allows them to experiment with different staging, lighting, character movements, art direction, camera placement, recording techniques, and so forth. In real-world sets, the director can "walk the set" prior to a video shoot to get a feel for how different aspects of the scene will affect the overall recording. The director may choose to move character or scenery positions, alter lighting, change camera angles, and so forth, during the previsualization stage to minimize the chance of error during the actual filming of the scene.

Digital previsualization applies computer animation technology to the traditional previsualization procedure. Increasingly, most modern digital content includes computer animation of virtual environments in which both human and computer-generated characters may interact. Digital previsualization can be used to render digital scene content that can then be displayed on a computer display device. Some previsualization systems can even render full video sequences of computer animations that will later be used in a digital scene. However, the real-world environment in which the actual scene will be shot is still separate from the digital environment that will appear on the screen. Actors will often perform scenes in front of chroma-key backgrounds or using motion capture suits to later be inserted into a digitally rendered scene. Therefore, actors and directors alike generally do not have the opportunity to experience the scene within the digital environment.

BRIEF SUMMARY

This application discloses technology related to the fields of computer animation. In some embodiments, a method may include causing a virtual environment to be displayed on a display of a mobile device in a real-world environment, and receiving inputs from a selection device to use one or more virtual cameras in the virtual environment. The method may also include capturing a plurality of images from the one or more virtual cameras in the virtual environment. The method may additionally include displaying the plurality of images on a storyboard display defining a scene that is based on the virtual environment. The method may further include generating a video sequence based on the plurality of images.

In some embodiments a system may include one or more processors and one or more memories comprising instructions that, when executed by the one or more processors, cause the one or more processors to perform operations including causing a virtual environment to be displayed on a display of a mobile device in a real-world environment. The operations may also include receiving inputs from a selection device to use one or more virtual cameras in the virtual environment. The operations may additionally include capturing a plurality of images from the one or more virtual cameras in the virtual environment. The operations may additionally include displaying the plurality of images on a storyboard display defining a scene that is based on the virtual environment. The operations may further include generating a video sequence based on the plurality of images.

In some embodiments a non-transitory computer-readable medium may include instructions that, when executed by one or more processors, cause the one or more processors to perform operations including causing a virtual environment to be displayed on a display of a mobile device in a real-world environment. The operations may also include receiving inputs from a selection device to use one or more virtual cameras in the virtual environment. The operations may additionally include capturing a plurality of images from the one or more virtual cameras in the virtual environment. The operations may additionally include displaying the plurality of images on a storyboard display defining a scene that is based on the virtual environment. The operations may further include generating a video sequence based on the plurality of images.

In any embodiments, any of the following features may be included in any combination and without limitation. The one or more virtual cameras may include a plurality of virtual cameras at different locations in the virtual environment. Each of the plurality of virtual cameras may be different from virtual cameras that capture a view displayed on the mobile device. The method/operations may also include adding a virtual screen as a rendered object in the virtual environment. The virtual screen may display a view captured from the one or more virtual cameras in real-time. The virtual screen may display a static image that is loaded from outside of the virtual environment. The virtual screen may display a video sequence that is loaded from outside of the virtual environment. The inputs to use the one or more virtual cameras in the virtual environment may include inputs that cause change a focal length of at least one of the one or more virtual cameras. At least one of the one or more virtual cameras may be displayed in the virtual environment as a screen that plays a view captured by the at least one of the one or more virtual cameras. The virtual environment may be a model of a real-world set. The virtual environment may be generated by scanning the real-world set. Generating the video sequence based on the plurality of images may include filming a scene in the real-world environment. Generating the video sequence based on the plurality of images may include rendering a scene from the virtual environment. The method/operations may also include receiving an input that adjusts a sunlight source in the virtual environment. Adjusting the sunlight source may also include adjusting a position of the sunlight source in a sky of the virtual environment. The one or more virtual cameras may include a plurality of virtual cameras at different locations in the virtual environment, where each of the plurality of virtual cameras may be different from virtual cameras that capture a view displayed on the mobile device. The method/operations may additionally include adding a virtual screen as a rendered object in the virtual environment, where the virtual screen may display a view captured from the one or more virtual cameras in real-time. At least one of the one or more virtual cameras may be displayed in the virtual environment as a screen that plays a view captured by the at least one of the one or more virtual cameras.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 8 illustrates a view of a virtual scene that includes the character and a motorcycle 804, according to some embodiments.

FIG. 20A illustrates how the position control can be used to adjust the position of a sunlight source in the sky of the virtual environment, according to some embodiments.

FIG. 20B illustrates how the sunlight source can be adjusted using the position control, according to some embodiments.

FIG. 28A illustrates how a markup control can be used to communicate between multiple users and markup a virtual scene, according to some embodiments.

FIG. 28B illustrates the text object resulting from the markup control from a different perspective.

DETAILED DESCRIPTION

Described herein, are embodiments for interacting with digital content in an immersive environment. Some embodiments may be directed specifically to techniques for generating digital content (e.g., a feature film). Other embodiments may be more generally directed to immersive experiences for users, moviegoers, directors, actors, and so forth. These embodiments allow a user to enter a digital scene using a mobile device, such as a tablet computer, virtual reality goggles, augmented reality displays, and so forth. While in the digital scene, the user can manipulate content, scenery, characters, lighting effects, and any other aspects of the scene. These interactions can be done through a user interface that includes menu items that can be inserted as computer-generated objects in the virtual scene. Some virtual scenes may also include virtual cameras, virtual display screens, storyboard elements, and bookmarks that allow a user to construct a storyboard that may later define a rendered video sequence. Some embodiments also allow multiple users to interact in real-time (e.g., at interactive frame rates) in the immersive environment to alter and/or author digital content within the virtual scene. These features allow users to design and create digital content, interact with digital content in real-time, and plan every aspect of a virtual scene prior to rendering.

Figure 1:
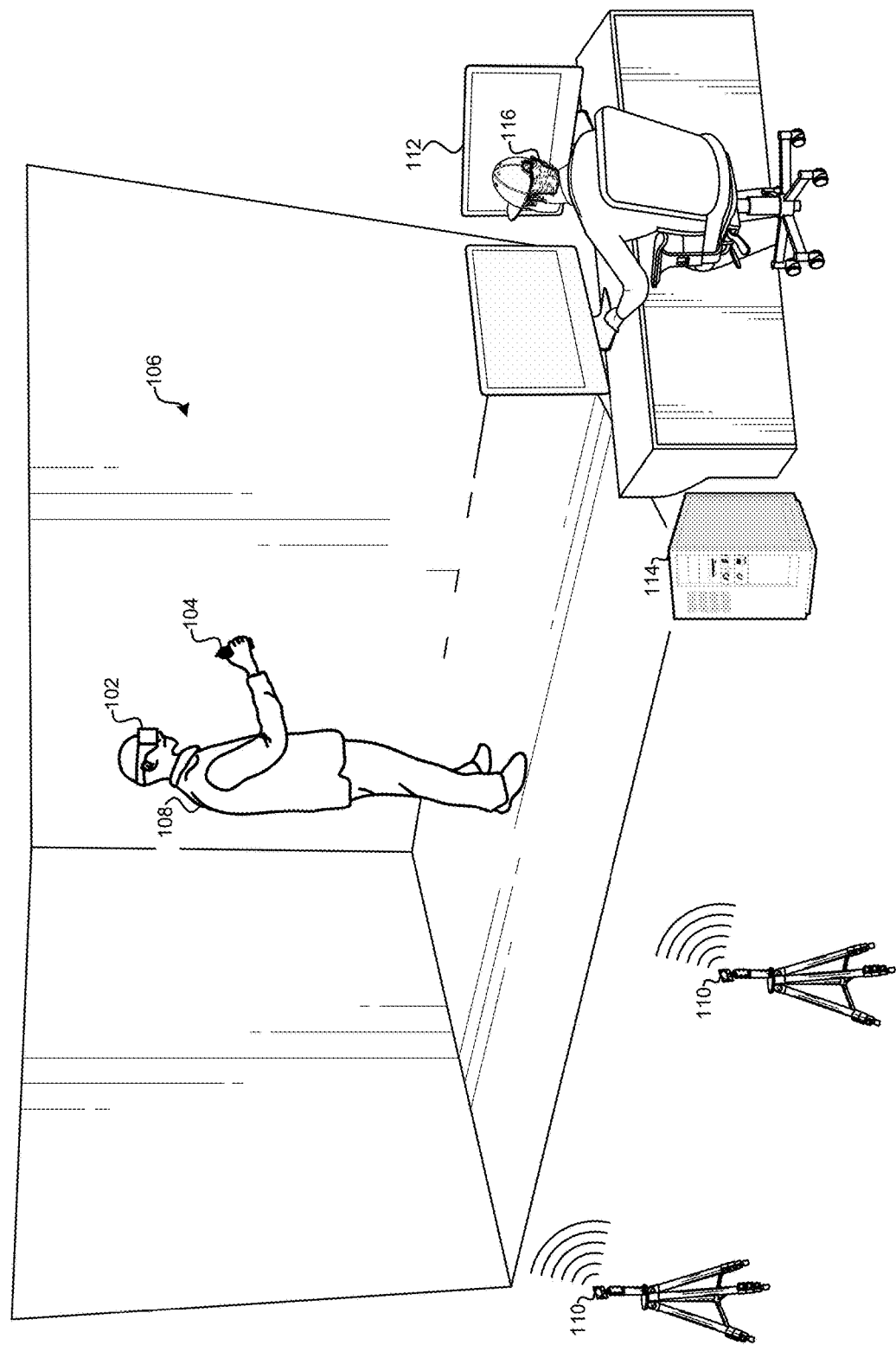
FIG. 1 illustrates an example of an immersive environment where a user can experience a virtual environment, according to some embodiments.

FIG. 1 illustrates an example of an immersive environment 106 where a user 108 can experience a virtual environment, according to some embodiments. The immersive environment 106 may be any real-world room or area in which a user can freely move to experience digital content. The system may include a first mobile device 102 that includes at least an electronic display. The first mobile device 102 may include virtual reality (VR) goggles, as depicted in FIG. 1, as well as augmented reality (AR) glasses or displays, a tablet computer, a smart phone, or any other device with an electronic display. The immersive environment 106 need not require any special equipment or display in itself. Instead, the user 108 may use the first mobile device 102 to view digital content from a rendered virtual scene. By looking through the first mobile device 102 in the immersive environment 106, the user 108 can view rendered elements of the virtual scene on the electronic display of the first mobile device 102 instead of viewing the immersive environment 106. For example, when looking through a pair of VR goggles, a display of the virtual environment may occupy the entire view of the user 108 such that the immersive environment 106 is not visible. When using AR glasses, elements of the virtual scene may be superimposed with visible elements of the immersive environment 106. When using a tablet computer or smartphone as the first mobile device 102, the user 108 may view the virtual scene using the electronic display of the tablet computer or smartphone as a "window" into the virtual scene. As the user 108 pans the tablet computer or smartphone around the immersive environment 106, first mobile device 102 may display elements of the virtual scene from a perspective of a virtual camera in the virtual scene that moves in the virtual scene in a way that corresponds to movements of the first mobile device 102 in the immersive environment 106.

The system may also include a selection device 104 that may be physically manipulated by the user 108 in the immersive environment 106 in order to interact with digital content in the virtual environment. The selection device 104 may be implemented as a control on the first mobile device 102. For example, the first mobile device 102 may include a control pad, a track wheel, one or more buttons, a touch screen display, etc., that may be used as the selection device 104. In other embodiments, the selection device 104 may be a physically separate device from the first mobile device 102. In the embodiment of FIG. 1, the selection device 102 comprises a handheld device that may be moved and/or manipulated independent of the first mobile device 102. The handheld device of FIG. 1 may include various input and/or output controls, such as buttons, triggers, track wheels, touch-sensitive devices, and so forth.

The system may also include a location determination system. The location determination system may be implemented in different ways depending on the type of the first mobile device 102. Generally, the location determination system may be configured to locate a position and/or orientation of elements of the immersive environment 106, including the first mobile device 102, the selection device 104, and/or the user 108. In the embodiment of FIG. 1, the location determination system includes one or more radio-frequency transmitters/receivers 110 that are able to triangulate the location of the first mobile device 102 and/or the selection device 104. In other embodiments, the location determination system may use other techniques to determine the location of elements of the immersive environment 106. For example, some embodiments of the first mobile device 102 and/or the selection device 104 may include on-board accelerometers, gyroscopes, compasses, and/or the like, such that the first mobile device 102 and/or the selection device 104 can independently determine their own sensed movements. This information may be transmitted to a computing system that can then follow the position and/or orientation of each electronic device in the immersive environment 106. Some embodiments may also include motion-capture technology where a plurality of motion-capture cameras are distributed about the immersive environment 106. These motion-capture cameras can follow visual fiducials that are applied to elements of the immersive environment 106. Some embodiments may also determine the location of portions of the user 108. For example, the user may be dressed in a motion capture suit with one or more visual fiducials visible to the motion-capture cameras. In some embodiments, the user may be outfitted with one or more radio-frequency identification (RFID) tags that can be used to identify the location and/or orientation of parts of the user 108, such as the user's head, the user's hands, and so forth. The location determination system may determine a location/orientation of each element of the immersive environment 106 independently and in real time.

The system may also include a rendering system 114 capable of rendering content of the virtual scene in real-time at interactive frame rates, such as 10 frames per second, 15 frames per second, 20 frames per second, 30 frames per second, and/or the like. The rendering system 114 may include a database of digital content that may be included in the virtual scene. The digital content may include animated character models, scenery, buildings, vehicles, light sources, visual effects, and so forth. As described above, the location determination system can determine a location for each element of the immersive environment 106 in real-time. The rendering system 114 can receive the location/orientation information from the location determination system and use that information to render the virtual scene. For example, the location of the first mobile device 102 can be used to determine a location for a virtual camera perspective in the virtual scene. As the first mobile device 102 moves about the immersive environment 106, the location/orientation of the virtual camera in the virtual scene can change accordingly. When the first mobile device 102 comprises a pair of goggles/glasses, the location of the goggles/glasses can be used as the location of the virtual camera in the virtual scene. In other embodiments where the first mobile device 102 comprises a handheld screen, such as a tablet computer, the location of the tablet computer can be used as the focal plane of the virtual camera, and the location of the head of the user 108 can be used as the location of the virtual camera.

The rendering system 114 can render views of the virtual scene from the perspective of the first mobile device 102 and/or the user 108 and transmit those rendered images back to the first mobile device 102 for display. This provides an interactive experience for the user 108. As the user 108 moves about the immersive environment and/or moves the first mobile device 102 these changes can be rendered in real-time by the rendering system to display updated images on the first mobile device 102. Thus, digital content, characters, scenery, and so forth, can be visible to the user 108 through the electronic display of the first mobile device 102 in real time as part of an immersive experience.

In addition to rendering the virtual scene according to the location/orientation of the user 108 and/or mobile device 102, the rendering system 114 can also receive inputs from the selection device 104 and update elements of the virtual scene in real-time in response. As will be described in greater detail below, the user 108 can use the selection device 104 to select, add, rotate, adjust, move, color, delete, scale, and/or otherwise manipulate various elements of the virtual scene. For example, the location determination system can determine when movements of the selection device 104 in the immersive environment 106 correspond to movements of a virtual representation of the selection device 104 in the virtual environment that would interact with other elements of the virtual environment. Pressing a button or pulling a trigger on the selection device 104 in the immersive environment 106 may then correspond to an action, such as a selection, addition, deletion, etc., in the virtual environment. Additionally, the selection device 104 can be used to generate user interface objects in the virtual environment, to interact with other users in the virtual environment, and/or generate digital scene representations, such as video screens, still pictures, bookmarks, storyboards, etc., that may be used to create digital content.

Some embodiments may also include a workstation 112 where a second user 116 can view and interact with the virtual scene. Some embodiments of the workstation 112 may include multiple electronic displays. A first electronic display may provide a view of the virtual scene from the perspective of a virtual camera. Instead of being moved based on the movements of the second user 116 and/or any other electronic devices, this virtual camera can be moved based on control inputs from the second user 116 through the workstation 112. For example, the second user 116 may use a joystick, keyboard, video game controller, mouse, etc., to move the virtual camera throughout the virtual scene. Thus, the second user 116 can view the virtual scene from different perspectives by manually controlling the location of a corresponding virtual camera. Similarly, the second user 116 can use their input device to interact with objects in the virtual scene in the same way that the user 108 uses the selection device 104.

Workstation 112 may also include an additional electronic display that presents the second user 112 with alternate views of the virtual scene. For example, some embodiments may use other virtual camera locations that are distributed throughout the virtual scene. The workstation 112 may then cycle through various views provided by these additional virtual cameras in response to inputs provided from the second user 112. In some embodiment, the workstation 112 may display a "god's eye" view of the virtual scene using a virtual camera positioned above all of the elements of the virtual scene oriented in a downward position. This allows the second user 116 to observe all elements of the virtual scene at once as the user 108 interacts with various elements of the virtual scene.

Figure 2:
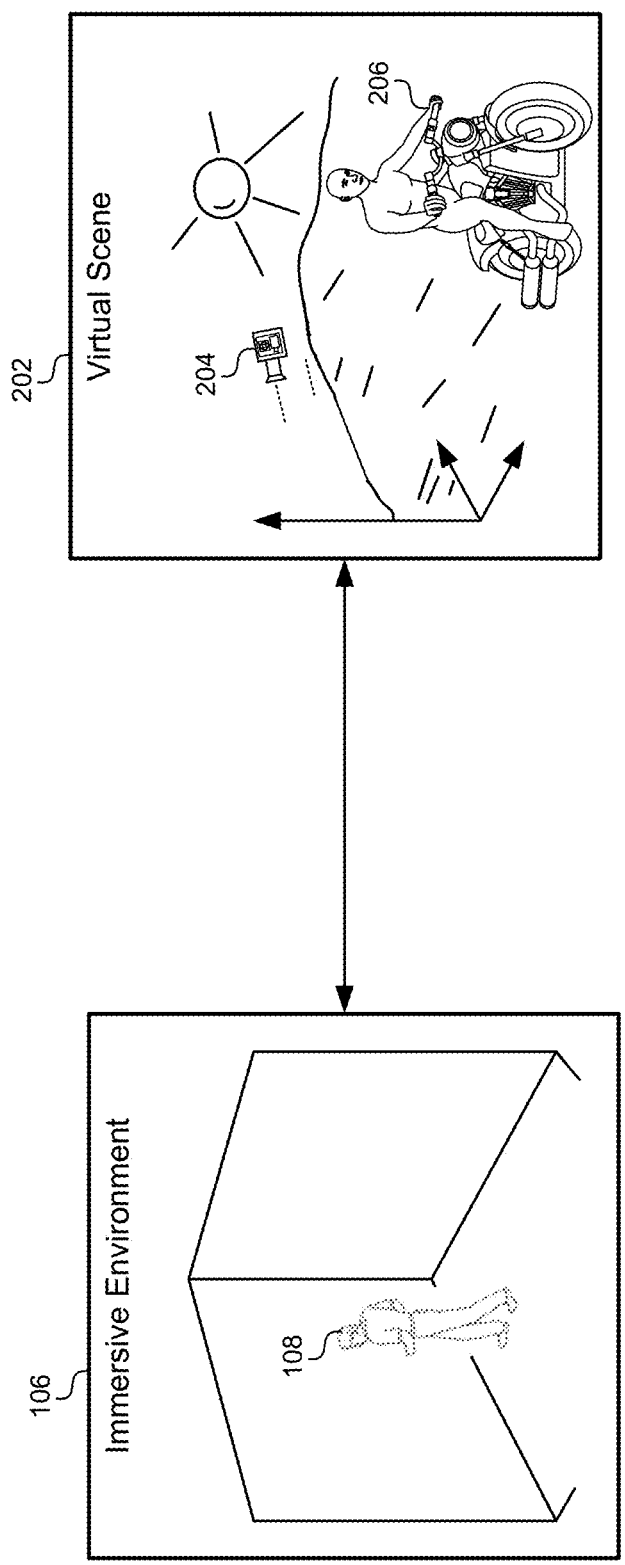
FIG. 2 illustrates a translation of the immersive environment in the real world into a corresponding virtual scene in the rendering system, according to some embodiments.

FIG. 2 illustrates a translation of the immersive environment 106 in the real world into a corresponding virtual scene 112 in the rendering system 114, according to some embodiments. The user 108 stands facing to the left in the immersive environment 106. In this embodiment, the user 108 may be wearing a pair of VR goggles as the first mobile device 102. In the virtual scene 202, a virtual camera 204 may be generated at a location corresponding to the orientation and location of the head of the user 108 in the immersive environment 106. As the user 108 moves their head in the immersive environment 106, the virtual camera 204 can move in a corresponding fashion in the virtual scene 202.

Although the immersive environment 106 may be clear of any scenery, props, or other objects that may create an obstacle for the movement of the user 108, the virtual scene 202 is not so restricted. Instead, the virtual scene 202 may include scenery, light sources, objects, and characters with which the user 108 can interact through the first mobile device 102 and/or selection device 104. For example, FIG. 2 includes a computer-generated imagery (CGI) character 206 on a CGI motorcycle. As will be described in detail below, the CGI character 206 may include visual elements that allow the user 108 to interact with the CGI character 206 using inputs received through the selection device 104.

Figure 3:
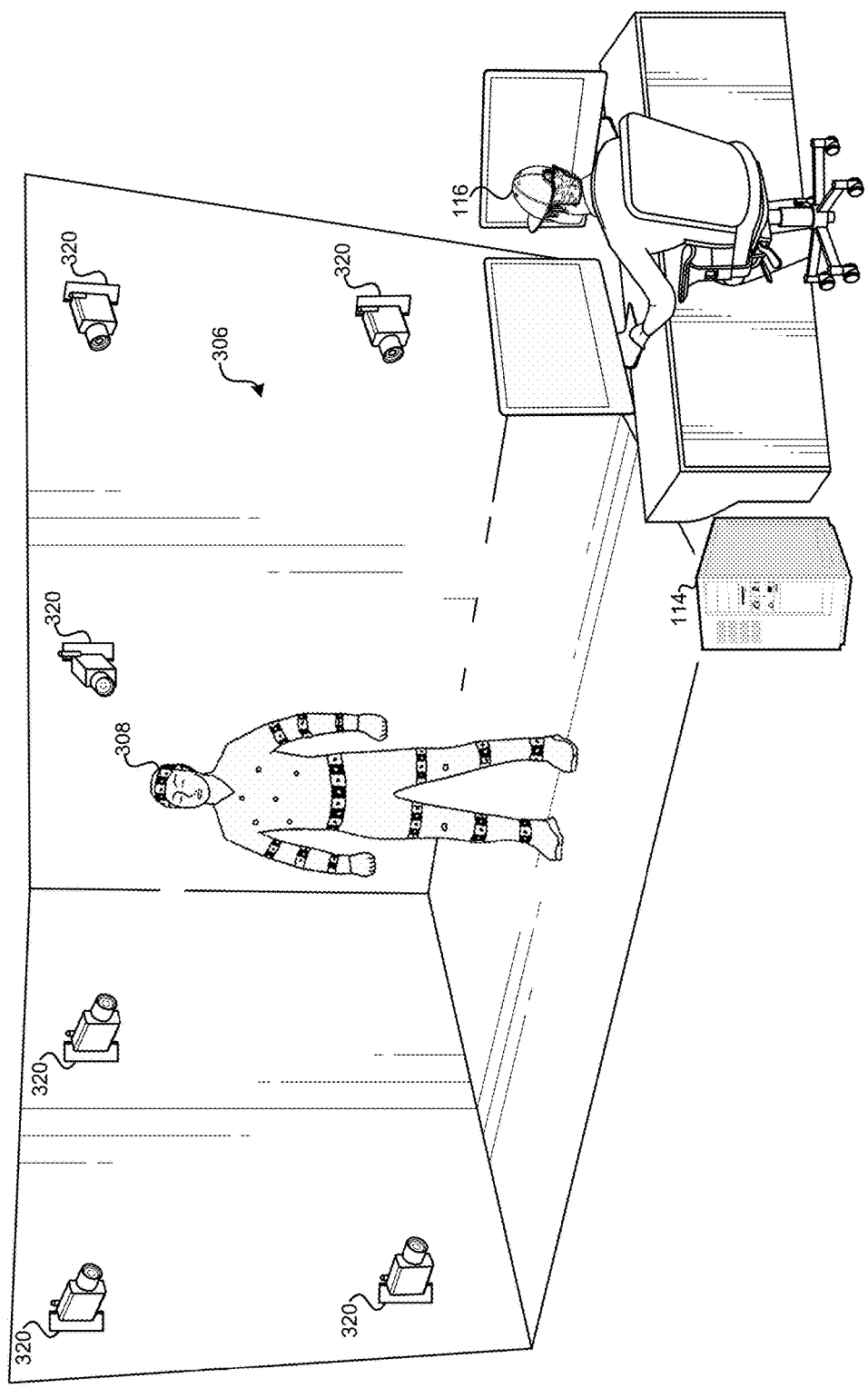
FIG. 3 illustrates another embodiment of an immersive environment using a motion-capture system, according to some embodiments.

FIG. 3 illustrates another embodiment of an immersive environment 306 using a motion-capture system, according to some embodiments. The user 308 may be outfitted with a motion-capture suit that includes one or more visual fiducials that can be identified by a plurality of motion-capture cameras 320. The motion-capture cameras 320 can be distributed around the immersive environment 306 to determine the location of the user 308. In some embodiments, the user 308 may also wear/use a first mobile device 102 as depicted in FIG. 1. In the embodiment of FIG. 3, the user 308 is not using a first mobile device 102, but may instead act/move in a predetermined fashion. In some embodiments, a display device, such as a computer monitor may be visible to the user 308 that provides a view of the virtual scene so that the user 308 can coordinate their movements to interact with elements in the virtual scene. For example, the location determination system may use the plurality of motion-capture cameras 322 generate motion vectors that drive the motion of a corresponding CGI character in the virtual scene. The user 308 may be provided with visual/audio representations of the virtual scene such that they can perform in a manner that works within the virtual scene.

In some embodiments, the immersive environment 106 of FIG. 1 and the immersive environment 306 of FIG. 3 may correspond to the same virtual scene. Thus, the user 108 can interact with the virtual scene using the first mobile device 102, and the user 308 can drive a CGI character in the virtual scene simultaneously. Thus, user 108 can see/interact with a CGI character driven by user 308 in real time. In some embodiments, the immersive environment 106 of FIG. 1 and the immersive environment 306 of FIG. 3 can be combined into the same physical environment, such that the user 108 and user 308 are in the same immersive environment with the motion-capture cameras 320. In other embodiments, the immersive environment 106 of FIG. 1 and the immersive environment 306 of FIG. 3 can be in separate facilities and separated by great distances. For example, the immersive environment 106 may be located in a first building, and the immersive environment 108 may be located in a second building. Thus, multiple users can interact with the same virtual scene in real-time without requiring the users to be co-located physically.

Figure 4:
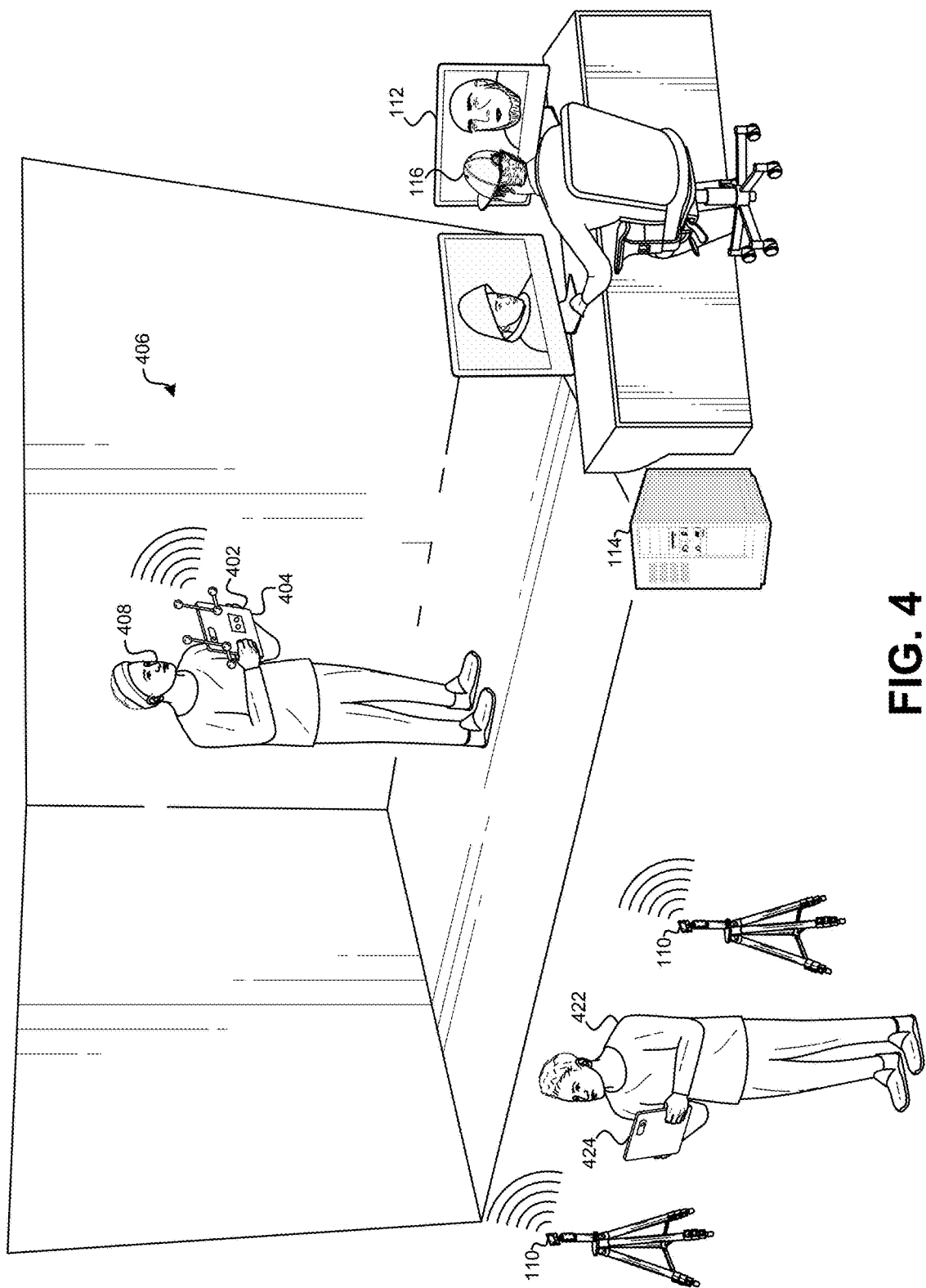
FIG. 4 illustrates another embodiment of the immersive environment to facilitate interactions between multiple users.

FIG. 4 illustrates another embodiment of the immersive environment 406 to facilitate interactions between multiple users. In some embodiments, multiple users can interact with a single virtual scene simultaneously using their own mobile devices. For example, FIG. 4 illustrates a user 408 in the immersive environment 406 using a mobile device 402 in the form of a tablet computer. When a tablet computer is used, the tablet computer may serve as both the mobile device 402 with the electronic display, as well as the selection device 404 for selecting objects in the virtual scene. For example, the display of the tablet computer can provide a "window" into the virtual scene, and the touchscreen and/or other input controls on the tablet computer can be used to select and manipulate content in the virtual scene. The location of the tablet computer can be determined electronically using radio-frequency identifier (RFID) tags, visually using visual fiducials attached to the tablet computer (illustrated in FIG. 4), and/or internally using accelerometers, gyroscopes, compasses, GPS units, etc. The user 408 may also optionally wear a sensor on their head that can be used to determine the location of the head of the user 408 by the location determination system.

Additionally, other users, such as user 422 may also interact with the virtual scene simultaneously. Note that user 422 can interact with the virtual scene outside of the immersive environment 406. User 422 may also use mobile device 424 in the form of a tablet computer. In addition to user 408 and user 422, user 416 can also view or interact with the same virtual scene through the workstation 112. For example, user 116 can see virtual representations of user 408 and user 422 on the workstation 112 in the virtual scene. Note that these virtual representations are different from the physical appearance of user 408 and user 422. In the virtual scene, these users can take any virtual form, such as a CGI character, and so forth. As described above, the workstation can be configured to view the virtual scene from any angle by moving the virtual camera associated with the workstation 112 throughout the virtual scene. Furthermore, the immersive environment 106 of FIG. 1 and the immersive environment 306 of FIG. 3 may also be linked to the same virtual scene as that of immersive environment 406. Thus, the same virtual scene may be linked to many different users, in many different environments, with each user accessing the virtual environment through different mobile devices and/or selection devices.

It should be appreciated that additional components of the representative system may be added in any combination and without limitation. Additionally, certain components (e.g., the motion-capture system) may not necessarily be required by the system. Components may also be combined (e.g., the motion capture system and the rendering system) into single hardware/software packages. In one embodiment, each of the components in the system may be connected over a wired or wireless connection. In one embodiment, the components may be connected over the Internet or a local Intranet. Some components described above may be implemented using some hardware/software systems that are commercially available. For example, virtual reality systems, such as the VIVE® system, may include a VR headset that may serve as the first mobile device, one or more controllers that may serve as the one or more selection devices, and one or more base stations that may serve as the location determination system.

Figure 5:
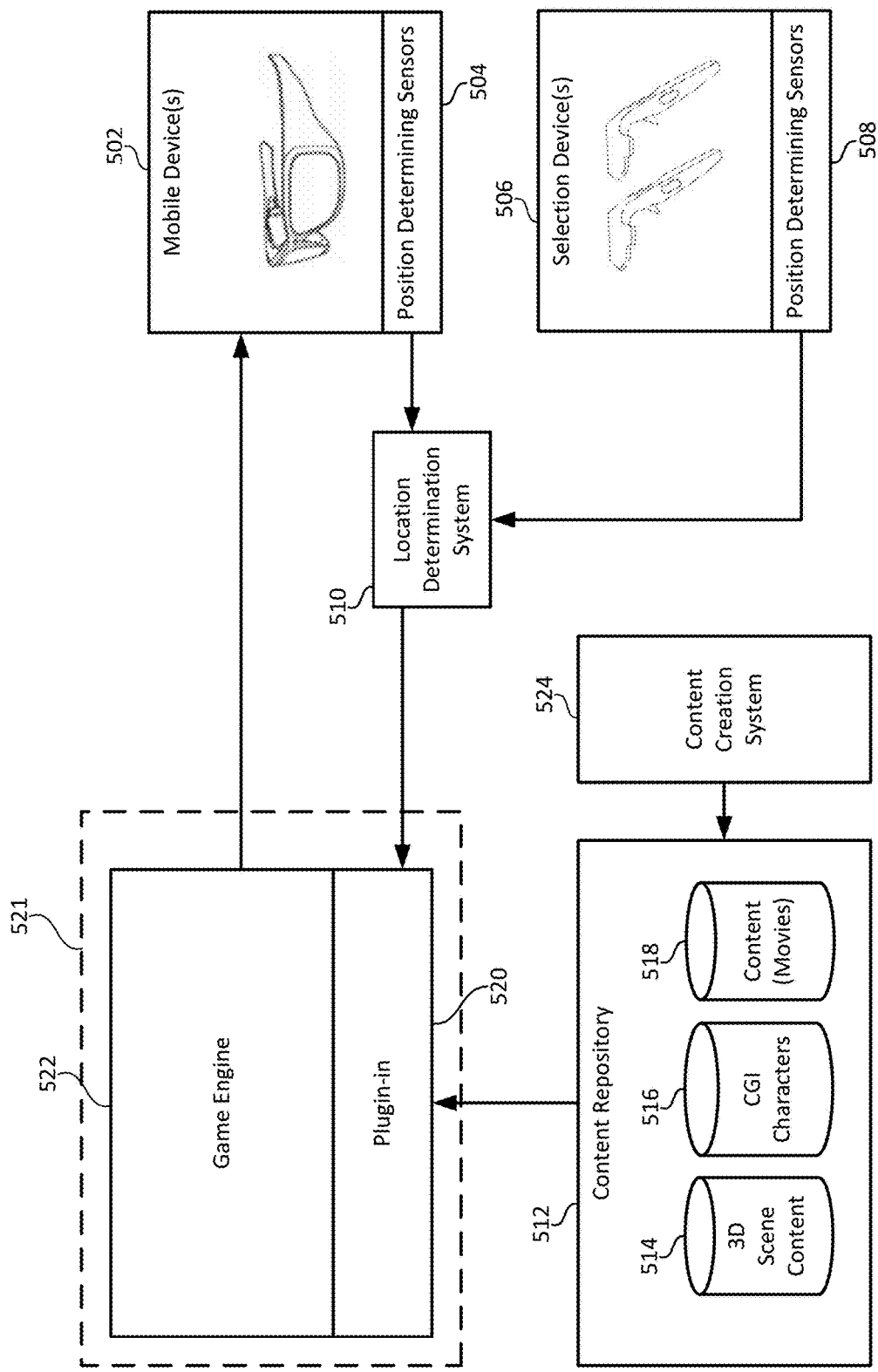
FIG. 5 illustrates a block diagram of a system for experiencing and authoring digital content, according to some embodiments.

FIG. 5 illustrates a block diagram of a system for experiencing and authoring digital content, according to some embodiments. As described above, the system may include one or more mobile devices 502 with electronic displays that provide a view into a virtual scene. The system may also include one or more selection devices 506 for receiving user inputs to interact with content in the virtual scene. Some embodiments may combine the one or more mobile devices 502 with the one or more selection devices 506 into single devices, such as tablet computers or smartphones. Although not shown explicitly, the one or more mobile devices 502 and the one or more selection devices 506 may be distributed amongst one or more users. Each user may be equipped with a different embodiment of the one or more mobile devices 502 (e.g., VR headsets, AR glasses, smart phones, etc.) as well as a different embodiment of the one or more selection devices 506 (e.g., smartphone, hand control, mouse, VR controller, etc.).

In some embodiments, the one or more mobile devices 502 and/or the one or more selection devices 506 may include position determining sensors 504 and 508, respectively. The position determining sensors may be an integrated part of these devices, and may include GPS receivers, radio-frequency transmitters/receivers, accelerometers, gyroscopes, tilt sensors, compasses, and so forth. Some devices may also include visual fiducials that can be identified by a plurality of cameras. The location determination system 510 may receive inputs from the position determining sensors 504, 508 to determine a position and/or orientation of the one or more mobile devices 502 and/or the one or more selection devices 506. The location determination system may also determine a position and/or orientation of other objects associated with the user. For example, the location determination system 510 may also determine the position and/or orientation of the user's head, the user's torso, or a portion of clothing worn by the user. The location determination system 510 need not receive any inputs from the position determining sensors 504, 508, which are optional. Instead, the location determination system 504 can determine the location of the one or more mobile devices 502 and/or the one or more selection devices 506 using video analysis, laser range finders, microwave radiation, or any other technology that admits energy from the location determination system 510 that is reflected off of the user, such as infrared sensors or room scanning sensors (e.g., Microsoft Kinect®). The location determination system 510 may include a motion capture system with a plurality of video cameras, and may follow the performance of a user using one or more physical markers, wireless transmitters, depth information for the one or more selection devices 506, GPS information for the one or more selection devices 506, location information received from the one or more selection devices 506, and so forth. In some embodiments, the location determination system may be combined with the rendering system 521.

Some embodiments may include a content creation system 524 that may include one or more computers capable of editing and/or generating highly detailed, high-fidelity and/or film-production-grade content. In one embodiment, the content creation system 524 may be used to create and/or generate a 3-D virtual environment from which the virtual scene can be captured. The 3-D virtual environment may be a virtual set in which one or more scenes for an item of digital content (e.g., a movie) will take place. For example, the 3-D virtual environment may be a virtual desert. As another example, the 3-D virtual environment may be a digital replica of the city of San Francisco. The 3-D virtual environment may also include one or more objects such as buildings, rock formations, clouds, the sun, the moon, bridges, water, foliage, vehicles, animals, tools, characters, and/or the like.

The content creation system 524 can deposit content objects into a content repository 512. The content repository may include separate libraries or databases of content objects that can be used to construct the virtual scene. For example, the content repository 512 may include 3-D scene content that includes scenery, environments, light sources, scene objects, and so forth. The content repository 512 may also include a library of CGI characters 516 that can be driven by live-action actors in real-time, as well as characters that can be controlled by one or more "puppeteers" in the virtual scene. Additionally, the content repository 512 may include a library of digital content 518 that includes video clips, animations, movies, sound recordings, and other predetermined sequences of sound and/or motion that may be included in the virtual scene.

In one embodiment, the 3-D virtual environment comprising scene content, characters, and predetermined content may be loaded into the rendering system 521 such that the rendering system 521 renders image frames of the 3-D virtual scene from the perspective of a primary virtual camera corresponding to a point of view of a user in the immersive environment 106, and transmits the image frames to the first mobile device. The rendering system may include one or more computers capable of rendering the 3-D virtual scene in real-time and/or at interactive frame rates (e.g., greater than 15 frames per second). The virtual scene elements from the content repository 512 may be considered digital assets that are received by a special plug-in 520 for a game engine 522. For example, the game engine 522 may be a commercially available game engine, such as the Unreal Engine 4®. No alterations need to be made to the game engine 522. Instead, the game engine 522 may simply run the content and instructions provided by the plug-in 520. The plug-in 520 allows the user to manipulate objects using the one or more selection devices 506, adjust the lighting, add/remove assets such as characters and vehicles, control digital characters using motion capture or digital puppeteering techniques, record scenes, save the state of the environment, add and interact with menu items in the virtual scene, and so forth.

In some embodiments, the game engine 522 may be used with the plug-in 522 operating in real time on a computer system. However, some embodiments may create a package build from the game engine 522 and the plug-in 520 that includes predefined digital assets for a particular scene. This allows the package build to be distributed to users by download or physical digital media to use on their own home immersive environment, such as a home virtual-reality system, home theater, or on their own mobile computing device. The package build need not require an instance of the game engine 522 or the plug-in 520 in order to run on a user device. Thus, the package build can be distributed independent of the game engine 522 and/or the plug-in 520. Some embodiments of the package build may allow users to add/remove digital assets to/from the virtual scene that are downloaded during an interactive session or that are stored in a local content repository.

After rendering the virtual scene in real-time, each of the one or more mobile devices 502, may simultaneously present the image frames generated and transmitted from the rendering system 521 on the electronic display of each mobile device. The image frames may be presented to a user at or above a particular frame rate (e.g., 15 frames per second, 30 frames per second, 60 frames per second, 120 frames per second, etc.). In one aspect, the first mobile device may be a pair of virtual reality goggles or a similar immersive device. The selection device may be a pair of handheld controllers. The first mobile device may be any suitable mobile device, such as a tablet, smartphone, virtual reality/augmented reality glasses/goggles, watch, laptop, handheld controllers, etc. A selection device, likewise, can be any suitable device, such as a tablet, smartphone, virtual reality/augmented reality glasses/goggles, watch, laptop, handheld controllers, etc. User controlling each of the one or more mobile devices 502 and/or one or more selection devices 506 may interact with the mobile device(s) to move the primary virtual camera around the 3-D virtual environment. For instance, the virtual camera may be controlled by physically changing the position of the first mobile device and/or changing the orientation of the first mobile device. For example, a user may move forward 2 feet from his or her current location while wearing the first mobile device on his or her head. The first mobile device may detect such movement based one or more sensors of the first mobile device (e.g., an accelerometer, gyroscope, GPS, depth sensor, camera, wireless radio, etc.). The information regarding the detected movement may be transmitted to the rendering system (or motion capture system) which may in response shift the primary virtual camera and transmit image frames to the first mobile device with the primary virtual camera having moved forward 2 virtual feet in the virtual environment.

This real-time feedback provided by the one or more mobile devices 502 and/or the one or more selection devices 506 allows for numerous applications of the system depicted in FIG. 5. As described above, the system can be used for previsualization for feature films, animated sequences, and other digital media. A director can walk a virtual set in the same way they would walk a real-world set, adding and moving scenery, adjusting coloring and lighting, setting camera angles and camera characteristics, and so forth. Objects can be selected, characters can be posed, content can be quickly copied and duplicated, animation paths can be defined, and images of the scene can be taken to form a storyboard similar to a traditional scene storyboard used by movie directors. In addition to encompassing film and content generation, the system of FIG. 5 can provide a virtual reality experience for users in their homes, in movie theaters, at sporting events, at public gatherings, and so forth.

Figure 6:
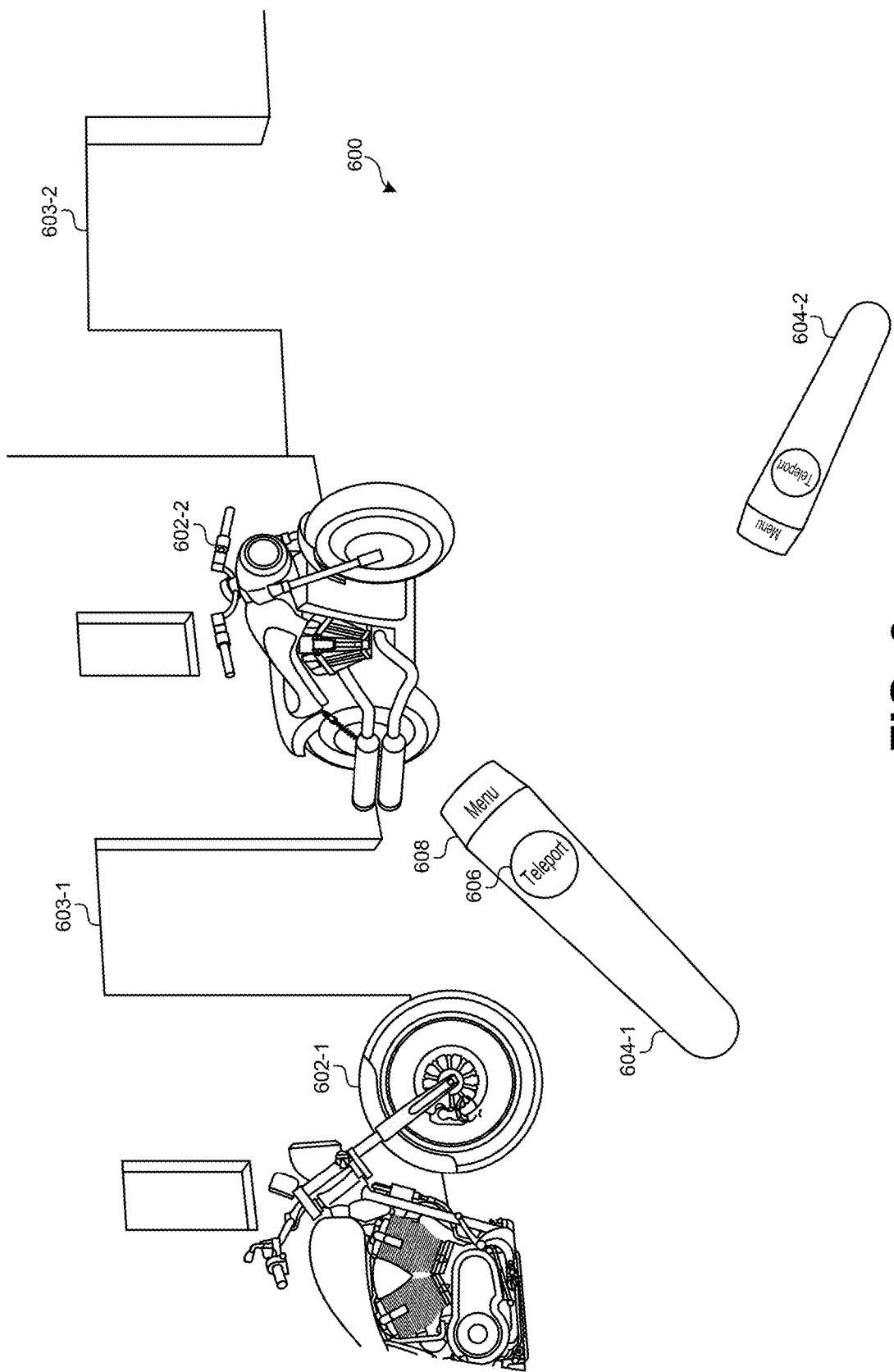
FIG. 6 illustrates a first-person view within the virtual scene, according to some embodiments.

FIG. 6 illustrates a first-person view within the virtual scene, according to some embodiments. Although not shown explicitly in FIG. 6, the view of the virtual scene corresponds to a location of a user in an immersive environment holding a pair of selection devices. By way of example, the view shown in FIG. 6 may correspond to a view shown on a pair of VR goggles worn by the user in the immersive environment. The user may be holding their hands out in front of them holding a pair of selection devices. Instead of seeing their physical hands and the physical selection devices, the user would instead see the view of FIG. 6 in the VR goggles.

In this embodiment, the location determination system can monitor the position and/or orientation of the selection devices in the immersive environment. The location determination system can also monitor the position and/or orientation of the mobile device in the immersive environment. As described above, the view of FIG. 6 may correspond to a virtual camera in the virtual scene positioned at or near a location corresponding to the user's head. In embodiments using VR goggles or AR glasses, the position of the mobile device may be used to estimate position of the user's head. The virtual scene 600 may include CGI objects, characters, scenery, light sources, and so forth that are not physically replicated in the immersive environment.

Some embodiments may display any devices or body parts for which a location can be determined in the immersive environment. In this example, the view of FIG. 6 does not show a virtual representation of the mobile device because the view is displayed on the mobile device, but it does show a pair of virtual selection elements 604 in positions that correspond to positions of the selection elements in the physical immersive environment. Specifically, the user in the physical immersive environment may be holding their hands in front of them, with the left hand slightly higher than the right-hand, holding the selection devices. Consequently, the virtual selection elements 604 in the virtual scene 600 will similarly appear out in front of the user, with the left virtual selection element 604-1 slightly higher than the right virtual selection element 604-2. As the user moves their hands in the physical environment, the virtual selection elements 604 may appear to move relative to the position of the user in corresponding fashion. Thus, the user can intuitively control the location and/or orientation of the virtual selection elements 604 in the virtual scene by making corresponding movements in the physical immersive environment.

The selection device may be a device that includes one or more buttons. The buttons may allow the selection device to send command signals to the rendering system in order to perform various functions. The rendering system may map the physical orientation/position of the selection device(s) with a virtual orientation/position of the virtual selection element(s) 604 in the virtual scene 600. Such mapping can be performed in any suitable manner. For example, the rendering system may map the initial GPS coordinates, accelerometer information, and other sensor information received from the selection device to an initial virtual position or orientation of the virtual selection element. As another example, the sensors of the location determination system may determine the initial location of the selection device by detecting infrared reflective markers on the selection device. The initial location may be mapped to an initial virtual position or orientation of the virtual selection element. Any change in the initial physical orientation and/or position of the selection device may cause movement of the virtual selection element in the virtual environment in real time.

The virtual selection element 604 may be represented by one or more graphic objects resembling the physical selection device. For example, buttons on the physical selection device may be replicated visually on the virtual selection element 604. Virtual selection element 604-1 includes a "teleport" button 606 and a "menu" button 608. These buttons can be labeled in the virtual environment without being so labeled in the physical environment. Thus, the physical controls can be repurposed by relabeling the buttons in the virtual environment dynamically during a user interaction if needed.

The scene elements in the virtual scene 600 may be part of any virtual scene that can be created in an animation pipeline. For example, although this scene includes motorcycles 602 and buildings 603, other virtual scenes may include extraterrestrial landscapes, interiors of space stations, fantasy characters and/or creatures, humanoid robots, fields of combat, and so forth. In some embodiments, the virtual scene 600 may be modeled after a real-world scene. For example, when filming at a remote location, the director may wish to walk the scene and prepare a camera angles, character placements, and so forth without actually visiting the remote location. Virtual models of actual physical environments can therefore be imported into the rendering system and used to build the virtual scene 600 such that storyboards for content creation can be generated without actually visiting the physical location.

Figure 7:
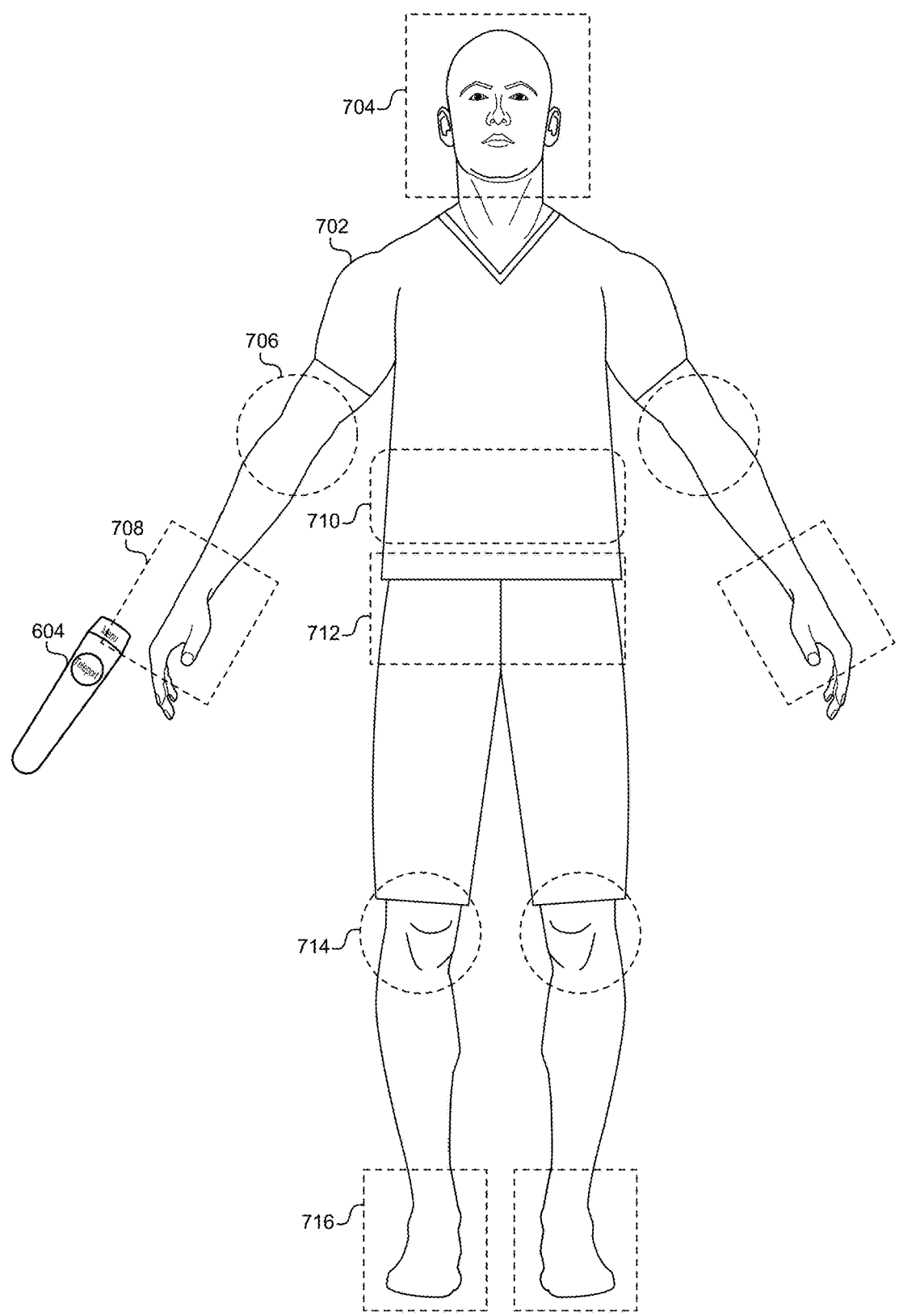
FIG. 7 illustrates a CGI character that can be manipulated by the virtual selection element in the virtual scene, according to some embodiments.

FIG. 7 illustrates a CGI character 702 that can be manipulated by the virtual selection element 604 in the virtual scene, according to some embodiments. The character 702 may be comprised of a complete animation model, with textures, a skeletal rig, animation controls, and so forth. Other characters need not be complete animation models, but may instead include surface volumes, simple geometric objects, and so forth.

In some embodiments, each object in a virtual environment may include one or more selection shapes, each of which surrounds a portion of the object. An object can be selected by moving the virtual selection element 604 within or in proximity to the selection shape. In some embodiments, the selection shape my "light up" or otherwise be emphasized when selected. A selection shape may be any suitable shape, color, and may have varying degrees of translucence. The shape, color, and translucence may indicate different types of manipulations that can be performed on an object. For example, an unselected selection shape may be mostly transparent, while a selected selection shape may be relatively opaque.

For example, an object may be a virtual person, such as character 702. A first selection shape 710 may be a semi-translucent square that surrounds the waist of the character 702. The first selection shape 710 may indicate how closely the virtual selection element 604 should be moved in order to select and move/orient the virtual location of the character 702. The shape of the first selection shape 710 may be contrasted with the shapes of other selection shapes associated with other joints of the character 702. Specifically, the doughnut shape of the first selection shape 710 can be contrasted with the circular/square shapes of other selection shapes for the character 702, and may indicate that the first selection shape 710 can be used to move the entire character 702 without adjusting its pose. For example, if the user rotates the selection device 90 degrees after selecting the first selection shape 710, the character 702 will also rotate 90 degrees.

A second selection shape 706 may be a sphere that surrounds the elbow of the character 702. The second selection shape 706 may indicate how closely the virtual selection element 604 should be moved in the virtual scene in order to select and pose the arm of the character 702. For instance, the user, upon selecting the second selection shape 706, may adjust the pose of the arm of the character 702. In some embodiments, a user may initiate or bring up a menu upon selection of the second selection shape 706. The menu may provide different but related manipulations that can be performed on an object. In one aspect, a menu may have different sets of manipulations based on the particular selection shape that is selected.

In order to provide a fully articulable character 702 in the virtual scene, selection shapes may be provided at many joints and/or locations on the character 702. The selection shapes illustrated in FIG. 7 are merely provided by way of example and are not meant to be limiting. In addition to the first selection shape 710 and the second selection shape 706, character 702 may include selection shapes 708 associated with the hands of the character 702, selection shape 704 associated with the head of the character 702, selection shape 712 associated with the hips of the character 702, selection shapes 714 associated with the knees of the character 702, and selection shapes 716 associated with the feet of the character.

FIG. 8 illustrates a view of a virtual scene that includes the character 702 and a motorcycle 804, according to some embodiments. Like the character 702, the motorcycle 804 may include one or more selection shapes, such as selection shape 802 on the seat of the motorcycle 804. By selecting selection shape 802, the user in the virtual scene can move the location and/or orientation of the motorcycle 804 by translating or rotating the virtual selection element 604. By graphically representing selection shapes on objects and characters in the virtual scene, the system can provide a visually intuitive way for users to manipulate digital content in the virtual scene. For example, a director can enter the virtual scene using the first mobile device and change the location, posture, pose, etc., of the character 702 to plan a video sequence for a feature film. A game designer can enter a virtual game environment and change locations or poses of non-player characters (NPCs) in a level of the videogame.

In some embodiments, a user may select an object using the virtual selection element 604 by moving the virtual selection element in proximity to a selection shape. A user may move the virtual selection element by physically moving the selection device 104 in the real world environment. As mentioned, the physical orientation of the selection device 104 may be mapped to the orientation of the virtual selection element 604 in the virtual environment. Thus, if the selection device 104 moves three feet to the right in the physical world, the virtual selection element 604 may also move three virtual feet to the right in the virtual world. In this way, a user can quickly select different objects within the virtual environment and determine the attributes of the objects. A user can also quickly add, remove, or move objects around the virtual environment. In the example of FIG. 8, the user can move the selection device 104 in the real world and watch the corresponding movement of the virtual selection element 604 in the virtual scene. As the virtual selection element 604 comes in proximity to the selection shape 710, the selection shape 710 can change colors or translucence to indicate that the selection shape 710 can be selected by the virtual selection element 604. By clicking a button or trigger on the selection device 104 in the physical world, the user can then activate the selection element 710 such that subsequent movements of the virtual selection element 604 using the selection device 104 can affect the location, orientation, or pose of the character 702 in the virtual scene.

Selection element 710 may have special properties that are different from other selection elements on the character 702. For example, selection element 710 may not change the pose of the character 702, but may instead be used to pick up and move the entire character 702 without changing its pose. After selecting selection element 710, the user can lift the entire character 702 in the pose shown in FIG. 8 by lifting the selection device in the physical world. The user can also rotate the character 702 by rotating the selection device, which will show a corresponding rotation of the virtual selection element 704. As will be described in detail below, each selection element may have specific properties that determine how movement of that selection element affect the pose, location, and/or orientation of the character 702.

Figure 9:
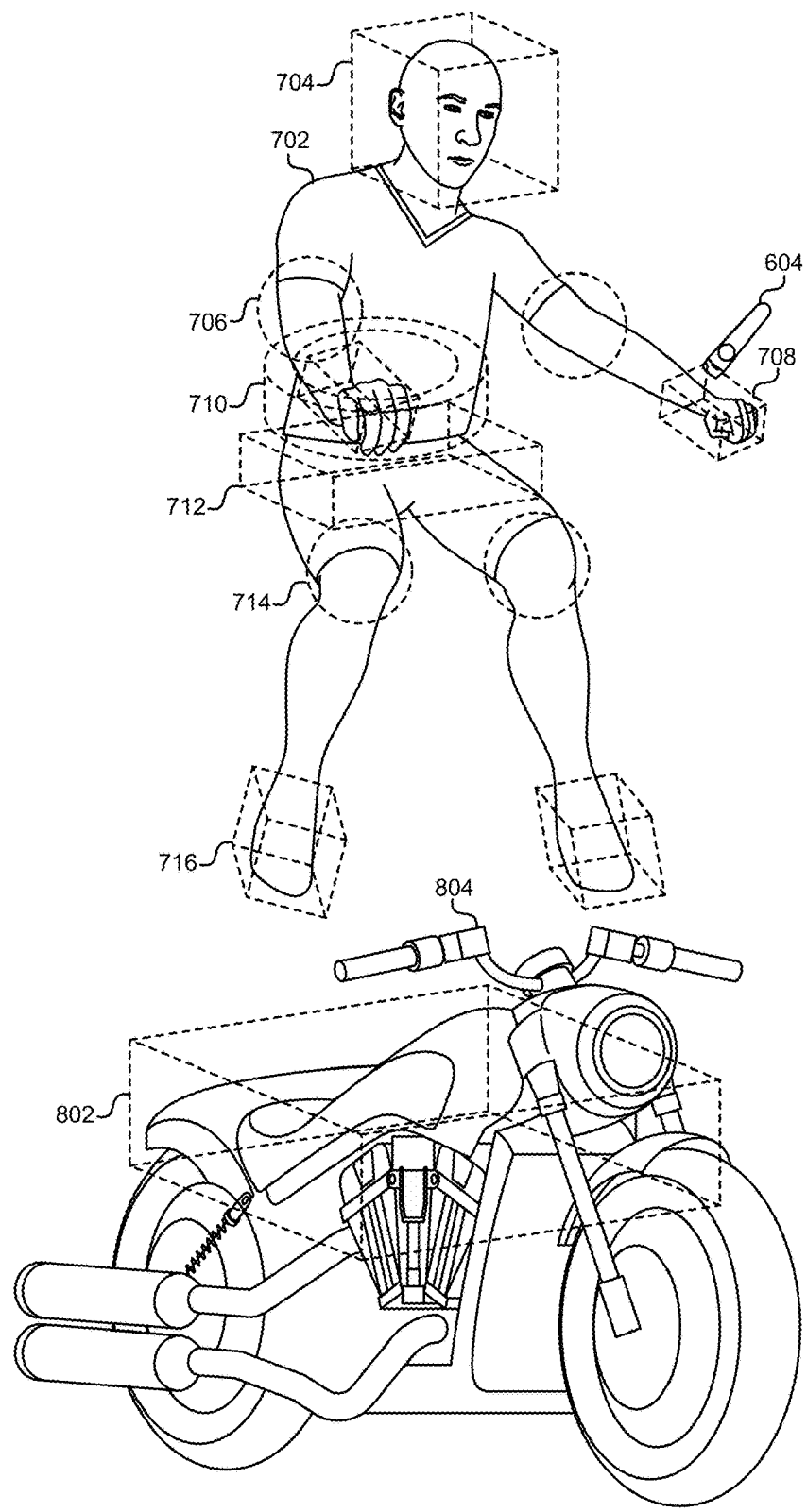
FIG. 9 illustrates how the character can have its position changed through selection and movement of various selection shapes, according to some embodiments.

FIG. 9 illustrates how the character 702 can have its position changed through selection and movement of various selection shapes, according to some embodiments. First, the position and pose of the character 702 relative to the motorcycle 804 have been changed from FIG. 8 to FIG. 9. Each of these changes have been made by selecting and moving one or more of the selection shapes of the character 702. The following description will detail how the selection shape has been manipulated to achieve this desired pose. As described above, the user can move the character 702 without changing its pose from standing beside the motorcycle 804 to hovering above the motorcycle 804 by selecting selection shape 710 and lifting the character 702 over and above motorcycle 804.

The way in which the remaining selection shapes can move the joints and limbs of the character 702 can be governed by the rules of a physics engine and the way in which each shape/limb attaches to the remainder of the body of the character 702. For example, to move the character into a sitting position, the virtual selection element can be moved to select each of selection shapes 714 individually. Each selection shape 714 can then be moved upwards by lifting the selection control 104 in the physical world by the user. Instead of moving the torso of the character 702, this motion can lift the knee of the character 702 while being restricted by the attachment of the leg to the hip joint of the character 702. Therefore, lifting selection shape 714 upwards can cause the leg to rotate upwards in the hip socket. This will make the character 702 appear to lift its leg in a natural motion subject to the normal physical constraints of a hip joint. Additionally, the orientation of the lower leg need not be changed by lifting the knee using selection elements 714 instead, the lower leg can remain pointed or oriented in a downward direction while the knee is lifted.

Next, the arms can be lifted by individually selecting each of selection shapes 708 using the virtual selection element 604 as illustrated in FIG. 9. As with the leg joints, lifting the arms using selection shapes 708 can be subject to the normal physical constraints of the shoulder and elbow joints of the character 702. Lifting or rotating the arm using selection shapes 708 need not change the orientation or location of the torso of the character 702, but can instead cause the arm to rotate in the shoulder socket. If the movement of the virtual selection element 604 pushes the selection shapes 708 back towards the body of the character 702, this may cause a natural motion of the elbow joint to bend. In contrast, as the selection shapes 708 are pulled away from the body of the character 702, the elbow joints may straighten. In order to give the arms the slightly bent appearance of FIG. 9, the user can select selection shapes 706 corresponding to the elbows of the character 702 and pull them slightly outwards. In some embodiments, this may pull the torso of the character 702 towards the hands of the character such that the hands do not move and the character bends at the waist. In other embodiments, this may pull the hands back towards the torso of the character without changing the orientation of the lower arms or the torso of the character.

To lean the upper torso of the character 702 forward, the user can select selection shape 704 for the head of the character 702. The selection shape 704 can cause the head to rotate on the neck joint and move up and down in a natural fashion. Selection shape 704 can also "pull" the torso of the character 702 in different directions while being anchored at the hips. Thus, by pulling selection shape 704 forward, the character 702 can be adjusted to lean forward through the head and upper torso. In some embodiments, this may cause the arms to tip forward with the body such that a consistent angle is maintained between the body and the arms. In other embodiments, this may cause the arms to rotate the shoulder joint such that the orientation of the arms remains constant while the body is rotated forward.

Figure 10:
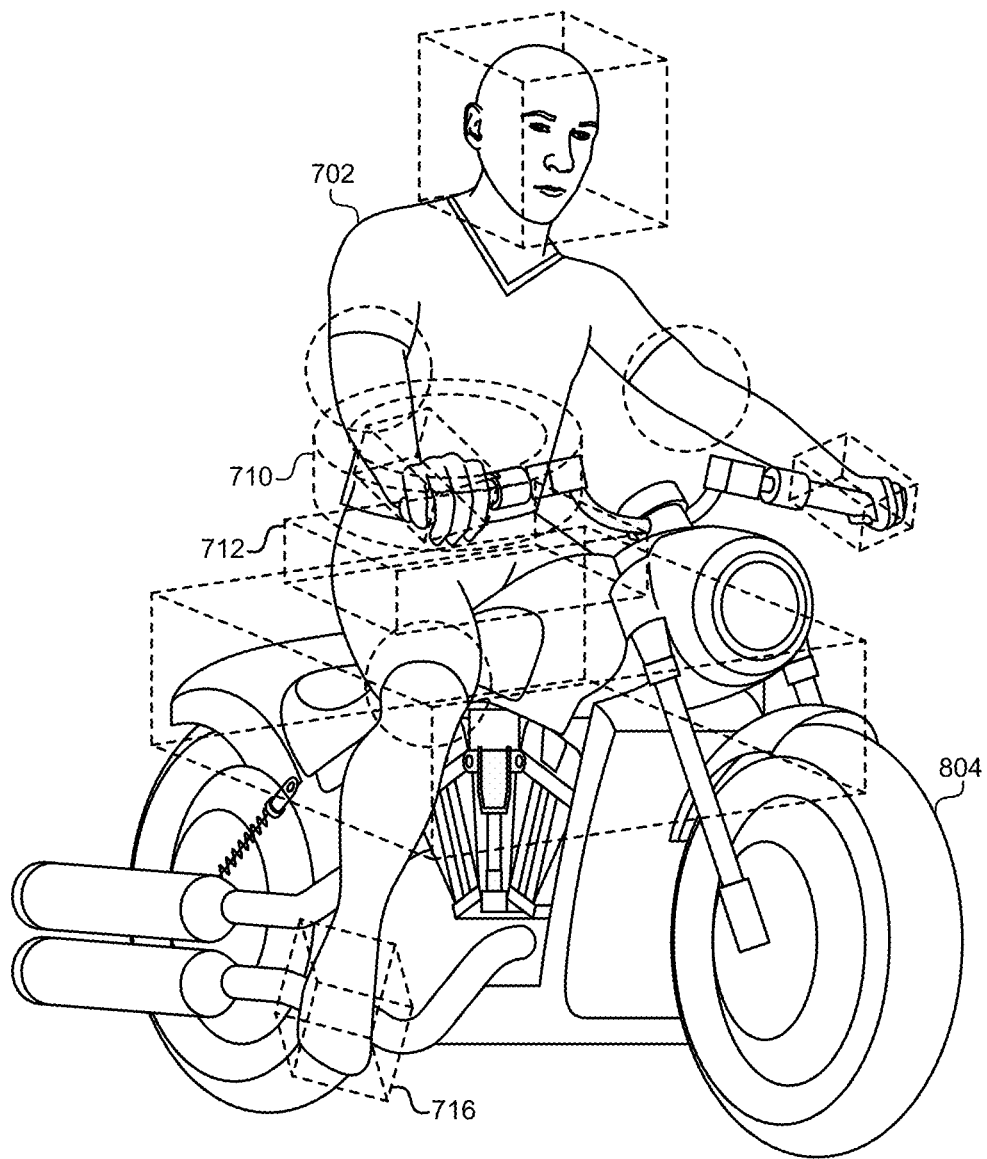
FIG. 10 illustrates how the character can be placed on the motorcycle, according to some embodiments.

FIG. 10 illustrates how the character 702 can be placed on the motorcycle 804, according to some embodiments. As described above, the character 702 can be lowered onto the motorcycle 804 using selection shape 710 to move the entire character 702 without changing its pose. The selection shape 712 around the hips of the character 702 can be pushed forward such that the body of the character 702 sits into the seat of the motorcycle 804. Pushing the hips of the character 702 forward using selection shape 712 can cause the bend of the character 702 at the hips to change, while leaving the position of the hands and feet the same. Next, selection shapes 716 on the feet of the character 702 can be pushed slightly backwards to rest on the foot support of the motorcycle 804. If possible, moving selection shape 716 can cause the lower leg to rotate in the knee socket of the character 702. This can keep the upper leg stationery unless the lower leg is pulled in such a way that rotation in the hip socket is necessary for a natural movement.

Some embodiments may also restrict the movement of the lower leg using selection shape 716 using the volume of the motorcycle 804. Specifically, the lower leg may be allowed to be moved until it contacts the volume of the motorcycle 804. Similarly, the character 702 can be lowered onto the motorcycle 804 until the seat of the character 704 contacts the seat of the motorcycle 804. This can be determined using collision volumes or other techniques to prevent objects or characters from being moved into each other and appearing to overlap in the virtual scene. Some embodiments may also place limitations on where a character or object can be moved using their associated selection shapes. For example, some characters or objects may be restricted to certain areas in the virtual scene.

As stated above, the selection shape of each character can be associated with a set of rules that govern how it can move the associated character or object. These rules may be specific to a particular character. For example, some robotic characters may have a smaller radius of allowed arm movements than a more human character. When the selection shape is selected by the virtual selection element, the set of rules for that particular selection element can be evaluated to determine how subsequent movements of the virtual selection element should affect the character associated with the selection shape.

Figure 11:
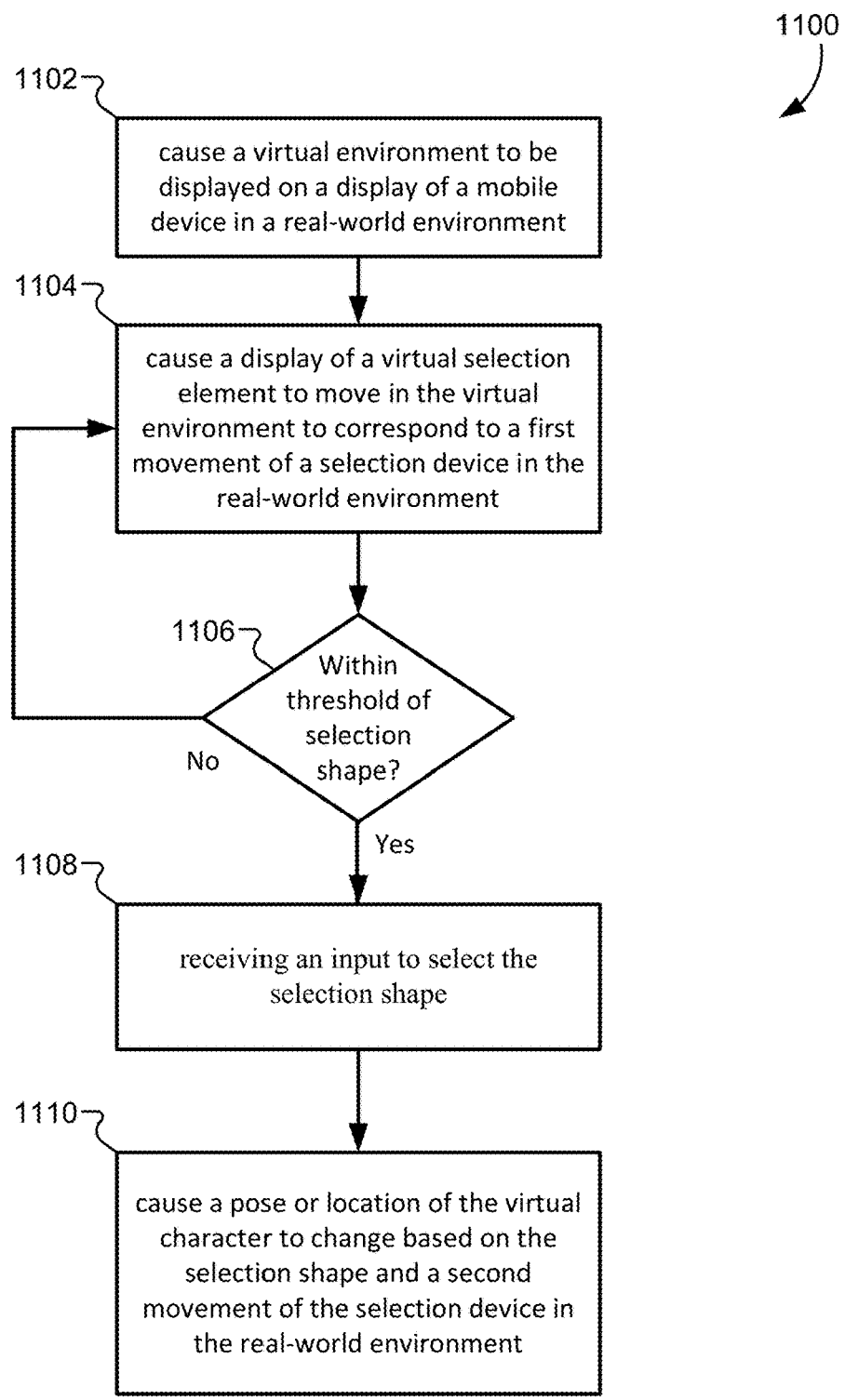
FIG. 11 illustrates a flowchart of a method for posing and animating characters, according to some embodiments.

FIG. 11 illustrates a flowchart 1100 of a method for posing and animating characters, according to some embodiments. The method may include causing a virtual environment to be displayed on a display of a mobile device in a real-world environment (1102). The display device may be a pair of VR goggles, a tablet computing device, a smart phone, a pair of AR goggles, and so forth. As described above, the system may also include one or more selection devices, a location determination system, a rendering system, a workstation, and so forth. The real-world environment may be the immersive environment used during a VR/AR experience. The virtual environment may be a digital 3-D scene stored in the rendering system that includes a virtual character, such as a CGI character in a humanoid or other form. The virtual character may comprise a skeletal rig that is skinned with textures and other features. The virtual character may include animation controls or other controls to adjust the position and pose of the character in the virtual environment.

In addition to the animation controls, the virtual character may be associated with a separate set of one or more selection shapes. As described above, the selection shapes may be separate from the character itself, but may enclose joints, appendages, limbs, extremities, and so forth of the virtual character. The selection shapes may be translucent such that the virtual character is visible through the selection shapes, and may include regular 3-D shapes, such as spheres, rectangles, cubes, toroids, disks, ovoids, cuboids, and/or the like. In some embodiments, the selection shapes need not touch the virtual character. In some embodiments, the shape, translucence, color, and/or type of the selection shape may indicate the type of movement or deformation that will be done to the character by moving the selection shape. For example, the disk shape of a selection shape around the midsection of a virtual character may indicate that the selection shape can change the location of the virtual character without changing its pose.

The method may also include causing a display of the virtual selection element to move in the virtual environment to correspond to a first movement of a selection device in the real-world environment (1102). The selection device may include a handheld control. In some embodiments, the selection device may be physically combined with the hardware of the mobile device, such as a tablet computer where the electronic display presents the view of the virtual environment and the touchscreen provides the selection device. As described above, movements of the selection device may generate corresponding movements of the virtual selection element in the virtual environment. The view of the virtual environment may be rendered from a virtual camera in the virtual environment that moves according to a determined position and/or orientation of the mobile device and/or head of the user in the real world environment.

The method may also include determining when the virtual selection element is within a threshold distance of a selection shape in the virtual environment (1106). For example, when the virtual selection element comes within a threshold distance of the selection shape, such as 6 inches in the virtual environment, the selection shape can be selected or associated with the virtual selection element. Some embodiments may require the virtual selection element to enter, pierce, touch, intersect, or penetrate the selection shape before it is selected. Selecting the selection shape may cause the color and/or translucence of the selection shape to change and thus may indicate to the user that the selection shape is selected.

The method may also include receiving an input to activate the selection shape (1108). Note that selecting the selection shape is different from activating the selection shape. Generally, "selecting" the selection shape means that the selection shape can next be "activated" by receiving another input from the selection device. Selecting the selection shape does not actually affect the pose and/or location of the character. Instead, selecting the selection shape visually indicates to the user that the received input can activate the selection shape. The received input may include receiving a finger tap on a touchscreen, depressing a button or trigger on a handheld control, and so forth. Activating the selection shape can cause the system to access a rule set associated with the selection shape that can govern how moving the selection shape will move or deform the associated virtual character. Activating the selection shape can further cause the translucence, color, or shape of the selection shape to change to visually indicate that the selection shape is activated as opposed to simply being selected.

The method may further include causing a pose or location of the virtual character to change based on (i) the selection shape and (ii) a second movement of the selection device in the real world environment (1110). For example, this operation may depend on the type of selection shape, where some selection shapes move the entire virtual character to a new location without changing the pose of the virtual character, while other movements may change the pose of the virtual character without moving the virtual character to a new location. Specific examples of how various selection shapes can change the location and/or pose of the virtual character are described in detail above. In some embodiments, the movement of the virtual character may be governed by a physics or game engine that calculates how the pose of the virtual character changes such that movements appear to be natural for a humanoid character. The rule set of each selection shape may be used as an input to the physics engine or game engine.

It should be appreciated that the specific steps illustrated in FIG. 11 provide particular methods of posing and animating characters according to various embodiments of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the system can record the changes in location and/or pose of the virtual character to generate an animated sequence for the virtual character. This animated sequence can be played back as part of a content-generation process. For example, a user may manually "puppet" a character using the selection shapes in the virtual environment to produce an animated sequence of motion for the virtual character. A virtual character may also be attached to a spline or path in the virtual scene and caused to move along that spline or path. For example, a spacecraft or vehicle can be connected to a spline or path and caused to fly along that path at a predetermined rate. in this way, the posing of virtual characters can be used to generate an animation sequence of the virtual characters. These animation sequences may be used in an interactive experience as content is presented to another user, and may also be used to create feature films or other animated content that can be played back on other video devices or presented in a theater. As will be described in greater detail below, multiple users can interact with one or more virtual characters at the same time to generate animated content for feature films and other digital media. This can be used as part of the actual content creation process, or as part of the previsualization process to prepare for content creation.

In some embodiments, the virtual objects of the virtual environment may move or interact with other objects over time. In one aspect, the movement or interaction of the virtual objects may have been pre-rendered and/or pre-defined such that the virtual objects can be presented in very high fidelity. In other embodiments, the movement and/or interactions of the virtual objects may be rendered in real-time.

In certain embodiments, a user may indicate that the rendering system "record" the user's manipulations with the objects in the 3-D environment over time. The user may then interact with the selection shape of the objects to "animate" the objects. Thereafter, upon finishing an animation interaction, the user can have the rendering system playback the recorded manipulations. The rendering system may automatically remove visualization of the selection shapes and/or the virtual selection element in order to make the object appear as if it is moving on its own.

In some embodiments, a user may interact with the selection device to draw or input one or more "splines" or lines within the 3-D virtual environment. The user may then use the selection device to select or add one or more objects and associate the objects with the one or more splines. The selected objects may include or be associated with pre-defined animations that can be "played" over time. After associating the objects to the splines, a user may indicate that the animations are to be played. The objects may then perform their animations while following the splines or lines. For example, an object may be a robot with a "walking" animation. The object may be associated with a spline drawn or input by the user. Upon receiving an indication to perform the animation, the rendering system may perform an animation showing the robot walking along the spline. In some embodiments, the rendering system may ignore any simulated "physics" when following the spline. For example, a spline may stretch vertically into the sky of a 3-D virtual environment. A robot associated with the spline may then walk along the spline vertically into the sky and ignore any simulated gravity for the 3-D virtual environment.

Figure 12:
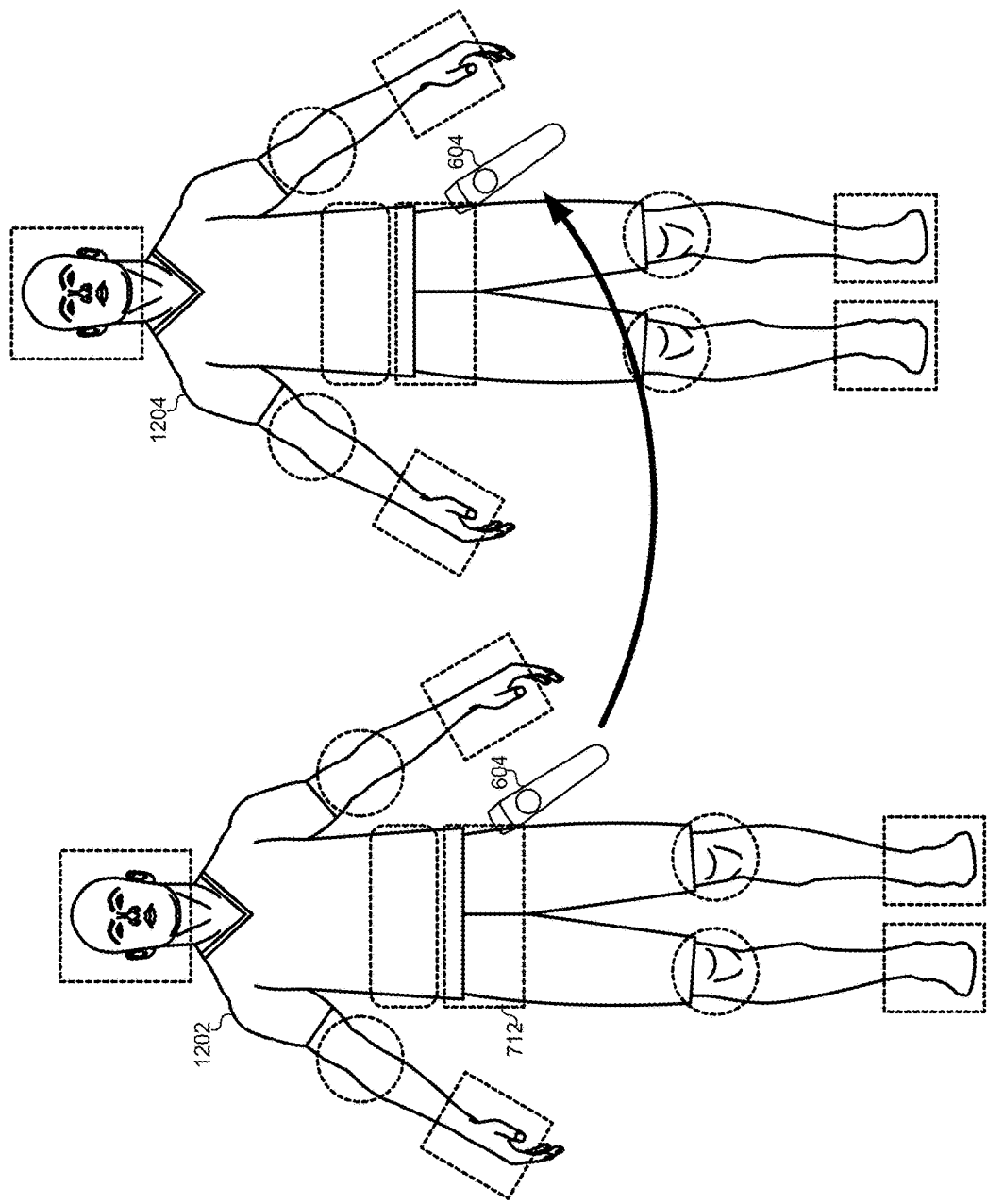
FIG. 12 illustrates an operation for copying and pasting a virtual character in a virtual environment, according to some embodiments.

FIG. 12 illustrates an operation for copying and pasting a virtual character in a virtual environment, according to some embodiments. When constructing a virtual scene for feature film or interactive content, some directors or content creators may wish to rapidly reproduce and reposition virtual characters or objects. For example, when filming a battle scene, virtual characters representing combatants can be rapidly reproduced and positioned in the scene to create an army or group of attackers. Rather than having to manually open and load new virtual characters for each combatant, some embodiments allow a user to select a virtual character or group of virtual characters/objects in the virtual environment and rapidly reproduce them in new locations.

In the example of FIG. 12, character 1202 may already exist in the virtual scene. The user may wish to duplicate character 1202 and move the duplicate character to stand next to character 1202. The user may move the virtual selection element 604 to select one of the selection shapes on character 1202, such as selection shape 712. In some embodiments, one particular selection shape may be designated for copy-and-paste operations, whereas in other embodiments any selection shape can be used. If the user were to provide a first input through the selection device, then subsequent movements of the selection device (and virtual selection element) would result in changing the location of character 1202. However, a second input can also be received through the selection device by pressing a second button or trigger, or selecting a different operation on a touchscreen. The second input can generate a duplicate character 1204 of character 1202 and move the duplicate character 1204 instead of the character 1202.

In some embodiments, multiple duplicate characters can be rapidly generated by repeating the process described above for generating the first duplicate character 1204. After the first duplicate character 1204 is generated, additional duplicate characters can be generated by repeatedly providing the second input (e.g., repeatedly pressing the second input button on the selection device). In this manner, a user can rapidly populate a scene with virtual characters. This may be particularly helpful when the scene is to be filmed from a distance and repeated characters or characters using similar uniforms/dress are not as noticeable.

In some embodiments, the user may interact with the selection device to choose a virtual object to be placed on a selected surface. For example, a user may enter into an object placement menu or use predefined hotkeys to select and place a virtual tree or building on a surface currently selected by the virtual selection element. In some instances, the user may move or remove a virtual object from the virtual environment. For example, a user may select a virtual tree using the virtual section element and move the virtual tree to another location in the virtual environment by physically moving the selection device.

In addition to using selection shapes to pose, move, and animate virtual characters as described above, the embodiments described herein also provide a graphical user interface (GUI) that allows users to modify their experience inside the virtual environment in an intuitive manner. Typical user interfaces in computing environments and virtual environments include static menus that are displayed at the top, bottom, and/or side of the display. While these interfaces are always visible to the user, they also clutter the display. More importantly, they disrupt the experience of the virtual environment. Static interfaces and menus generate a visual disconnect between the virtual world and the user, reminding the user that what they are seeing is not reality.

The embodiments described herein solve this and other problems by generating a graphical interface in the virtual environment that is part of the virtual environment itself. For example, the interface may include a 3-D object that is placed in the virtual environment in the rendering system. When the view of the virtual environment is rendered from the virtual camera corresponding to the location/orientation of the user/mobile device in the real-world environment, the 3-D object representing the interface will be rendered as part of the scene. Therefore, the interface will appear to the user in the virtual environment as part of the virtual environment itself. This provides a seamless visual experience for the user as they view the virtual scene. The graphical interface will simply appear as just another part of the scene with which the user can interact using the physical selection devices and corresponding virtual selection elements.

The following figures and descriptions will illustrate how a graphical interface for the virtual environment can be generated and displayed to the user. Next, various operations that can be performed by the graphical interface to interact with the virtual environment will be described in detail.

Figure 13:
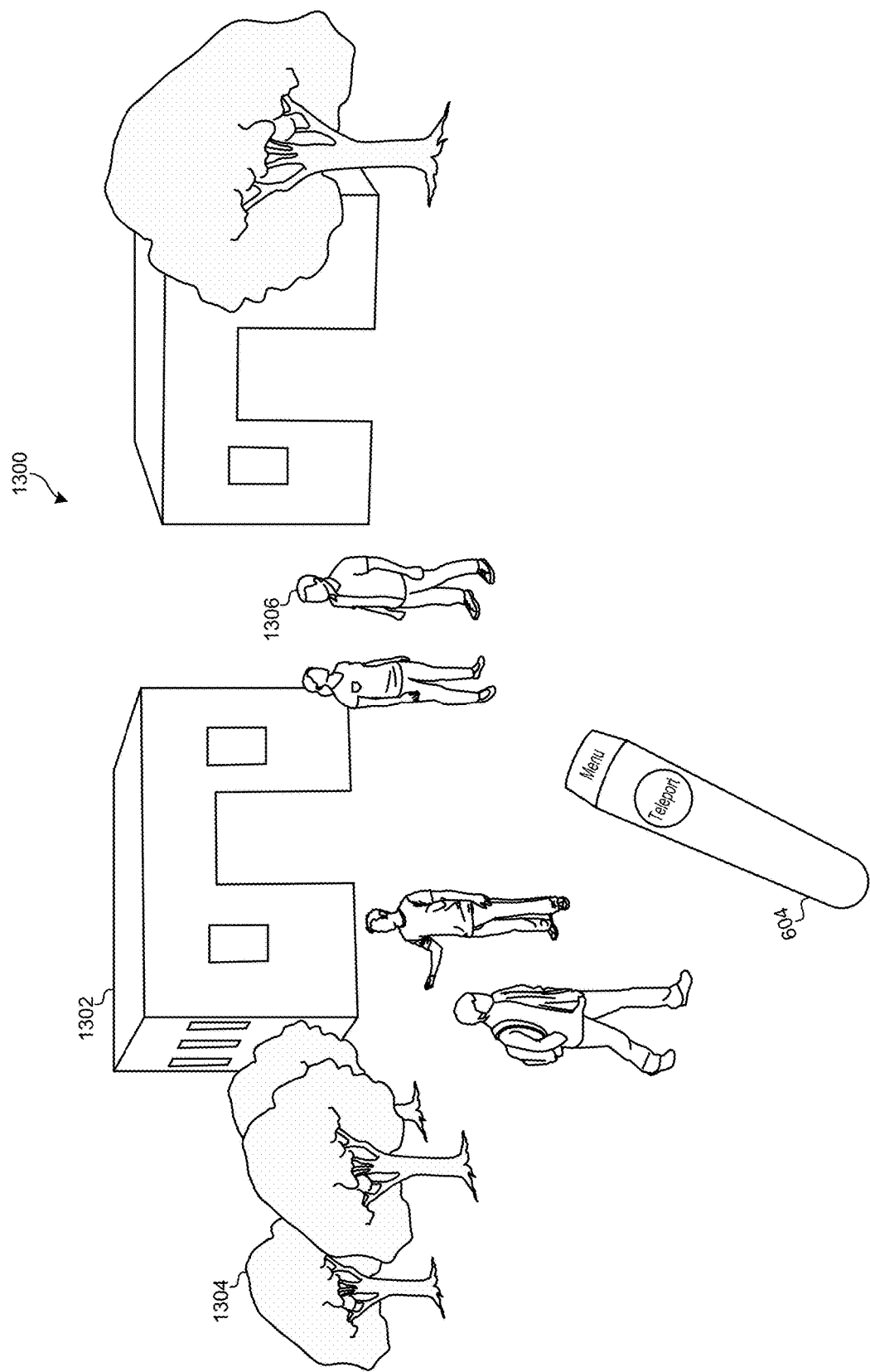
FIG. 13 illustrates a virtual environment where the user is scaled the same as other characters in the virtual scene, according to some embodiments.

FIG. 13 illustrates a virtual environment 1300 where the user is scaled the same as other characters in the virtual scene, according to some embodiments. The virtual camera (not shown) by which this view of the virtual scene was rendered is positioned in the virtual scene according to the height of a mobile device or head of the user in the real-world environment. For example, the virtual camera may be hovering in the virtual scene approximately 5½ feet off of the ground at normal head height. Thus, the user will view the virtual environment 1300 from their normal height. Additionally, in the real-world environment, the user may be holding the selection device out in front of them. Consequently, the view of the virtual environment 1300 may include a rendering of a virtual selection element 604 out in front of the view of the user so that when the user moves the selection device in the real-world environment, the virtual selection element 604 will move in a corresponding fashion in their view of the virtual environment 1300.

In addition to virtual characters 1306, the virtual environment 1300 may also include other objects and scene elements with which the user can interact. Although not shown explicitly, each of the virtual characters 1306 may include one or more selection shapes as described above. In addition to the virtual characters 1306, the virtual environment 1300 may include trees 1304, bushes, pavement, walls, buildings 1302, grass, sky, weather effects, lighting effects, light sources, and so forth. In short, virtual environments of unbounded complexity can be generated and displayed to the user on the mobile device.

In complicated scenes such as that of virtual environment 1300, it may be time-consuming and difficult for a user to manipulate various scene elements on a large scale. For example, moving a large group of trees 1304 or buildings 1302 may be difficult from the perspective of the user shown in FIG. 13. Because the view of the virtual scene 1300 is rendered from a human perspective, it may be difficult for that human perspective to see the "big picture" or large-scale view of the virtual environment 1300. It may also be difficult to select more than one object or character in the virtual scene 1300 to move together from the human perspective.

Figure 14:
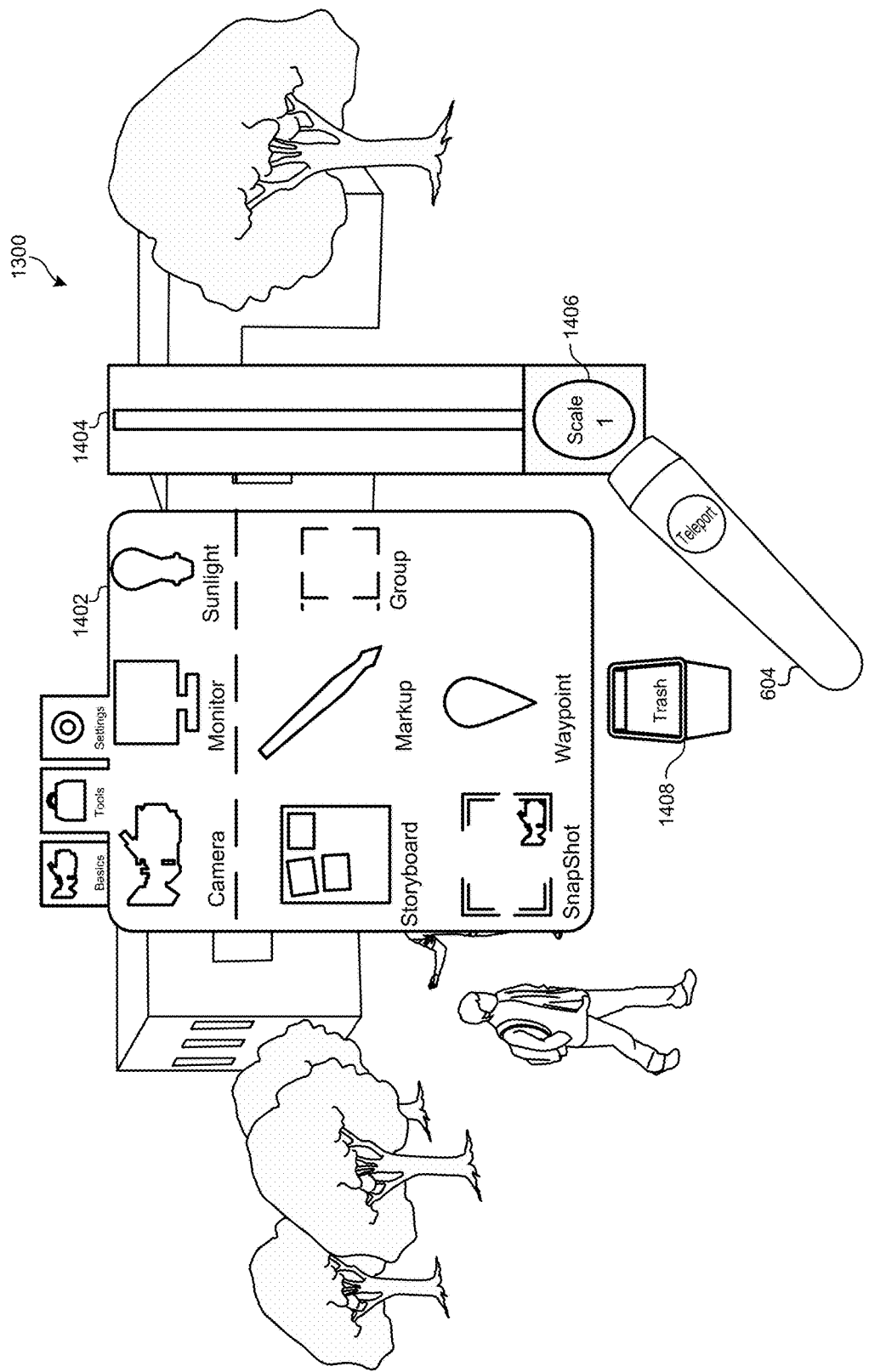
FIG. 14 illustrates a graphical interface that can be generated as part of the virtual environment, according to some embodiments.

In order to facilitate the movement of large objects or a large number of objects, the graphical interface can be summoned to affect the perspective and other attributes of the virtual environment 1300. FIG. 14 illustrates a graphical interface 1402 that can be generated as part of the virtual environment 1300, according to some embodiments. Graphical interface 1402 may be comprised of a menu panel with tabs and/or icons that provide various functions that alter the experience or structure of the virtual environment 1300. The graphical interface 1402 two may be comprised of multiple pieces, such as the menu panel, a scale track 1404, a scale slider 1406, a trash 1408, and so forth. These multiple pieces need not be connected in a continuous fashion, but may instead be rendered as separate objects that move and function together. Some embodiments may have a button or other control on the selection device that allows the graphical interface 1402 to be generated in the virtual environment 1300 and rendered for the view of the user on the mobile device. For example, pressing a "menu" button on the selection device can cause the rendering system to load the model of the graphical interface 1402 into the virtual scene 1300.

As a default, when the graphical interface 1402 is brought into the virtual environment 1300, it can be placed such that the user's view of the graphical interface 1402 matches that of FIG. 14. For example, the graphical interface 1402 can be placed approximately 3 virtual feet in front of the user's virtual camera position in the virtual environment 1300. The size of the graphical interface 1402 can be approximately 2×2 virtual feet square. This positioning makes the graphical interface 1402 easily readable by the user and within reach such that its functions can be easily activated without forcing the user to move their body from its current location. This size also allows the user to continue viewing most of the virtual scene without being obstructed by the view of the graphical interface 1402. Other embodiments may use different sizes based on the preferences of the user. For example, the system may automatically place the graphical interface 1402 higher in the virtual environment 1300 for users who are taller based on the determined height of the mobile device in the real-world environment. Because the graphical interface 1402 is a rendered object in the virtual environment 1300, the graphical interface 1402 itself can be selected and moved by the user. For example, if the user selects and activates a portion of the graphical interface 1402 that is not associated with a specific function (e.g., a portion of the graphical interface 1402 without a button), then the graphical interface 1402 itself can be moved in the same way that virtual characters removed using selection shapes.

The graphical interface 1402 may be a solid 3-D object in the virtual environment 1300 that is rendered by the rendering system. For example, just as the buildings 1302 in the virtual environment 1300 have a wire frame structure with textures, colors, and other 3-D model attributes, the graphical interface 1402 may be similarly constructed. Since the graphical interface 1402 is not simply pasted into the view of the user as part of the display, the graphical interface 1402 will be rendered as a part of the virtual environment 1300. For example, if the user were to rotate the mobile device to the right to pan away from the view depicted in FIG. 14, the graphical interface 1402 would remain in place in the virtual environment 1300, possibly being out of view after the rotation takes place. If the user were to then rotate the mobile device back to the left, the graphical interface 1402 would rotate back into view. In another example, the user could move forward in the real-world environment. This would cause the virtual camera capturing the view of FIG. 14 to also move forward in the virtual environment 1300. As the user moves forward, the user can walk past the graphical interface 1402 in the virtual environment 1300. The user could then turn around and see the backside of the graphical interface 1402 in the virtual environment 1300 (not shown). This sequence would not be possible if the graphical interface 1402 were simply part of the display and not part of the virtual environment 1300 itself.

As a rendered object, the graphical interface 1402 can receive interactions from the user using the virtual selection element 604 in the same way that the selection shapes for virtual characters receive interactions from the user as described above. In some embodiments, each of the menu items on the graphical interface 1402 may be raised, colored, or identified with a picture/texture that identifies and associated function. An area on the graphical interface 1402 associated with each function can receive input from the virtual selection element 604 as the user moves the selection device in the physical world in a corresponding fashion. For example, as the user moves their hand in the physical world, the virtual selection element 604 can move to the left as shown in FIG. 14. As the user extends their hand forward, the virtual selection element 604 can contact, intersect with, or come within a threshold distance of the scale slider 1406.

In some embodiments, each of the menu items, the trash 1408, the tabs, the scale slider 1406, etc., of the graphical interface 1402 may be considered selectable elements of the graphical interface 1402. Each selectable element can be selected and activated by the virtual selection element 604 in the same way that the selection shapes were selected and/or activated for virtual characters described above. For example, as the virtual selection element 604 selects the scale slider 1406, the scale slider 1406 can change color, translucence, and/or text to indicate that the scale slider 1406 has been selected. When the selectable elements are raised or stand out from the graphical interface 1402, some embodiments may change the color or translucence of the sides of the raised element (e.g., the sides of a button) such that the text on the top of the element is not altered. Selecting a selectable element can visually indicate to a user that an additional input would then activate the selectable element. In some embodiments, this may be important because the user may not know when they have extended the virtual selection element 604 far enough to select the scale slider 1406 or other selectable elements of the graphical interface 1402. Since there is no tactile response in the virtual environment 1300 when the virtual selection element 604 contacts the scale slider 1406, this function lets the user know when they have moved the virtual selection element 604 far enough.

To activate the selectable element of the graphical interface 1402, the user can provide a second input through the selection device. Activating the selectable elements of the graphical interface 1402 can then trigger the associated function of the corresponding selectable elements to alter some aspect of the virtual experience or virtual scene. For example, the second input may press and activate a button on the graphical interface 1402, and the associated function can be executed automatically. Some embodiments include selectable elements, such as the scale slider 1406, that can be moved rather than simply activated. Activating the scale slider 1406 can allow the scale slider 1406 to be moved up and down the scale track 1404. Continuously pressing a button on the selection device 1404 and moving the selection device up and down may correspondingly move the scale slider 1406 up and down in the virtual environment 1300. When the user releases the button on the selection device, the scale slider 1406 can be deactivated and stop moving, in the scale of the user view can be altered as described in detail below.

Other elements of the graphical interface 1402 may provide additional functionality. For example, some selectable elements may generate new objects to be generated and added to the graphical interface 1402 in the virtual environment 1300. For example, activating the trash 1408 can generate another panel or display that shows items that are in the trash. This new panel or display can be an additional rendered object in the virtual scene 1300 and displayed next to the menu of the graphical interface 1402. Conversely, activating and moving a character or object in the virtual environment 1300 to the trash 1408 can cause the character or object to be removed from the virtual environment 1300. This operation may remove the animation model of the character from the 3-D virtual scene in the rendering system such that the character is not rendered and viewed on the mobile device in the view depicted in FIG. 14.

Figure 15:
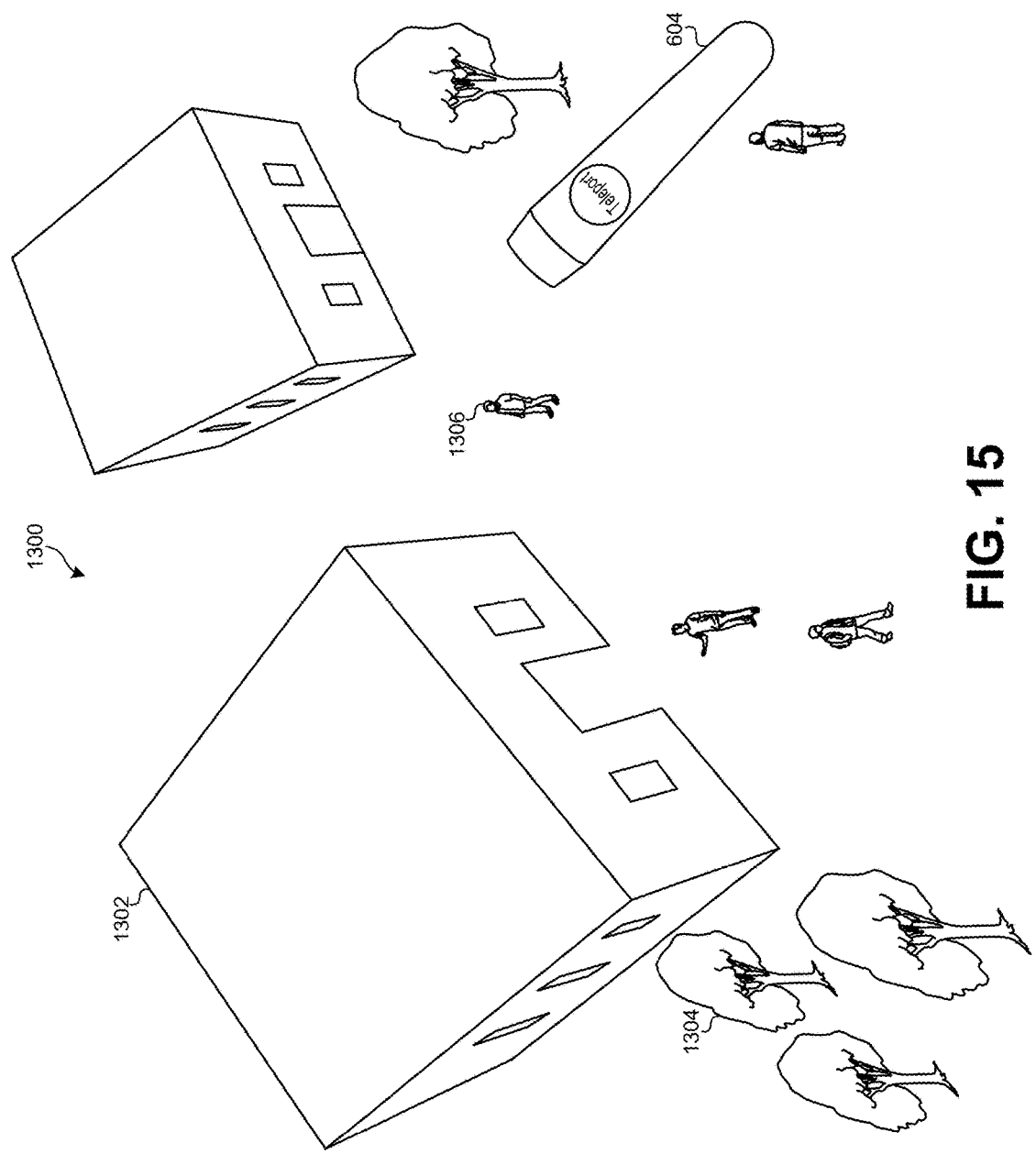
FIG. 15 illustrates a resulting view of the virtual environment after the user has activated and adjusted the scale slider from FIG. 14, according to some embodiments.

FIG. 15 illustrates a resulting view of the virtual environment 1300 after the user has activated and adjusted the scale slider 1406 from FIG. 14, according to some embodiments. The user is in the same virtual location as they were in FIG. 14, however their scale has been increased by a factor of approximately 6. In other words, the virtual height of the user has been increased such that the virtual camera is approximately 6 times higher in elevation than it was in FIG. 14. This allows the user to grow/shrink in order to either see a larger perspective of the virtual environment 1300 or to interact the smaller details of the virtual environment 1300. From the perspective of FIG. 15, the user can look down on the virtual environment 1300 and interact with objects on a larger scale. By scaling their own size—or the scale of the virtual camera corresponding to the location, the user can also increase the distance in the virtual environment 1300 that they travel when moving in the real-world environment.

For example, the user can change the scale of the virtual camera such that the virtual environment can appear very large. Put another way, the user can shrink the virtual camera such that it appears the user is an insect within the virtual environment. In this way, the user can examine detailed aspects of the environment. As another example, the user can change the scale of the virtual camera such that the virtual environment appears very small. Put another way, the user can enlarge the virtual camera such that it appears that the user is a giant within the virtual environment. In this way, the user can easily examine the entirety of the virtual environment. In one embodiment, the user can navigate the virtual environment according to or based on the camera's virtual size. For example, "smaller" virtual cameras may move slower or have smaller "steps" across the virtual environment. "Larger" virtual camera may move faster or have "larger steps" across the same virtual environment.

Figure 16:
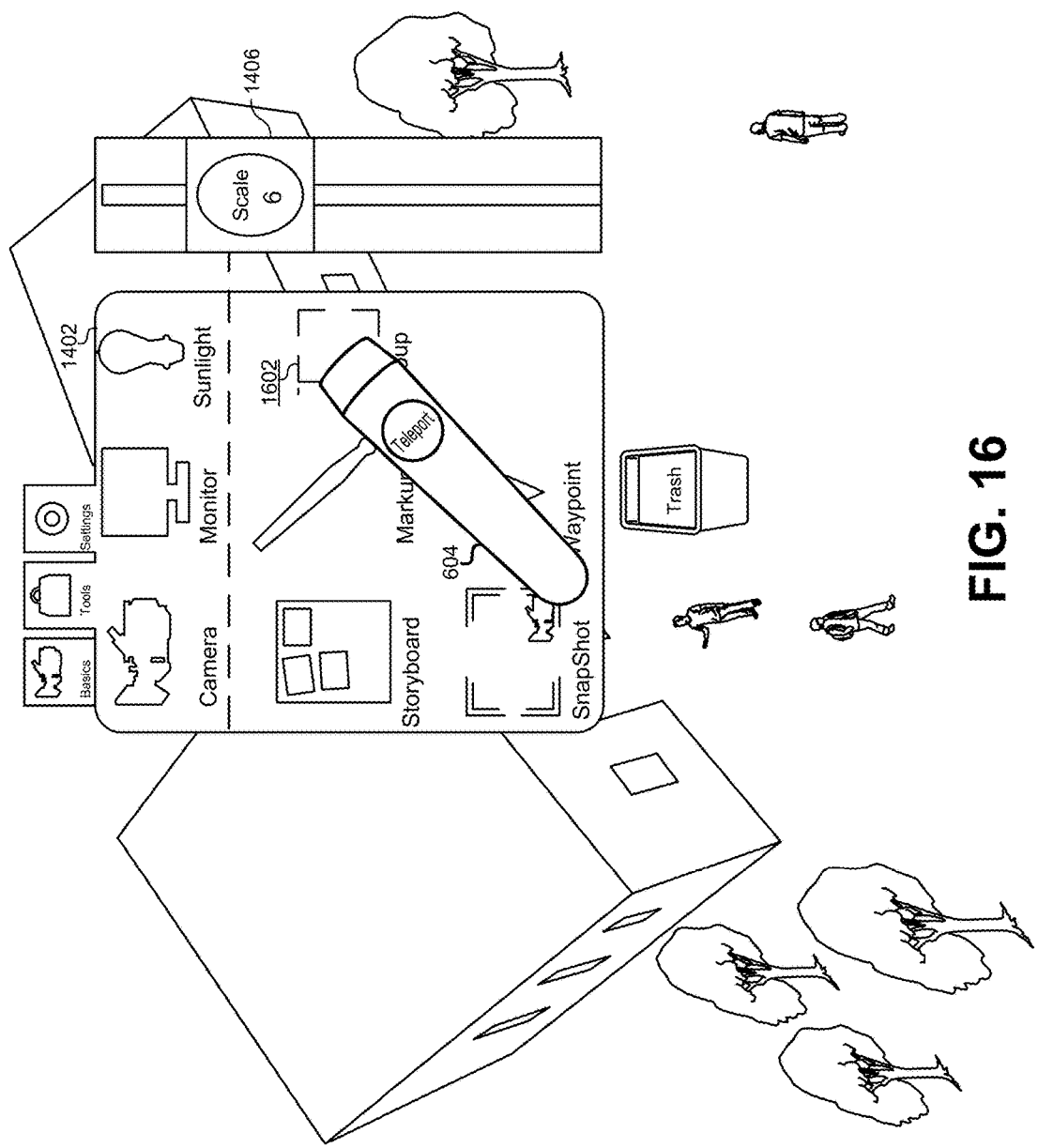
FIG. 16 illustrates how the graphical interface can scale with the user, according to some embodiments.

Note that the virtual selection element 604 has also grown in size to correspond to the increased size of the virtual user. Because the selection device will feel the same size in the user's hand in the real-world environment, the virtual selection element can also grow such that it is rendered to be a constant size from the perspective of the user as they scale their own size up and down. Similarly, the size of the graphical interface 1402 can scale to be proportional with the scaling of the user size. FIG. 16 illustrates how the graphical interface 1402 can scale with the user, according to some embodiments. Note that the size of the graphical interface 1402 from the perspective of the user is the same in FIG. 14 and FIG. 16. Thus, the size of the virtual object rendered by the rendering system for the graphical interface 1402 can grow in scale proportional to the growth of the user.

One of the many functions provided by the graphical interface 1402 is the ability to group select various objects and characters in the virtual scene 1300. While the user is scaled to be approximately 6 times their normal size, they are able to view more objects in the scene. Accordingly, they may wish to move groups of objects to make large changes to the scene layout. For example, a director can scale up to a larger size, then rearrange buildings 1302, trees 1304, characters 1306, and so forth, to organize the scene according to their liking. The user can also quickly duplicate existing groups of objects and/or characters to populate the virtual environment 1300 as described above in relation to FIG. 12.

Because the characters and objects may be so much smaller than the scaled user, it may be difficult to select/activate the selection shapes of the objects and/or characters as they look down on the scene below them. Instead of being forced to select, for example, the selection shape around the waist of the virtual characters, the user can instead group select any number of objects and/or character using the group control 1602 in the graphical interface 1402. FIG. 16 illustrates how the user can use the virtual selection element 604 to select the group control 1604 in the same way that the scale slider 1406 was selected/activated above. The group select function can be used at any scale.

Figure 17:
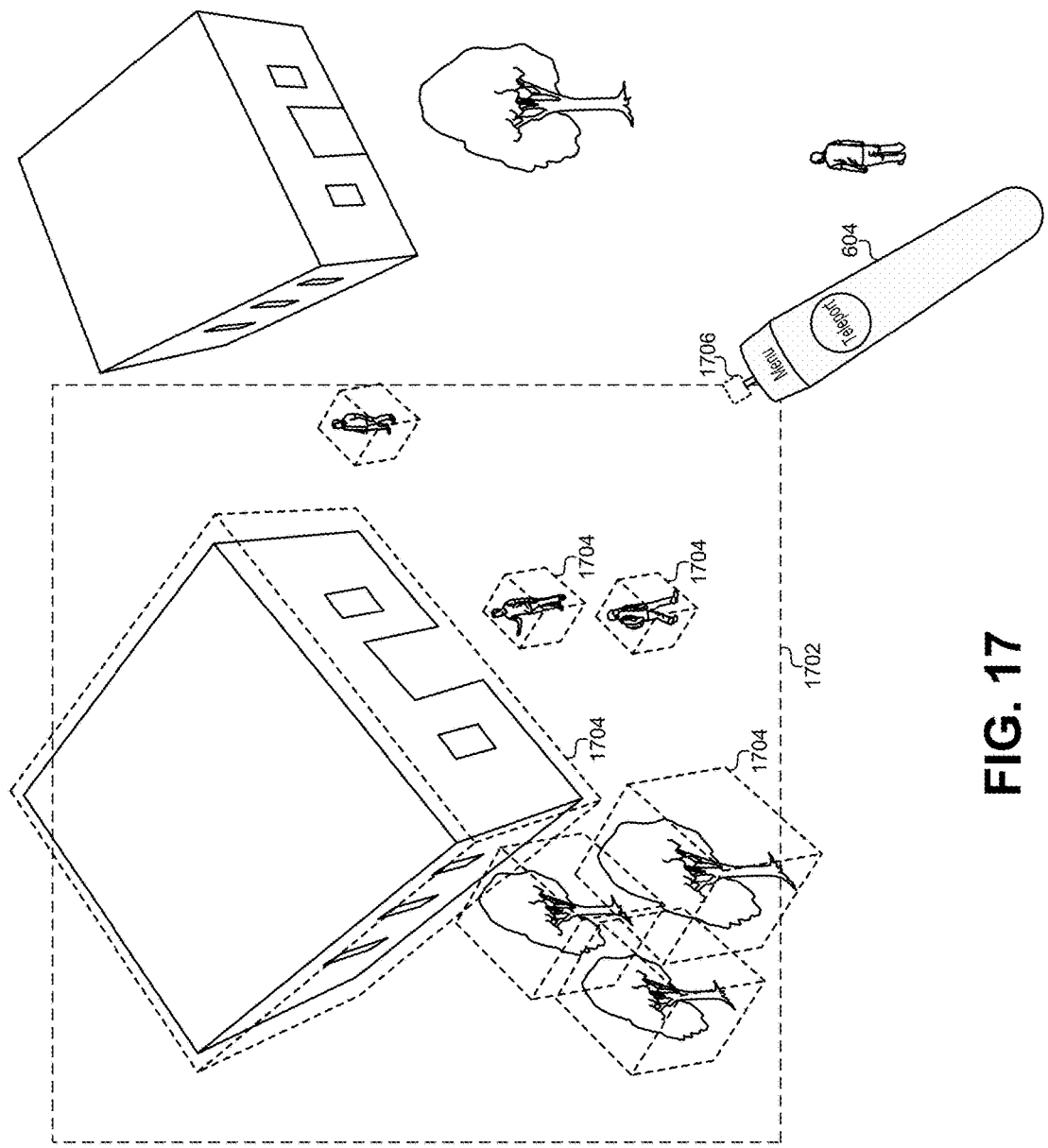
FIG. 17 illustrates how a group select function is used according to some embodiments.

FIG. 17 illustrates how a group select function is used according to some embodiments. After activating the group control 1602 in the graphical interface 1402, the group select function can be activated. In some embodiments, a visual extension can be added to the virtual selection element 604 to indicate which function is currently active. In this example, the dashed box associated with the group control 1602 from the graphical interface 1402 has been added to the end of the virtual selection element 604. This serves to visually remind the user that the group select function is currently active and will be operative when an input is provided through the selection device.

Instead of selecting individual selection shapes, the user can provide an input through the selection device, such as pressing a button or trigger on a controller or tapping a touchscreen and then dragging the virtual selection element 604 across each of the objects or characters in the virtual environment 1300 to be selected. A 2-D large selection box 1702 can be displayed to outline a rectangular area selected by the virtual selection element 604. For example, the upper left vertex of the selection box 1702 can be the starting point of the group select function, and the lower right vertex of the selection box 1702 can be a location to which the virtual selection element 604 is moved. As various objects or characters are encompassed or contacted by the selection box 1702, they can be selected and added to the group. This can be indicated by smaller selection boxes 1704 that are generated around each of the individual selected objects or characters that are selected by virtue of the large selection box 1702.

After the group select function is terminated by the user lifting their finger off the touchscreen or no longer pressing the button/trigger on the controller, the large selection box 1702 can disappear, and the smaller selection boxes 1704 can remain in the view of the virtual environment 1300. The smaller selection boxes 1704 can be inserted as graphic objects to be rendered by the rendering system for the view of the user depending on the perspective of the virtual camera. Thus, the group select function can add selection boxes to the underlying 3-D virtual scene in the rendering system. By selecting and activating any of the objects encompassed by the smaller selection boxes 1704, the user can drag-and-drop all of the selected objects or characters.

Figure 18:
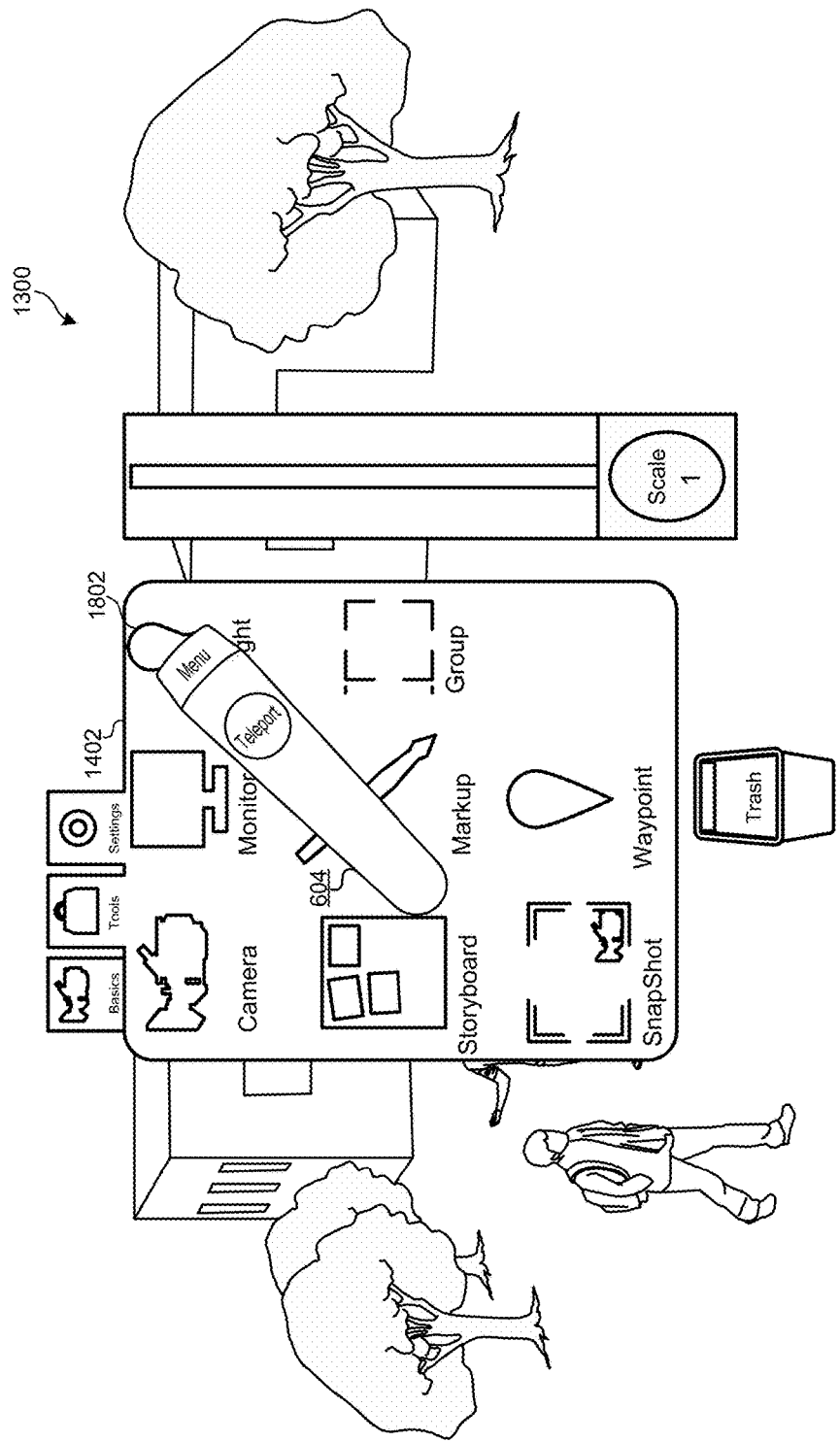
FIG. 18 illustrates a lighting function of the graphical interface, according to some embodiments.
Figure 19:
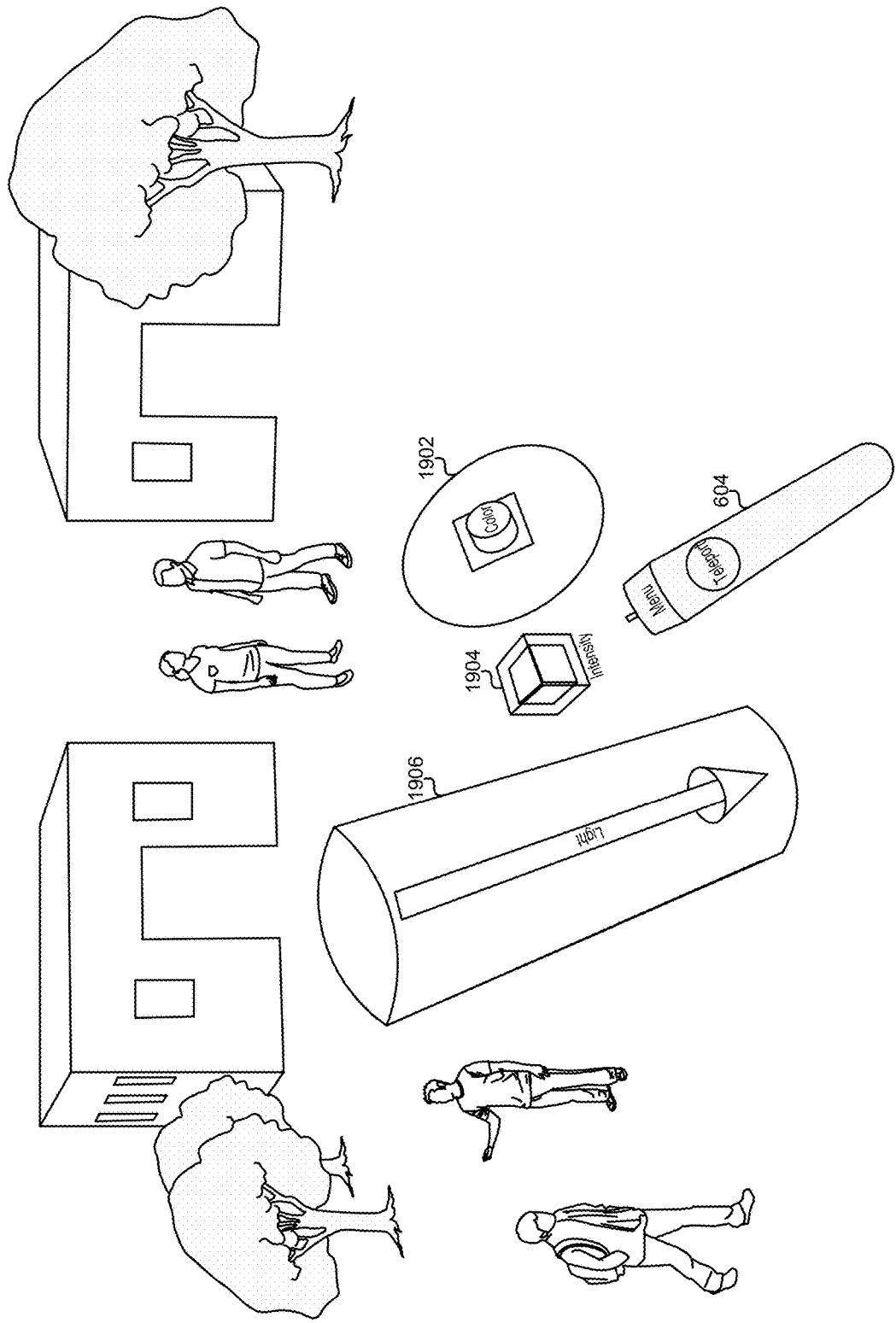
FIG. 19 illustrates a set of light controls, according to some embodiments.

FIG. 18 illustrates a lighting function of the graphical interface 1402, according to some embodiments. As described above, the graphical interface 1402 includes a number of different menu options, including a selectable element for a light control 1802. By selecting and activating the light control 1802 with the virtual selection element 604, the user can instantiate a set of controls for creating and/or manipulating various light sources in the virtual environment. FIG. 19 illustrates a set of light controls, according to some embodiments. Each of the set of light controls may be selected and adjusted using the virtual selection element. As with other visual elements of the graphical interface 1402, the set of light controls may be instantiated as actual 3-D objects in the virtual environment to be rendered by the rendering system. Thus, the user can interact with the user interface controls as part of the virtual environment in the same way that the user interacts with other virtual characters and/or objects.

The set of light controls may include a color picker 1902. By selecting and activating the color picker 1902 using the virtual selection element 604, the user can generate a color palette or other color selection menu interface to choose the type of light being displayed. Different light selection options may include white light, natural light, sunlight, lamps, light bulbs, LEDs, and so forth. The color picker 1902 may also include a color palette that allows the user to fine-tune any light source regardless of type. In some embodiments, the color palette may be restricted to a range of colors that are appropriate for a selected light source. For example, a color palette corresponding to sunlight may include colors ranging from white light to a red sunset.

The set of light controls may also include an intensity control 1904. The intensity control 1904 can be used to control the intensity of any light source in the virtual environment. In some embodiments, the intensity control 1904 can use a luminosity function to control the measure of virtual light energy emitted from the light source in the virtual scene. In some embodiments, a user can interact with the second device to place one or more light sources into the 3-D virtual environment. The user can also specify the intensity, color, spread, and/or direction of each light source. The light source can then interact with the objects to brighten the objects, create shadows, etc.

The set of light controls may also include a position control 1906 that can be used to control the position of a light source. While the position control 1906 can be used to control the location of any light source, such as a light bulb, a streetlight, computer screen, and/or the like, the position control 1906 may be particularly useful in controlling the position of a sunlight source in the virtual scene. FIG. 20A illustrates how the position control 1906 can be used to adjust the position of a sunlight source 2002 in the sky of the virtual environment, according to some embodiments. Using the virtual selection element 604, the user can select and activate position control 1906. Subsequent movements of the virtual selection element 604 can rotate the position control 1906 about a center point of the position control 1906. A directional indicator 2006 in the position control 1906 can indicate a primary direction of the sunlight source 2002. For example, the light source 2002 in FIG. 20A may have a primary direction at the center point of the position control 1906 that is collinear with the directional indicator 2006.

When the user rotates the position control 1906 about its center point using the virtual selection element 604, the position of the sunlight source 2002 in the sky the virtual environment can change. FIG. 20B illustrates how the sunlight source 2002 can be adjusted using the position control 1906, according to some embodiments. In FIG. 20A, the sunlight source 2002 is at approximately a 2 o'clock position in the sky. As the user rotates the position control 1906 downward by lowering the virtual selection element 604, the position of the sunlight source 2002 can change accordingly by moving to approximately a 3 o'clock position in the sky on the horizon of the virtual environment. In some embodiments, the sunlight source 2002 can be locked into a circular orbit in the sky of the virtual environment such that changes to the position of the sunlight source 2002 are maintained in an East-West track. In other embodiments, the sunlight source 2002 can be freely rotated throughout the sky of the virtual environment. This allows a director to position the sunlight source 2002 in the background of various scenes, or to alternatively shine sunlight light directly on the faces of various virtual characters in the virtual environment.

In some embodiments, moving the sunlight source 2002 throughout the sky of the virtual environment can automatically change the color of the sunlight source 2002 as well as the color of the surrounding sky. For example, when the sunlight source 2002 is that the 2 o'clock position in FIG. 20A, the sunlight source can appear as yellow or white light. Consequently, the sky of the virtual environment can appear blue. When the user moves the sunlight source 2002 down to the 3 o'clock position in FIG. 20B, the sunlight source 2002 on the surrounding sky can change to appear more like a sunset environment. For example, the sunlight source 2002 can change from a white or yellow light to a red or orange light. The surrounding sky can similarly turn red or orange, and may include other visual effects 2004, such as hazing or light rays that would normally accompany a sunset. In some embodiments, the size of the sunlight source 2002 can also automatically change based on its position in the sky as manipulated by the position control 1906. For example, the sunlight source 2002 in FIG. 20A can be relatively small in the sky of the virtual environment. In contrast, when the sunlight source 2002 is lowered to the horizon in FIG. 20B, the sunlight source 2002 can grow in size to model the refraction of sunset light by the Earth's atmosphere in the real-world environment.

Figure 21:
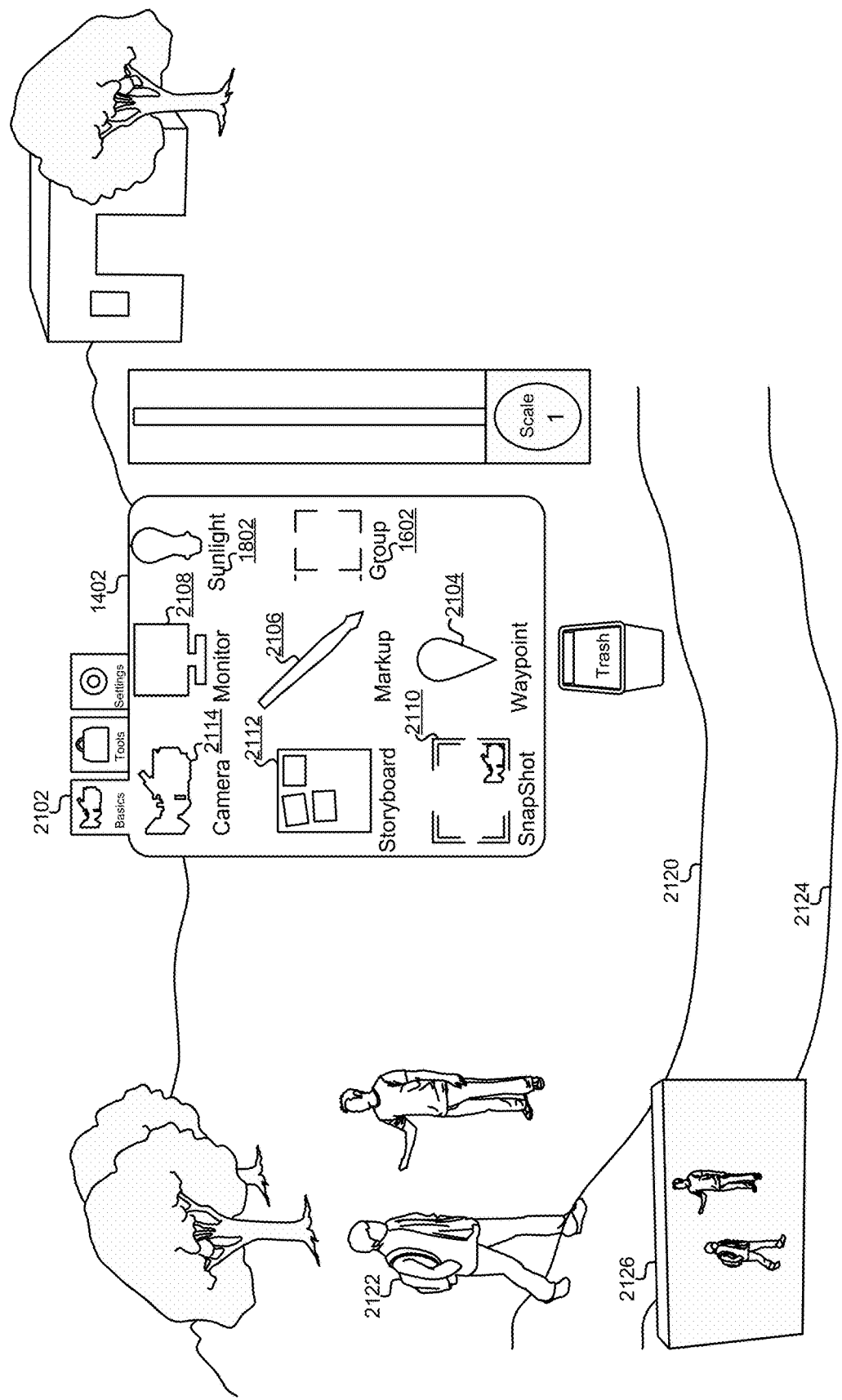
FIG. 21 illustrates a view of the graphical interface with a plurality of different selectable elements, according to some embodiments.

FIG. 21 illustrates a view of the graphical interface 1402 with a plurality of different selectable elements, according to some embodiments. The light control 1802 and the group select control 1602 have been described above. A number of different functions are also available in a "basic" tab 2102 of the interface. These functions include a camera control 2114 for placing virtual cameras in the virtual environment, a storyboard control 2112 for building a digital storyboard of snapshots from the virtual environment, a snapshot control 2110 for capturing snapshots of the virtual environment, a markup control 2106 for marking the virtual environment using a virtual pen or other marking element, and a monitor control 2108 for placing virtual video monitors in the virtual environment. Each of these controls 2106, 2108, 2110, 2112, 2114 will be discussed with their associated functions in greater detail below.

The graphical interface 1402 also includes a waypoint control 2104. As described above, virtual characters and/or objects can be selected and manipulated in the virtual environment using their associated selection shapes. Sequences of movements can be recorded and captured as an animation that can be played during the user experience in the virtual environment. For example, a virtual character can be "puppeted" by a user using the selection shapes to walk across a portion of the virtual environment. Other characters can also be programmed or controlled to move in the virtual environment in a similar fashion. When a director enters the virtual environment to observe a scene before final filming or rendering, the director can watch the scene play out in the virtual environment to make sure that everything is in its proper place and captured from the right perspective of the virtual cameras before actually shooting the scene.

The waypoint control 2104 can be used to drop waypoints in the virtual scene for various objects and/or virtual characters. For example, the director can select and activate the waypoint control 2104 to drop a plurality of waypoints in the virtual scene using the virtual selection element. These waypoints can be associated with a particular virtual character, and the virtual character can then be automatically assigned to travel between the waypoints at a given speed.

Using the waypoint control simplifies the process of creating paths or animations for virtual characters.

In some embodiments, the waypoint control 2104 can be used to draw a path in the virtual environment along which objects or virtual characters can travel. For example, after selecting either the waypoint control 2104 or the markup control 2106, the user can draw a spline curve 2120 in the virtual scene. This spline curve 2120 can be added to the rendered environment so that it is visible to the user. Virtual character 2122 can be assigned to the spline curve 2120 such that the virtual character 2112 walks in an animated fashion in a path corresponding to the spline curve 2120. Objects can also be attached to the spline curve 2120, such as spaceships, helicopters, airplanes, motorcycles, and so forth.

In addition to connecting virtual characters and/or objects to the spline curve 2120, virtual cameras can also be attached to the spline curve 2120 and have their movement guided and/or restricted by the spline curve 2120. For example, the virtual camera 2126 can be added to the virtual environment using the camera control 2114. As will be described below, the virtual camera 2126 can be visualized as a small screen that shows what would be seen on a virtual camera in that position. The image captured by the virtual camera can be displayed on the small screen in real time. The virtual camera 2126 can be attached to a second spline curve 2124, and the virtual camera 2126 can move along the spline curve 2124 as the virtual character 2122 moves along its spline curve 2120. Thus, a director can not only see how a scene will play out in an animated fashion, but they can also view how the scene will be recorded by a camera by watching the display of the virtual camera 2126. This allows directors to not only model and perfect the elements of the virtual environment for the scene, but also to experiment with different camera angles, positions, and/or settings. Using spline curves and virtual cameras can also be useful in simulating how a camera can capture a scene from a dolly or other restricted path in the real-world environment. Some virtual environments may be modeled after real-world environments where camera movements may be restricted by harnesses, tracks, dollies, or other mechanical devices. The effect of these devices in the real-world environment can be modeled in the virtual environment by attaching virtual cameras to different paths, such as spline curves 2120, 2124.

Figure 22:
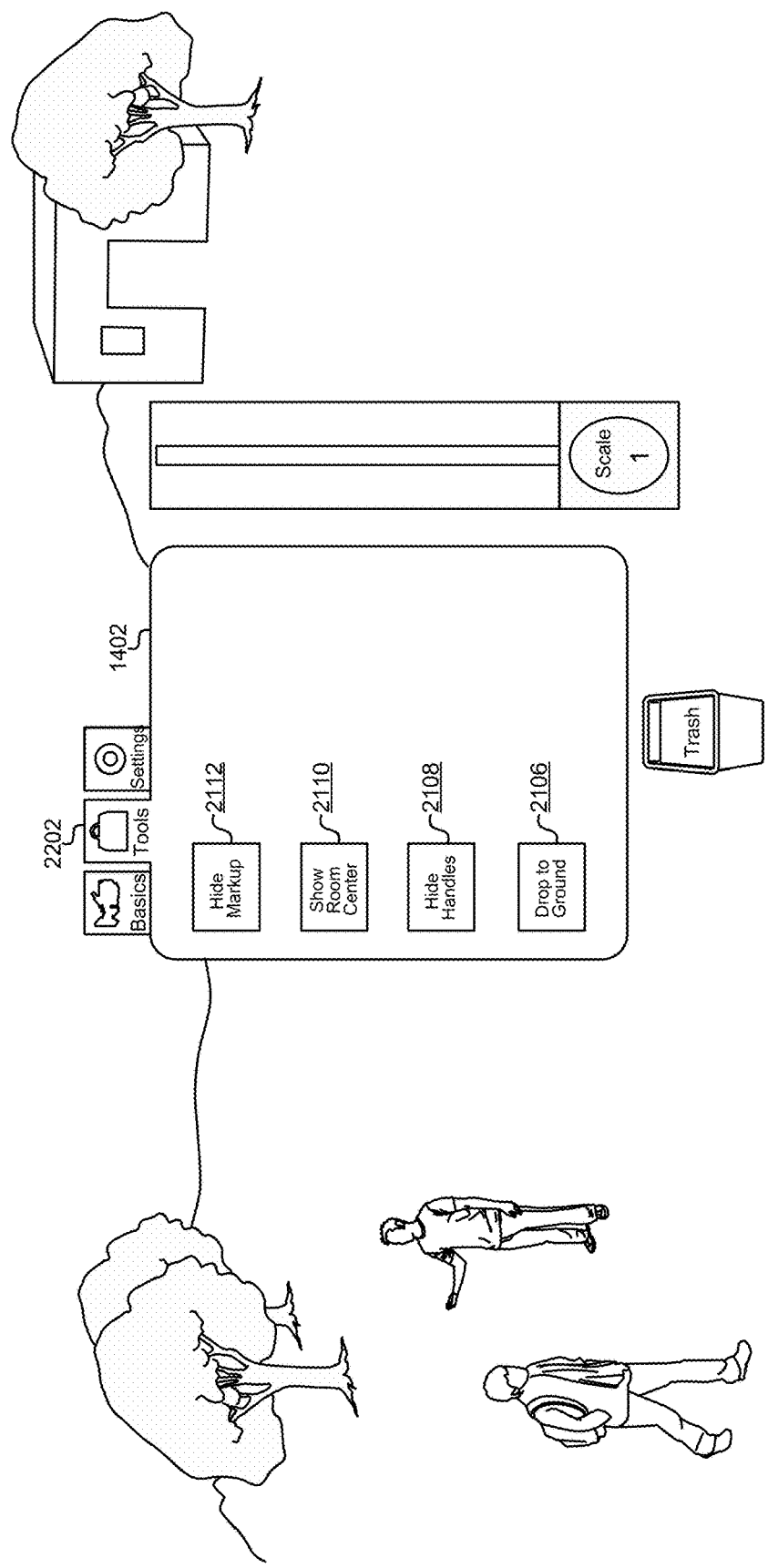
FIG. 22 illustrates a view of the graphical interface with a plurality of different selectable elements on a second tab, according to some embodiments.

FIG. 22 illustrates a view of the graphical interface 1402 with a plurality of different selectable elements on a second tab, according to some embodiments. These additional controls with their associated selectable visual elements on the graphical display 1402 can be rendered in the virtual environment when the "tools" tab 2202 is selected on the graphical display 1402. While the controls on the "basics" tab 2102 may be used frequently while exploring and manipulating a virtual environment, the controls in the tools tab 2202 may be used less frequently. These controls include a hide markup control 2112 that can hide markup graphics from the virtual environment. As will be described in detail below, the markup control 2106 can be used to draw paths, splines, and/or the like in the virtual scene. A color tagger control 2106 described below can also be used to color and select various objects and/or virtual characters in the scene. The hide markup control 2112 can hide the various effects of the markup control 2106 and the color tagger control so that the scene appears clean without actually deleting the markups.

The show room center control 2110 can be used to immediately orient the view of the virtual camera corresponding to the user such that the center of the virtual environment visible. In some embodiments, the show room center control may alternatively immediately transport the user's virtual camera to the center of the virtual environment. This provides a function by which the user can quickly return to a starting location after exploring the virtual environment.

The hide handles control 2108 can hide various selectable elements in the virtual environment. For example, the hide handles control 2108 can toggle the display of the selection shapes associated with various virtual characters. The hide handles control 2108 can also hide other controls or graphical artifacts that are inserted into the scene to manipulate the scene, but which are not part of the scene itself. For example, a virtual object, control, menu, and/or effect that is added to the virtual environment and rendered such that it is seen by the virtual camera but not meant to be part of the final scene can be hidden by the hide handles control 2108.

The drop to ground control 2106 can be used to immediately scale the size of the user and their associated virtual camera back to a ground level or default value. For example, if the user scales up their size to approximately 10 times their normal height, they can manipulate large objects in the scene and select large groups of objects to be rearranged in the virtual environment. By selecting and activating the drop to ground control 2106, the user size can be automatically scaled back down to an original scale (e.g., "1") without requiring the manual use of the scale control described above.

Figure 23:
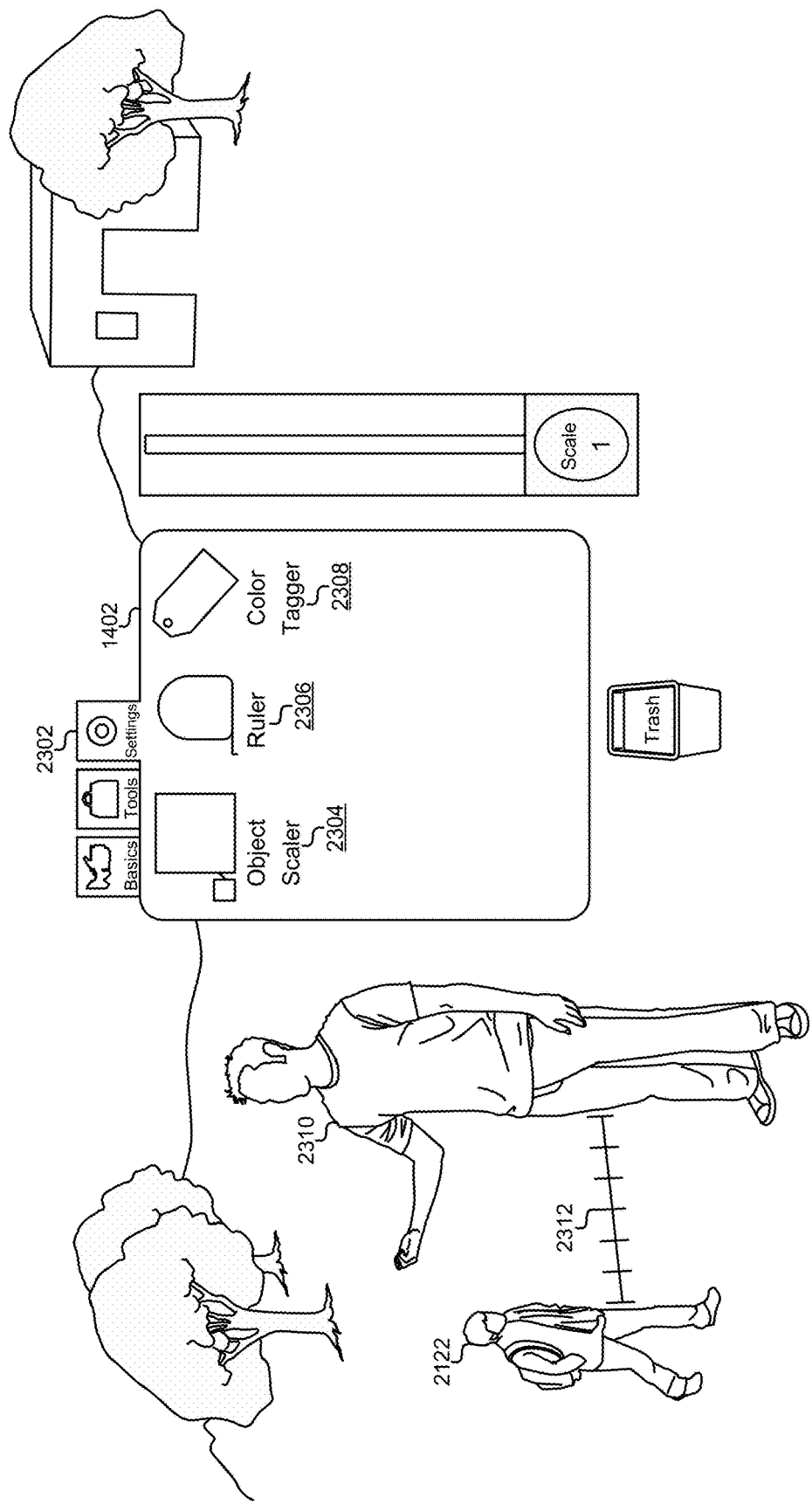
FIG. 23 illustrates a view of the graphical interface with a plurality of different selectable elements on a third tab, according to some embodiments.

FIG. 23 illustrates a view of the graphical interface 1402 with a plurality of different selectable elements on a third tab, according to some embodiments. These additional controls with their associated selectable visual elements on the graphical display 1402 can be rendered in the virtual environment when the "settings" tab 2302 is selected on the graphical display 1402. The settings tab 2302 may include various functions, such as an object scaler control 2304. The object scaler control 2304 can be used to scale the size of objects and/or virtual characters in the virtual environment in the same manner as the scale control on the graphical interface 1402 can be used to scale the size of the user. For example, when the object scaler control 2304 is selected and activated, the user can then select virtual character 2310 using the virtual selection element. Character 2310 can then be scaled up or down. This operation may correspond to an actual change in size and the underlying animation model of character 2310, resulting in a rendered visualization that is larger/smaller than its original.

The settings tab 2302 may also include a ruler control 2306 that can be used to measure distances between points in the virtual environment. After the ruler control 2306 is selected and activated by the virtual selection element, the user can use the virtual selection element to measure a distance between two points. The virtual selection element can emit a ray that can intersect with an object in the virtual environment towards which the virtual selection element is pointed. Pointing at a first element and providing input on the selection device can begin the ruler operation. The first point in the measurement operation can be a point in the 3-D space where the ray emitted by the virtual selection element intersects with an object in the virtual environment. Pointing at a second element and providing a second input on the selection device can end the ruler operation at a point where the ray intersects with a second surface in the virtual environment. Between the beginning and the end of the ruler operation, a virtual ruler 2312 can be rendered and displayed in the virtual environment between the two points. For example, in FIG. 23, the user can select a point on virtual character 2122 to begin the ruler operation, and then select a point on virtual character 2310 to end the ruler operation. Virtual ruler 2312 can be rendered, displayed, and animated in real-time as the virtual selection element moves between virtual character 2122 and virtual character 2310 in the view of the user.

The settings tab 2302 may also include a color tagger control 2308 for tagging various objects and/or virtual characters in the virtual environment with different colors. This operation will be described in greater detail below in FIGS. 29A-B.

Figure 24:
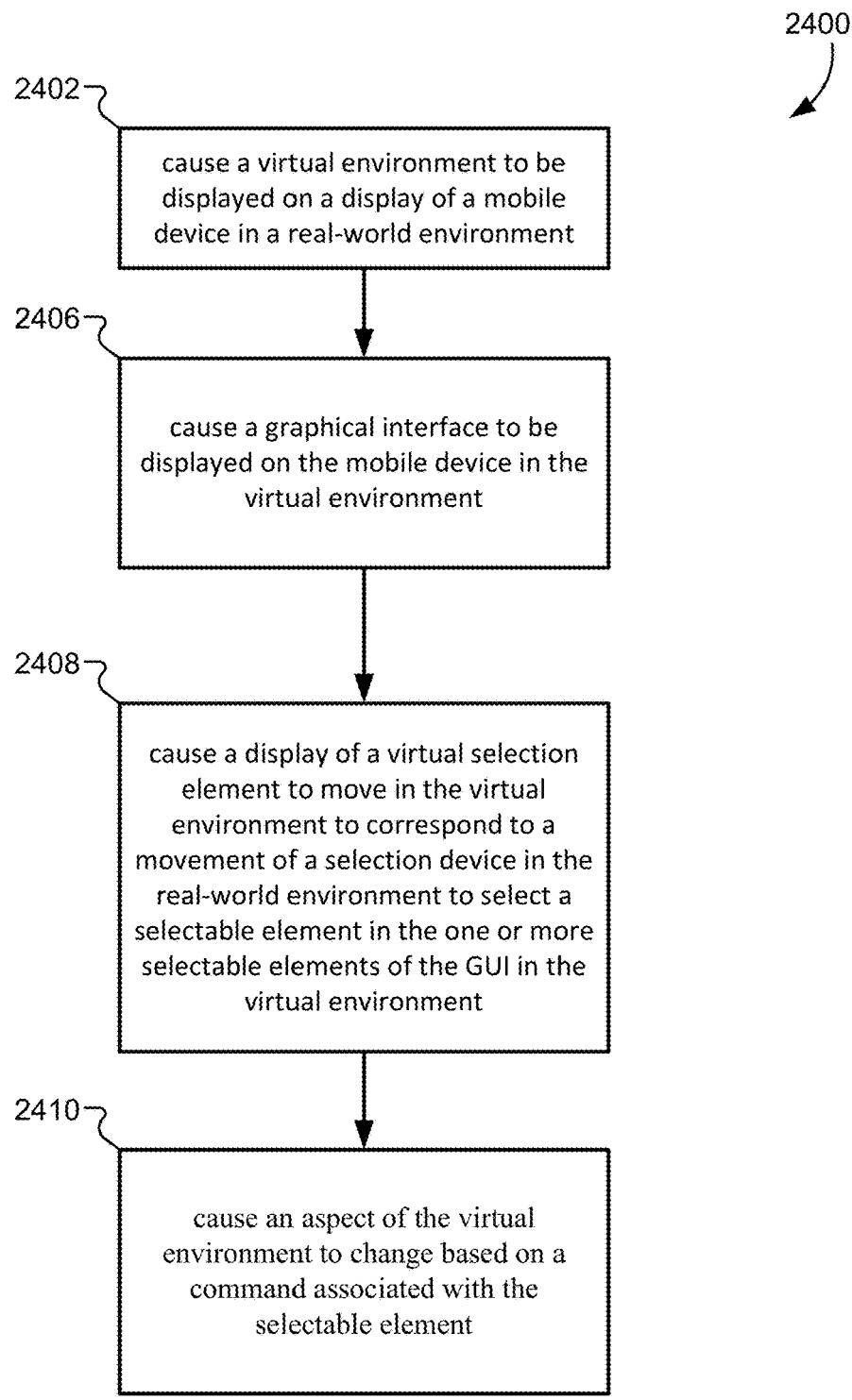
FIG. 24 illustrates a flowchart of a method for interacting with a graphic interface in a virtual environment, according to some embodiments.

FIG. 24 illustrates a flowchart of a method for interacting with a graphic interface in a virtual environment, according to some embodiments. The method may include causing a virtual environment to be displayed on a display of a mobile device in a real-world environment (2402). As described above in reference to FIG. 11, the mobile device may include VR goggles, AR goggles, a smart phone, a tablet device, a television screen, and so forth. The method may also include causing a graphical interface to be displayed on the mobile device in the virtual environment (2406). The graphical interface may be rendered as part of the virtual environment such that the user can interact with the graphical interface in the same way that the user interacts with other elements of the virtual environment, such as virtual characters and/or objects. The graphical interface may include one or more selectable elements, such as menu items. Each of the one or more selectable elements may have a corresponding function associated therewith. The corresponding function can alter some aspect of the virtual environment.

The method may additionally include causing a display of a virtual selection element to move in the virtual environment to correspond to a movement of a selection device in the real-world environment to activate a selectable element in the one or more selectable elements of the graphical interface in the virtual environment (2408). As described above, movement of the selection device in the real-world environment can cause corresponding movements to a visual representation of a virtual selection element in the virtual environment. The selectable element of the graphical interface may include a menu item, and the selectable element may be selected by moving the virtual selection element in the virtual environment to come within a threshold distance or intersect with the selectable element. Selecting the selectable element with the virtual selection element may cause at least a portion of the selectable element to change color, appearance, translucence, and/or the like. After selecting the selectable element, the selectable element may be activated by receiving a second input from the selection device.

The method may further include causing an aspect of the virtual environment to change based on a command associated with the selectable element (2410). Activating the selectable element may cause the system to retrieve a series of instructions that alter one or more aspects of the virtual environment. For example, the function may include scaling the user or virtual camera associated with the user, activating a group select function, generating a new virtual camera view, placing a video screen in the virtual environment, activating a markup tool, and so forth.

It should be appreciated that the specific steps illustrated in FIG. 24 provide particular methods of interacting with a graphic interface in a virtual environment according to various embodiments of the present invention. Other sequences of steps may also be performed according to alternative embodiments. For example, alternative embodiments of the present invention may perform the steps outlined above in a different order. Moreover, the individual steps illustrated in FIG. 24 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 25:
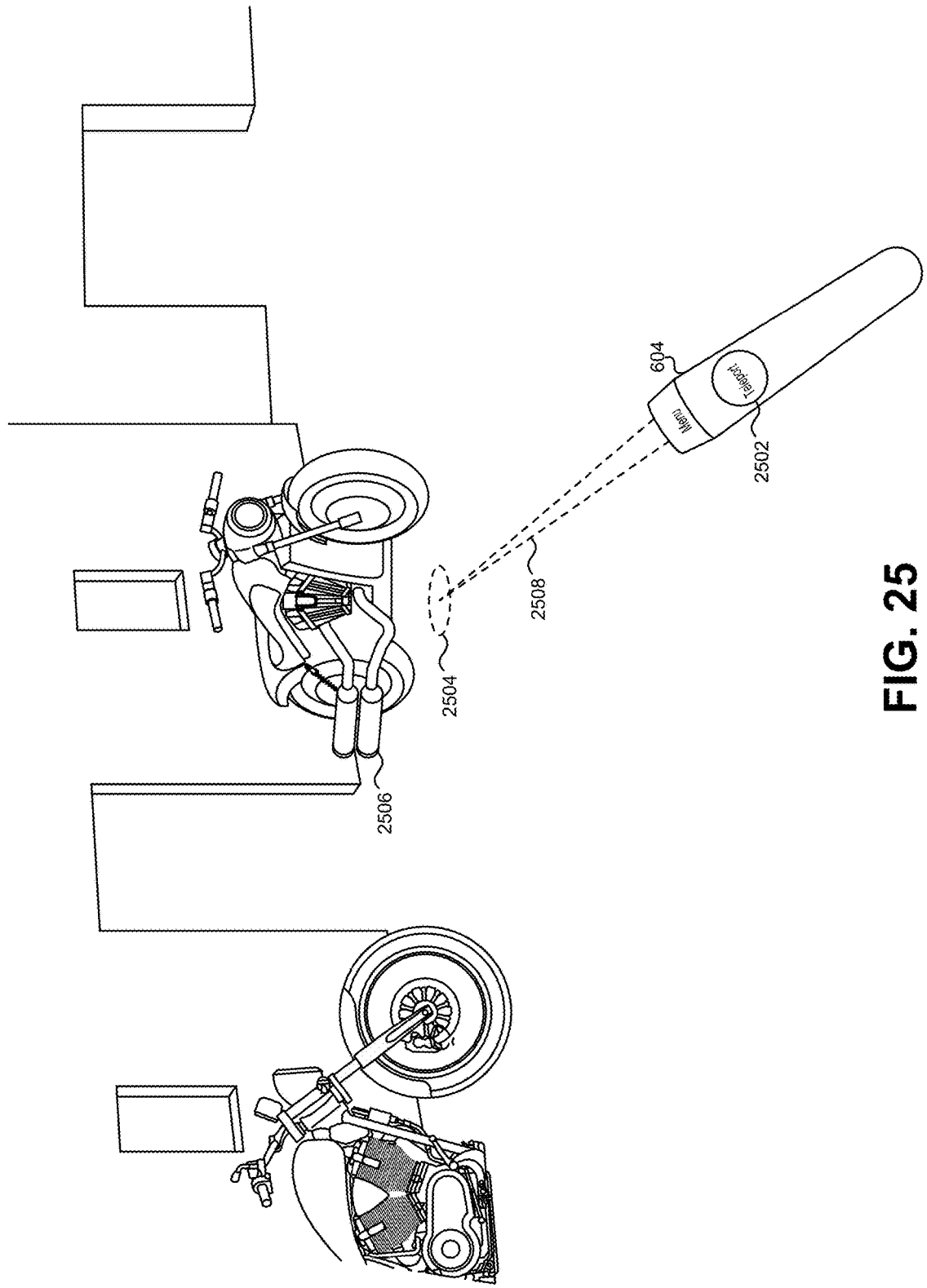
FIG. 25 illustrates how a virtual selection element can be used to transport a user into different virtual locations in the virtual environment, according to some embodiments.

FIG. 25 illustrates how a virtual selection element can be used to transport a user into different virtual locations in the virtual environment, according to some embodiments. Virtual environments may be very large and expansive, particularly for interactive experiences such as video games or content generation for feature films. Many times, the real-world environment in which the user will handle the mobile device and use the selection device will be much smaller than the virtual environment. For example, the real-world environment may take place in a studio, a living room, or on an indoor movie set. Each of these locations may be much smaller than the corresponding virtual environment in which the user will participate. Therefore, the user cannot simply walk around the real-world environment and still be able to explore the virtual environment in its entirety—the user's movement in the real-world environment would be restricted long before the corresponding movement in the virtual environment would be.

To solve this and other problems, some embodiments described herein provide a teleport function that can rapidly transport users to different locations in the virtual world within a line of sight. For example, for the user to move directly in front of the motorcycle 2506 in FIG. 25, the user would have to walk in the real-world environment approximately 15 feet forward. This real-world movement would move the user's virtual location in front of the motorcycle 2506. However, assuming that the real-world environment is less than 15 feet, this movement would not be physically possible. Instead, the user can point the selection device such that the virtual selection element 604 in the virtual environment is aimed at the ground in front of the motorcycle 2506. For example, the user can depress a teleport button 2502 on the selection device, and in response, the virtual selection element 604 can emit a visible ray 2508 out of the front of the virtual selection element 604. The user can aim the ray 2508 at a location 2504 to which they wish to teleport. Some embodiments may display a visible target at the location 2504 indicating that it is a valid location to which the user can move. Some embodiments can remove the visible target when the virtual selection element is aimed at an invalid location to which the user is not allowed to move.

Figure 26:
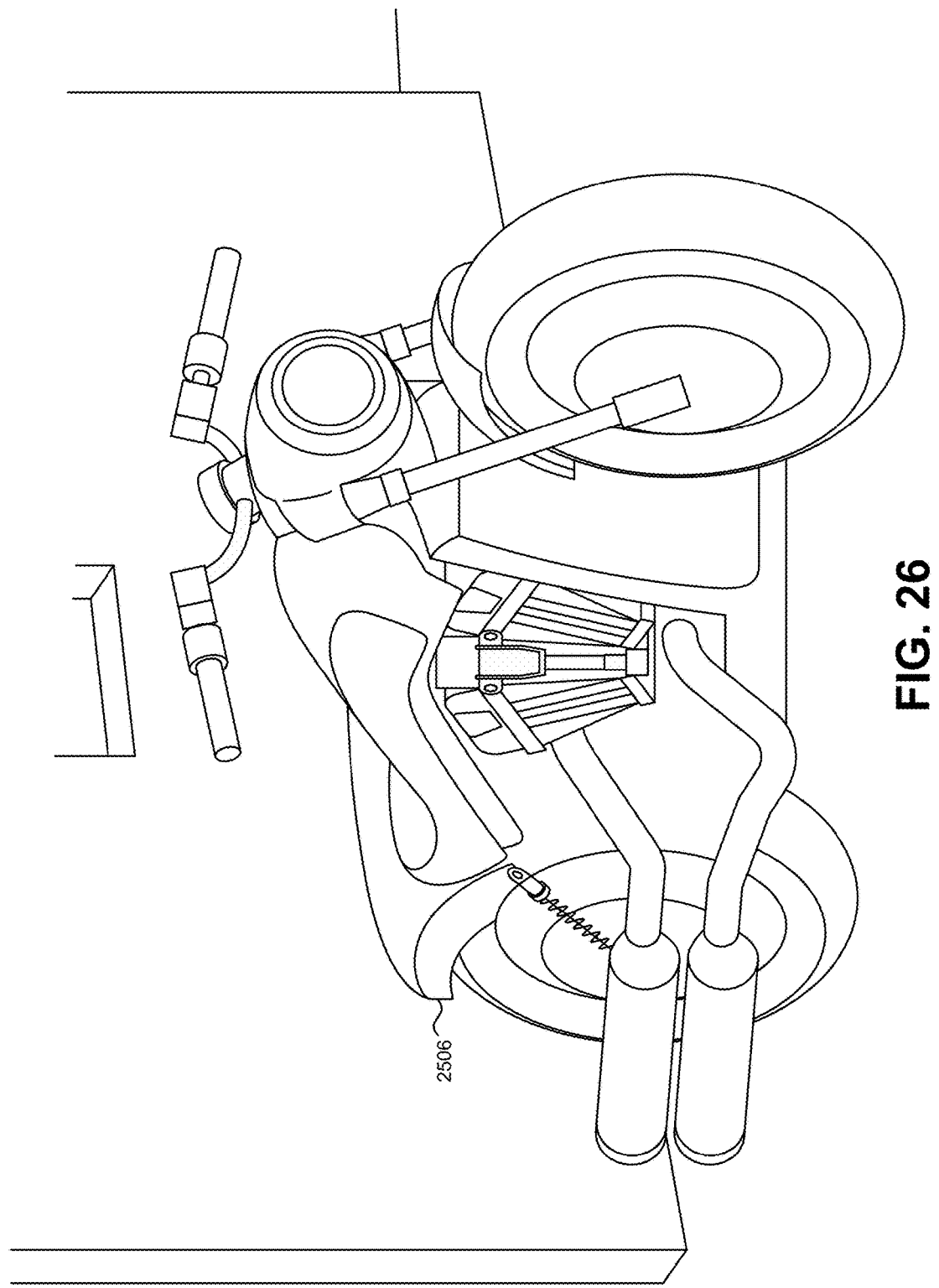
FIG. 26 illustrates a view from the user perspective in the virtual environment after the teleport operation is complete, according to some embodiments.

Once the location 2504 is highlighted, the user can release the teleport button 2502. This action can cause the user location in the virtual environment to immediately change to location 2504. FIG. 26 illustrates a view from the user perspective in the virtual environment after the teleport operation is complete, according to some embodiments. In the 3-D scene, the virtual camera positioned at the user location has been moved to be positioned at head-height at location 2504 in front of the motorcycle 2506. This teleport operation can be used any number of times to advance a user through a relatively large virtual environment without requiring the user to actually move in the real-world environment. The teleport operation can also help users reach virtual locations that would be impossible to reach using only corresponding real-world movements. For example, the teleport operation can be used to move a user to a higher location, such as on top of the building. The teleport operation can also be used to move the user to an airborne vehicle, such as onto a helicopter or spaceship. The teleport operation can be repeated rapidly to "jump" the user through a long virtual distance. For example, by leaving the virtual selection element aimed at the ground 15 feet in front of the user, the user can repeatedly press and release the teleport button on the selection device to repeatedly jump the user in 15 foot increments through the virtual environment.

In another example, a user may interact with the selection device to select an object that is 40 virtual feet away from the current location of the virtual camera. The user may then indicate via the selection device (e.g., by pressing on a button of the selection device) to move to the location of the selected object. In response, the rendering system may move the primary virtual camera to the location of the object or a certain threshold distance away from the object (e.g., 2 feet away). In this way, a user can quickly move around a virtual environment to selected objects.

Figure 27:
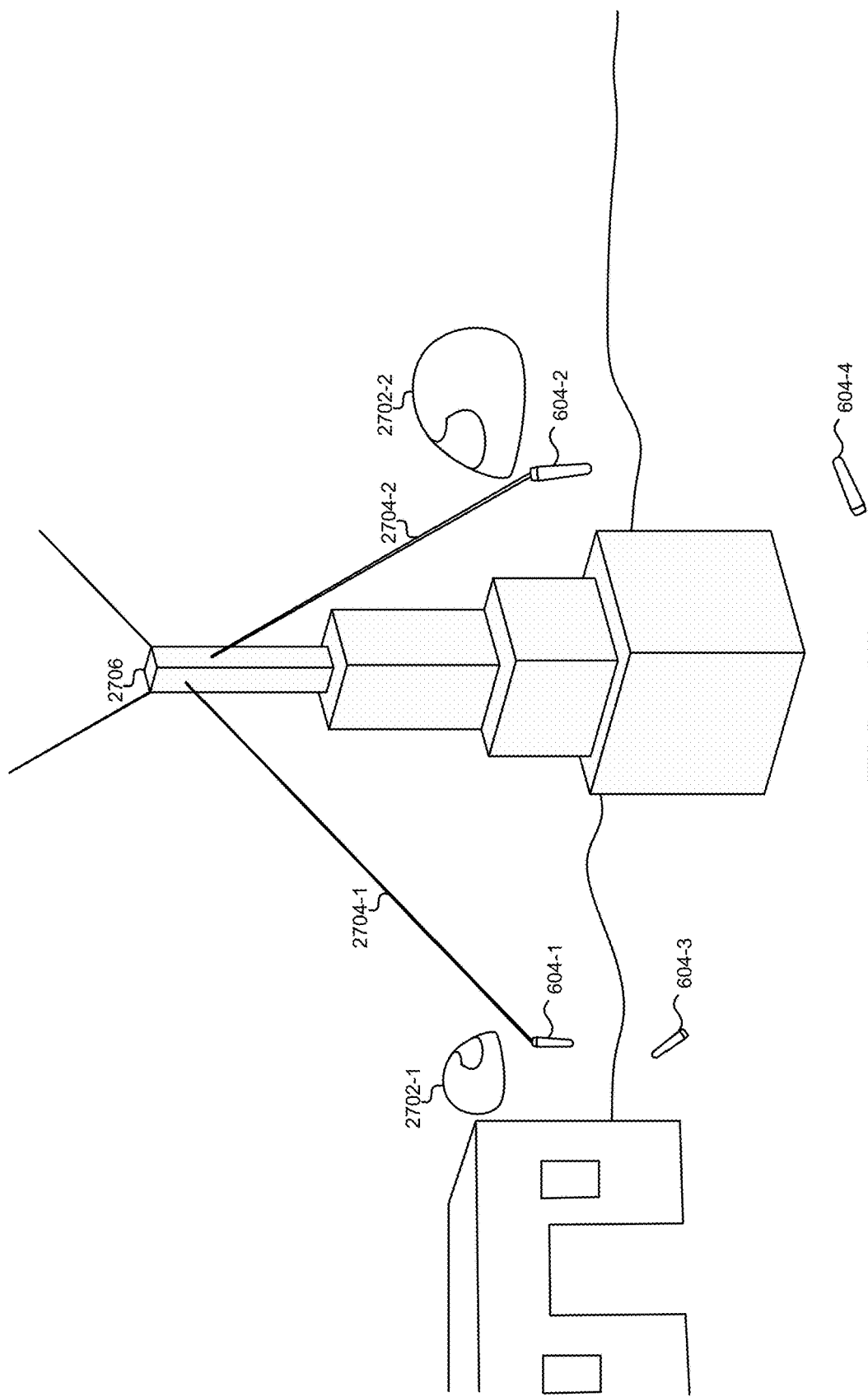
FIG. 27 illustrates a virtual environment where a plurality users can interact to create digital content, according to some embodiments.

One of the many benefits provided by the embodiments described herein is the ability to collaborate in a multi-user environment to experience and/or create digital content. As described elsewhere in this disclosure, users can interact with the same virtual environment at the same time from many different locations and types of experiences in different real-world environments. In some embodiments, multiple users, each with his or her own set of virtual reality goggles and selection devices, may manipulate and interact with objects within the same 3-D virtual environment. The rendering system may receive their interactions and provide such interactions to the other users. FIG. 27 illustrates a virtual environment where a plurality users can interact to create digital content, according to some embodiments. In this example, a first user 2702-1 and a second user 2702-2 can interact with the same virtual environment at the same time. User 2702-1 may be in a completely separate real-world environment from user 2702-2, such as in different buildings or even different countries.

Various types of visual displays for each user may be used, depending on the embodiment. In some embodiments, users can be displayed as full virtual humanoid figures, using an animated model that that can be driven by real-world movements. For example, user 2702-1 could use any virtual CGI character as an avatar in the virtual environment. The movements of the virtual character could be driven in the virtual environment by movements of the user captured in the real-world environment using the motion capture system or location determination system described above. In some embodiments, a CGI character that looks and moves like the real-world user can be used to provide a recognizable and familiar character for other users in the virtual environment.

In some embodiments, all of the motion of the user in the real-world environment does not need to be determined. This may be the case when the user uses a pair of VR goggles as a mobile device and a handheld controller as the selection device(s). FIG. 27 illustrates such an example. In the real-world environment, the location of the VR goggles and the location of the handheld controllers can be determined by the location determination system described above. Because the location of these items is known, they can be replicated and moved accordingly in the virtual environment. Therefore, FIG. 27 illustrates the heads of the users 2702 and the virtual selection elements 604 for each of the users 2702. As the VR goggles move in the real-world environment, the heads of the users 2702 can move in the virtual environment in a corresponding fashion. Similarly, as the handheld controllers in the real-world environment move, so will the virtual selection elements 604 in the virtual environment. In this embodiment, the heads of the user 2702 are represented with helmets. Other embodiments may use faces that look like the actual users, or other avatar representations. Although the full bodies of the users 2702 are not displayed, displaying the heads and virtual selection elements 604 associated with the users may be sufficient to interact with each other in the virtual environment.

While together in the virtual environment, a plurality of users can communicate using various means. In some embodiments, they may use voice communications captured by microphones in the real-world environment and transmitted to headphones or speakers in the other real-world environments of other users. In some embodiments, users can type messages into their mobile device or selection device that can be displayed on the mobile devices of other users. In the example of FIG. 27, the users 2702 can use their virtual selection element 604 to further communicate within the virtual environment. Specifically, the virtual selection elements 604-1, 604-2 can be used to emit a visible ray that that can be used like a laser pointer in the virtual environment. Thus, users can point out various objects or scene elements to other users using the virtual selection elements 604-1, 604-2. For example, a director can use their virtual selection element 604-1 to point to various objects in a scene that need to be moved or adjusted, such as object 2706, and other users can manipulate those objects and/or characters using the selection shapes or other methods described above.

In addition to using the virtual selection elements to point out and select objects in the virtual scene to other users, additional functions from the graphical interface described above can also facilitate user interactions. FIG. 28A illustrates how a markup control can be used to communicate between multiple users and markup a virtual scene, according to some embodiments. Turning back briefly to FIG. 21, the markup control 2106 can be selected to draw in the virtual environment. When the markup control 2106 is activated, a pen, pencil, paintbrush, or other visual representation of a marking device 2804 can be displayed at the end of the virtual selection element 604-2 to indicate that the markup control is active and provide a finer point at the end of the virtual selection element 604-2 for writing.

In this example, user 2702-2 can use the virtual selection element 604-2 to write a message in the virtual environment. For example, the user can depress a control on the selection device in the real-world environment to begin marking the virtual environment, and then release the control on the selection device to stop marking the virtual environment. In the virtual environment, the virtual selection element can draw on an object, or in the air without an object acting as a as a canvas. The virtual selection device can generate a line in the virtual environment that will be rendered by the rendering system to be a fully interactive 3-D object in the virtual environment. This line can rest on an object and appear to be written on the object, or the line can float in the air without being linked to any object. In FIG. 28A, user 2702-2 can write a message in front of object 3706 indicating that object 2706 needs to be moved. This results in a new text object 2802 that is rendered as part of the virtual environment. FIG. 28B illustrates the text object 2802 resulting from the markup control from a different perspective. Here, the virtual camera is rotated directly in front of text object 2802, and user 2702-1 has moved in front of text object 2802. Previously, user 2702-1 was located behind the text object 2802, and would thus see the word "move" backwards from behind.

Figure 29A:
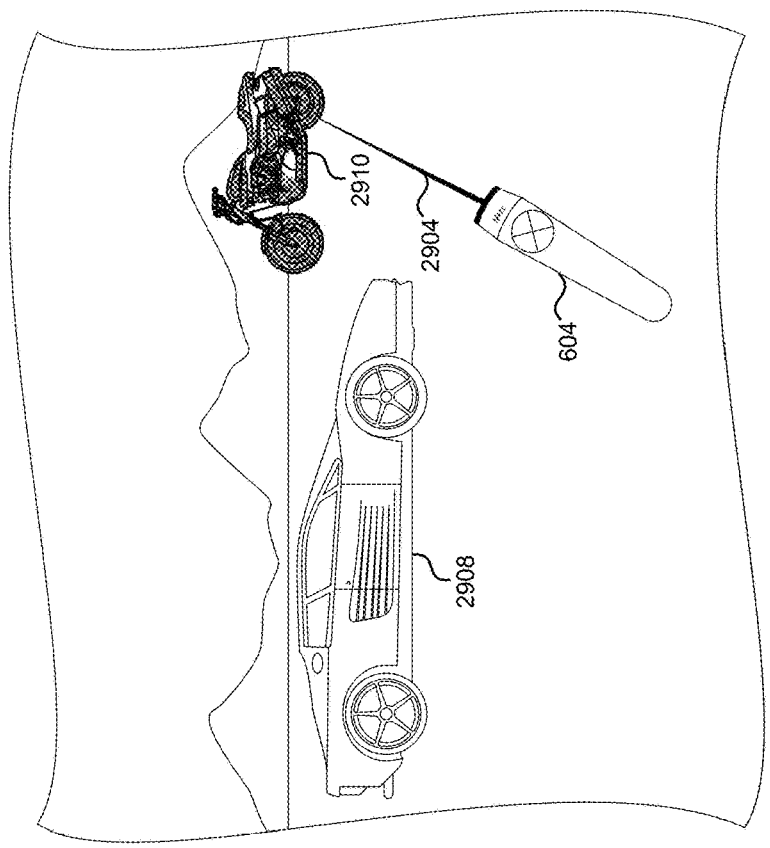
FIG. 29A illustrates how the virtual selection element can be used to tag or color objects in the virtual environment, according to some embodiments.

FIG. 29A illustrates how the virtual selection element can be used to tag or color objects in the virtual environment, according to some embodiments. Turning back briefly to FIG. 23, the color tagger 2106 can be selected to tag various objects in the virtual scene using various colors. This operation may be useful for directors as they tag objects in a first color that need to be moved, tag objects in a second color that need to be removed, tag objects in a third color that should stay in the scene, and so forth. This allows a director to quickly make edits to a scene that can then be later finalized by other members of a content creation team. For example, a director can quickly walked through a virtual scene and tag objects that need to be removed, added, duplicated, or moved by simply pointing and clicking the selection device. This also allows directors and other team members to collaborate in real time to tag objects with colors without requiring worse communication.

When the color tagger 2106 is activated, providing a first input, such as depressing a first button, on the selection device may cause a visible ray to be emitted from the virtual selection element 604 in the virtual environment. Providing a second input, such as depressing a second button or releasing the first button on the selection device, can cause an object that intersects with the emitted ray to be "painted" with a selected color. In the example of FIG. 29A, the virtual selection element 604 can be pointed at a car 2908 such that the emitted ray 2902 intersects with the car 2908. An input can be provided through the selection device indicating that the car 2908 should be colored red. The color red may be predetermined by the director or content creator to be the color for any objects that should be removed from the scene.

Figure 29B:
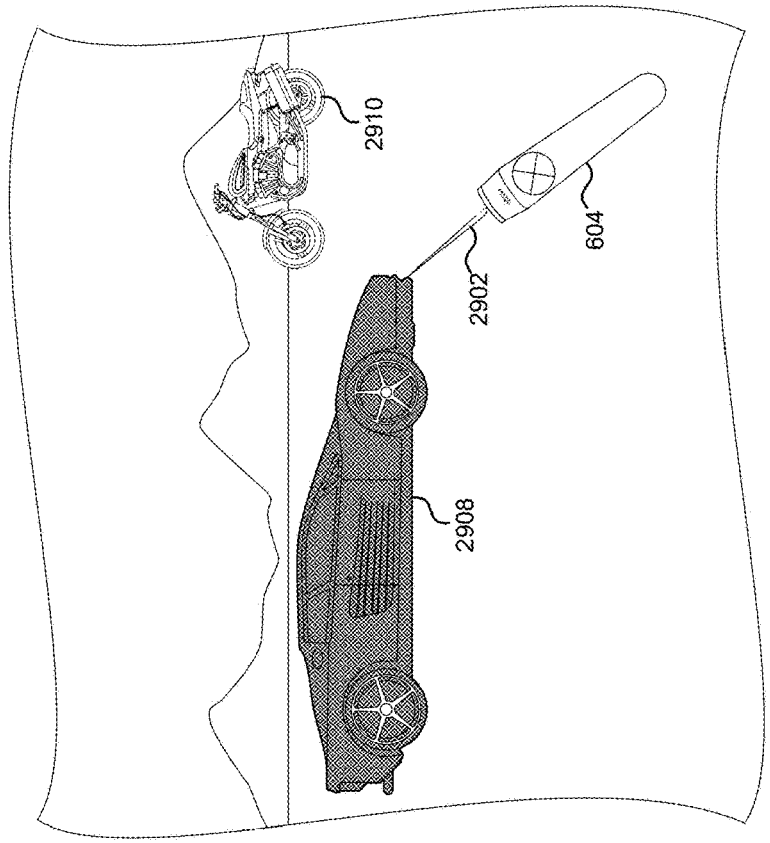
FIG. 29B illustrates how the virtual selection element can be used to tag or color additional objects, according to some embodiments.

FIG. 29B illustrates how the virtual selection element can be used to tag or color additional objects, according to some embodiments. In this example, the user may have changed the selected color for the color tagger control to be blue instead of red. By moving the virtual selection element 604 to the left, the emitted ray 2904 can move from the car 2908 to a motorcycle 2910. An input can be received to the selection device that indicates that the motorcycle 2910 should be colored blue. By way of example, blue may be a predetermined color indicating objects that should be moved within the virtual environment. In another example, blue may be a predetermined color indicating objects that should be created in the virtual environment, as opposed to being used in the real-world environment.

In some embodiments, a user interface displayed on the mobile device may include indicators (e.g. text, icons or buttons) regarding various settings for the primary virtual camera. For example, the user interface may display the current height, location, and orientation of the primary virtual camera. The user interface may also display information regarding the focus, crop-factor/aspect ratio, f-stop, and/or lens type of the primary virtual camera. In some embodiments, the user may interact with the indicators using the selection device in order to change various settings associated with the primary virtual camera. For example, the indicators may enable the user to change the focus, crop-factor, f-stop, and/or lens type of the primary virtual camera. Illustratively, a user may select an icon to change the lens of the virtual camera from 50 mm to 120 mm. As such, the image frames displayed to the user may exhibit the features of a 120 mm lens, including any lens distortion effects, zoom, etc. As another example, the user may select an object or part of the 3-D virtual environment by moving the selection device to a physical location that corresponds to a virtual location in the direction or line of sight of the object or part to be selected. The position information for the selection device may be transmitted to the rendering system. The rendering system, in turn, may generate or "shoot" one or more virtual rays from the current position of the virtual camera into the 3-D virtual environment based on the position information. Upon detecting an intersection of the one or more rays with the virtual object or part of the 3-D virtual environment the user wishes to select, the rendering system determines that the intersecting object and/or part should be selected. Thereafter, the user may indicate that the selected object should be put into focus. Accordingly, the 3-D virtual environment is rendered with the object/part placed in focus. Furthermore, depending on the virtual distance of other objects in the 3-D virtual environment relative to the in-focus object (and the selected lens type/f-stop), the rendering system applies varying degrees of focus to the other objects. For example, an object far away from the selected in-focus object in the 3-D virtual environment may be rendered with a slight blur. In some instances, the amount of blur applied to an object may increase as the object is further away from the in-focus object in the 3-D virtual environment.

In some embodiments, the user interface of the mobile device or the selection device(s) may enable the user to select a particular "crop factor" or "aspect ratio" to be applied to the image frames shown to the user to simulate different movie or cinematic formats. In one embodiment, the cropped out area may be completely opaque. In other embodiments, the cropped out area may be semi-translucent such that the portions of the 3-D virtual environment in the cropped out area can be partially seen. In certain embodiments, the degree of transparency of the cropped out area may be changed by the user. For example, the user may indicate a 25%, 50%, or 75% degree of transparency. In this way, a director can understand what parts of the 3-D virtual environment may be left out in a final, completed item of content.

Figure 30:
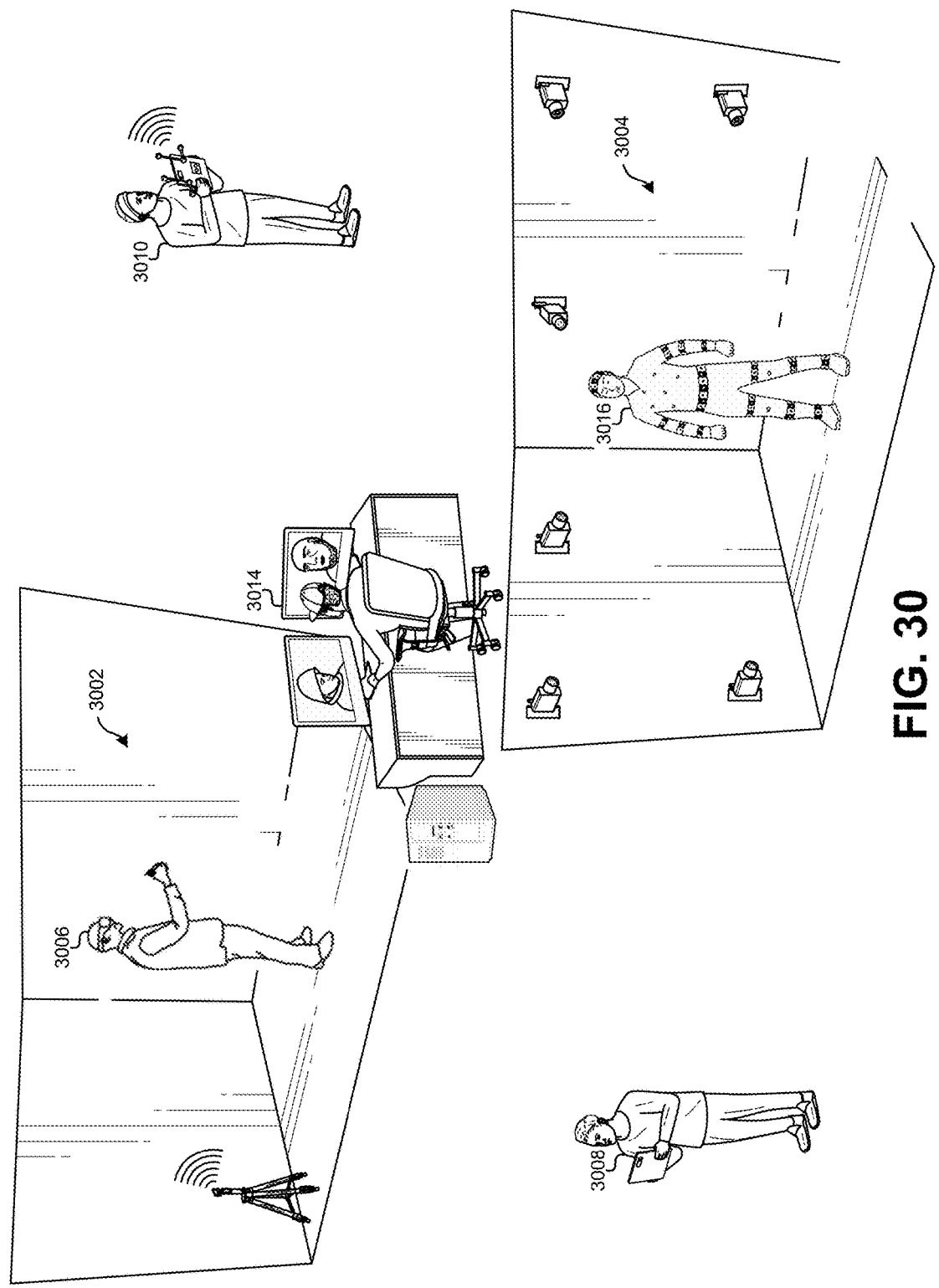
FIG. 30 illustrates a plurality of real-world environments that can be used to interact with the same virtual environment, according to some embodiments.

FIG. 30 illustrates a plurality of real-world environments that can be used to interact with the same virtual environment, according to some embodiments. A first environment 3002 may be an immersive environment such as a virtual-reality environment or augmented-reality environment. A first user 3006 in the first environment 3002 may use a pair of VR goggles or a pair of AR goggles with a handheld controller as the selection device. A second user 3008 and a third user 3010 may interact with the virtual environment using tablet devices from second and third real-world environments, such as an office, of movie set, or room in a house. The tablet device of the second user 3008 may be a stand-alone device, while the tablet device of the third user 3010 may have its position monitored by a location determination system as described above.

A fourth user 3014 may participate in a fourth real-world environment. The fourth user 3014 may participate using a workstation to view the virtual environment and may use a mouse as the selection device. In some embodiments, the fourth user 3014 may select between various virtual camera views, including a top-down "God's eye" view of the entire virtual environment. The fourth user 3014 may also freely rotate and pan a virtual camera around the virtual environment without any physical restrictions. Put another way, the fourth user 3014 can "fly" around the virtual environment without any corresponding physical movement in the real-world environment. The fourth user 3014 may also set up a plurality of virtual cameras, each of which is displayed on a separate monitor or portion of a monitor. In some embodiments, the fourth user 3014 can select a virtual camera corresponding to one of the other users to see what that user sees. In some embodiments, the fourth user 3014 can attach their virtual camera to one of the other users, such that the virtual camera follows the other user, allowing the fourth user 3014 to observe the actions of one of the other users. Thus, the fourth user 3014 can monitor and interact with all of the various users in the virtual environment, along with all of the virtual characters and/or objects in the virtual environment. In a game situation, the fourth user 3014 can act as a monitor or referee for various participants.

A fifth user 3016 may participate in a fifth real-world environment 3004. The fifth real-world environment 3004 may include a motion capture system with a plurality of cameras that monitor the movement of the fifth user 3018. The fifth user 3018 can wear a suit or other clothing that includes visual fiducials that can be identified by the motion capture cameras. In the virtual environment, the other users may see a full-body avatar or digital character representing the fifth user 3016. The motion of the digital character can be driven in real-time by the movement of the fifth user 3016 in the real-world environment 3004. Each of the users 3006, 3008, 3010, 3014, 3016 can interact together in the same virtual environment at the same time to experience content, create content, or run through a virtual scene in preparation for filming or final rendering.

Figure 31:
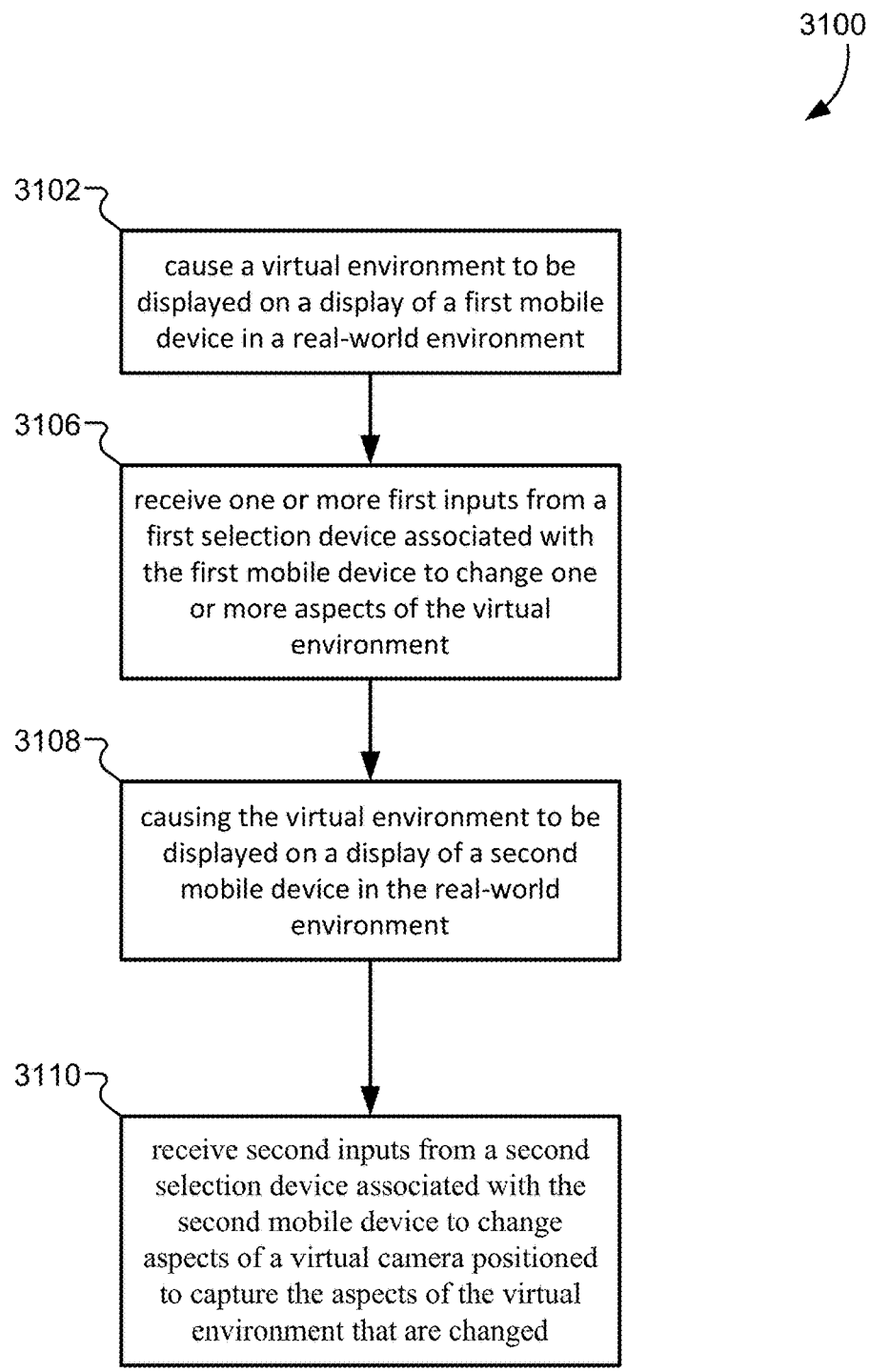
FIG. 31 illustrates a flowchart of a method for handling collaboration between a plurality of users in a virtual environment for creating digital content, according to some embodiments.

FIG. 31 illustrates a flowchart 3100 of a method for handling collaboration between a plurality of users in a virtual environment for creating digital content, according to some embodiments. The method may include causing a virtual environment to be displayed on a display of a first mobile device in a real world environment (3102). The method may also include receiving one or more first inputs from a first selection device associated with the first mobile device, where the inputs change one or more aspects of the virtual environment (3106). For example, the first selection device may be operated by a first user, and may be used to change the pose and/or location of various virtual characters and/or objects in the virtual environment. These inputs may also add, copy, or remove objects and/or characters from the virtual environment. The first selection device can be used to generate animated sequences by puppeteering virtual characters, such as creatures, monsters, robots, and so forth. The changes may include changes to lighting, such as a sunlight source, or other light sources in the virtual environment. In some embodiments, the changes may include adding markup content to the virtual scene, such as paths, splines, text, and so forth.

The method may also include causing the virtual environment to be displayed on a display of the second mobile device in the real-world environment (3108). The second mobile device may be operated by a second user, and may be located in the same or a different facility from the first mobile device and first user. In some cases, the second mobile device may be operated by a director of the scene, whereas the first mobile device may be operated by a scene technician. The method may further include receiving a second input from a second selection device that is associated with the second mobile device. The second input may change aspects of a virtual camera positioned to capture aspects of the virtual environment that are changed by the first inputs from the first selection device (3110). For example, the second inputs received from the second selection device can change settings on a virtual camera, such as an f-stop, an aspect ratio, a focus, color properties, color pallets, lens distortions, and so forth. The second inputs may also change the location and/or orientation of the virtual camera by moving, panning, rotating, and/or tilting the virtual camera to different locations/positions. In some instances, the director may capture images in the virtual scene using a virtual camera to see how the changes made by the first selection device affect the scene overall. The virtual camera may capture these images concurrently as the changes are made by the first selection device. The virtual camera may be a virtual camera that is separate and distinct from virtual cameras associated with the views seen on the first and/or second mobile devices. A representation of the virtual camera may be visible in the virtual environment to both the first and second mobile devices.

It should be appreciated that the specific steps illustrated in FIG. 31 provide particular methods of handling collaboration between a plurality of users in a virtual environment for creating digital content according to various embodiments of the present invention. Other sequences of steps may also be performed according to alternative embodiments. For example, alternative embodiments of the present invention may perform the steps outlined above in a different order. Moreover, the individual steps illustrated in FIG. 31 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, a user may interact with the selection device to create a second virtual camera and a virtual screen. The second virtual camera may be placed in any suitable part of the 3-D environment. The user may additionally set different attributes for the second virtual camera, such as focal length, aperture, etc. The virtual screen may be placed in any suitable part of the 3-D virtual environment. The virtual screen may display images corresponding to the perspective of the second virtual camera using the attributes set for the virtual camera. In this way, a user can view interactions of objects within the 3-D virtual environment from the perspective of the second virtual camera. Doing so can be useful in visualizing and/or creating content (e.g., film shots). In some embodiments, the user can move the second virtual camera over time. As the perspective of the second virtual camera is adjusted, the perspective displayed on the virtual screen may also be accordingly adjusted.

Figure 32:
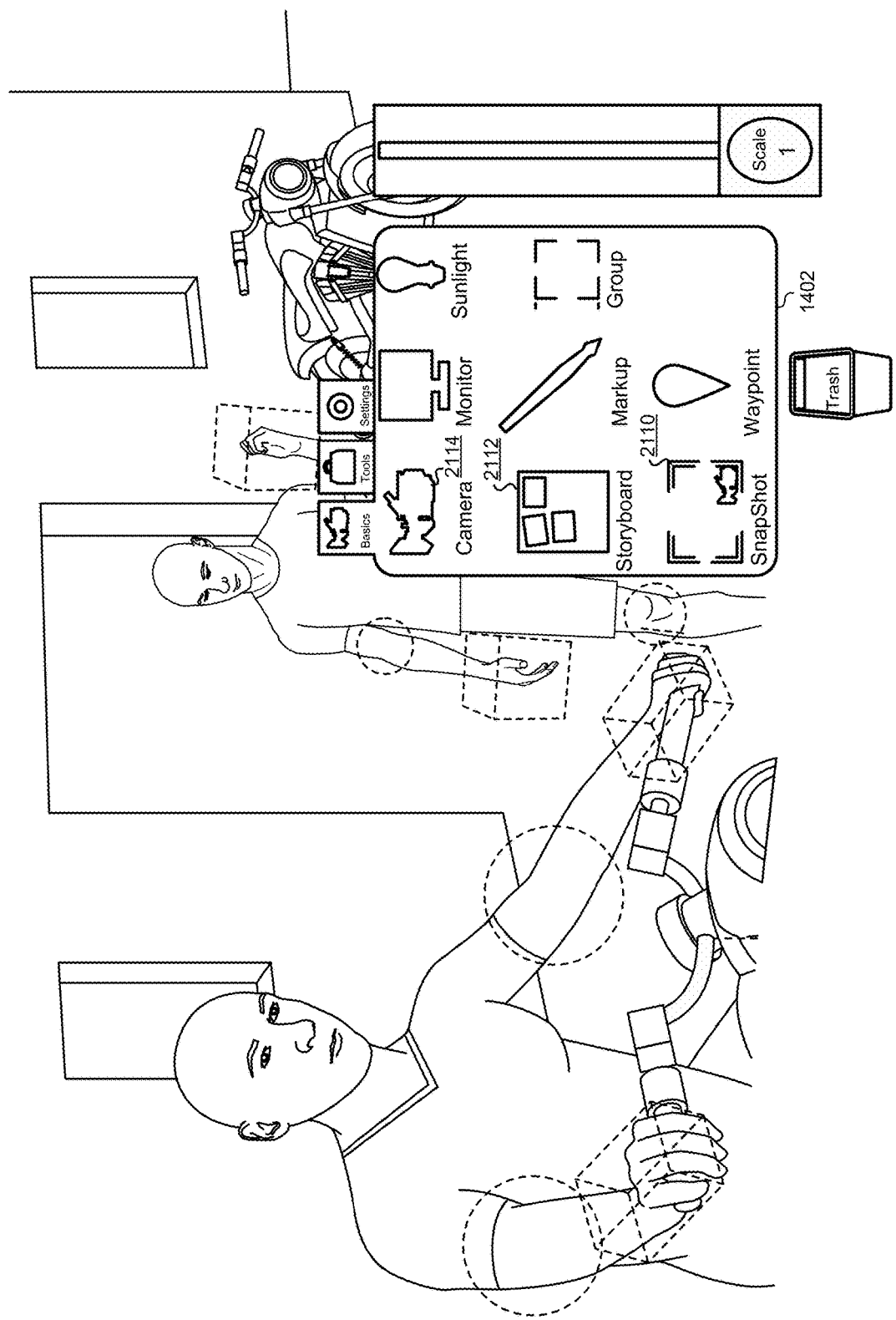
FIG. 32 illustrates how a virtual camera can be added to a virtual environment, according to some embodiments.

FIG. 32 illustrates how a virtual camera can be added to a virtual environment, according to some embodiments. The user can summon the graphical interface 1402 such that it is rendered and displayed in the view of the user's mobile device. As described above, the graphical interface 1402 may include a camera control 2114 that can be used to instantiate a virtual camera into the virtual scene. This new virtual camera instantiated by the camera control 2114 is different from the virtual camera generating the view for the user on the mobile device. To generate a new virtual camera, the user can move the selection device such that the virtual selection element selects and activates the camera control 2114.

Figure 33:
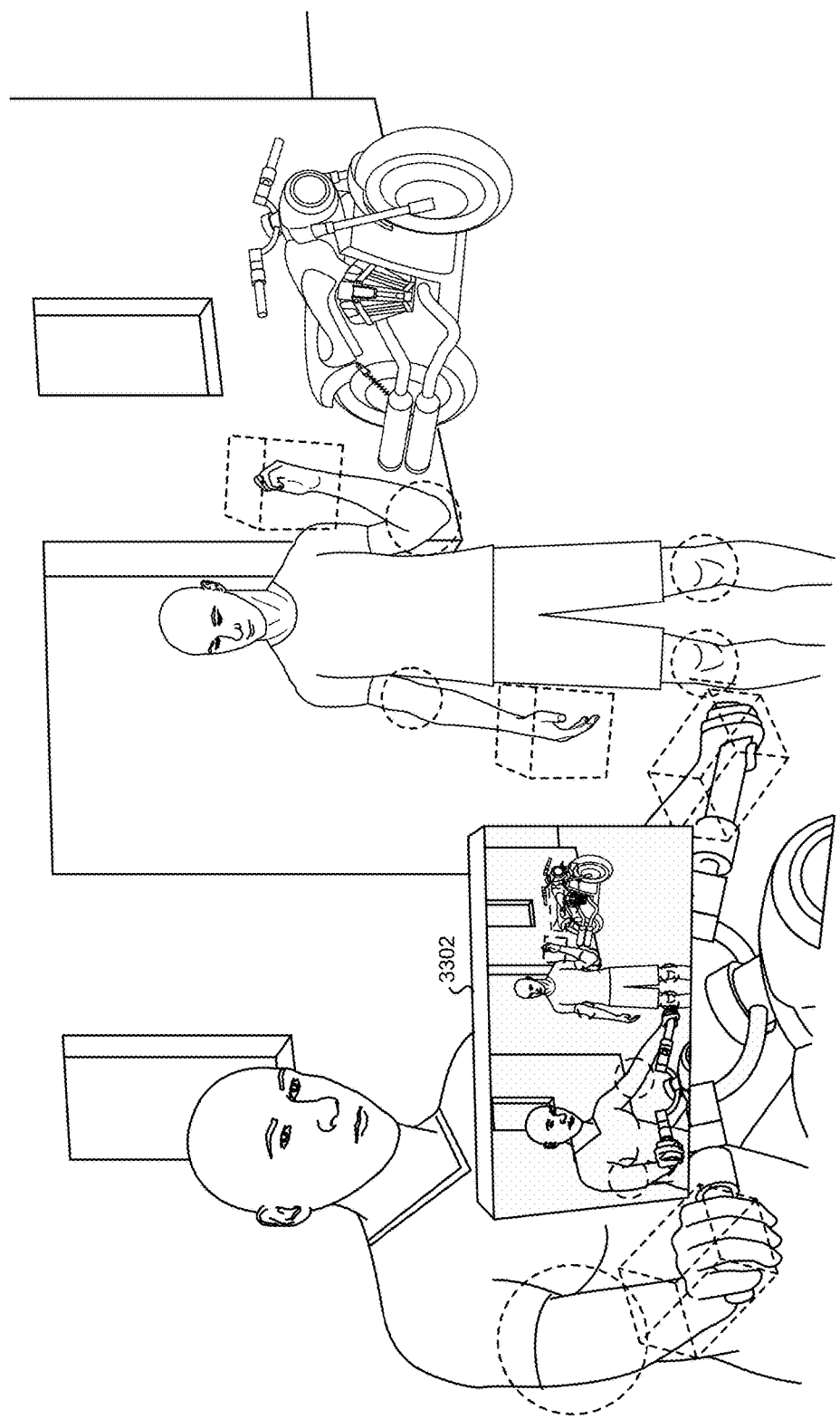
FIG. 33 illustrates a view of the scene with a virtual camera added to the scene, according to some embodiments.

FIG. 33 illustrates a view of the scene with a virtual camera 3302 added to the scene, according to some embodiments. The virtual camera 3302 may be represented by a small screen showing what is visible in the viewfinder of the virtual camera. Put another way, the viewport of the virtual camera may be visible as a screen in the virtual environment such that the user can view the output of the virtual camera as it would appear during playback on a display device. These embodiments allow the user to see exactly what is being captured by the virtual camera in real-time. The aspect ratio, crop factor, and other image settings can be configured such that the screen representing the virtual camera 3302 changes in size and/or configuration to match the camera settings. For example, the virtual camera 3302 can be made to appear in high-definition, standard definition, or can be made to fit the image captured, as well as to produce black bars on the top and bottom of the image to show how the image would be displayed on different display devices.

In other embodiments, the virtual camera 3302 can be represented with an actual camera representation rather than a screen representation. In these embodiments, the screen in FIG. 33 can be replaced with a visual representation of an actual camera. In any embodiment, the virtual camera can be repositioned, panned, tilted, and/or rotated using the virtual selection device. Specifically, the user can select and activate the virtual camera 3302 in order to move or rotate the camera with the virtual selection element. As the virtual camera 3302 is moved, panned, rotated, etc., the display of the virtual camera 3302 on the screen may be updated in real-time. During the content creation process, this allows a director to move the camera to an ideal location or experiment with different locations and immediately see the results on the screen of how the final recorded images will look.

Figure 34:
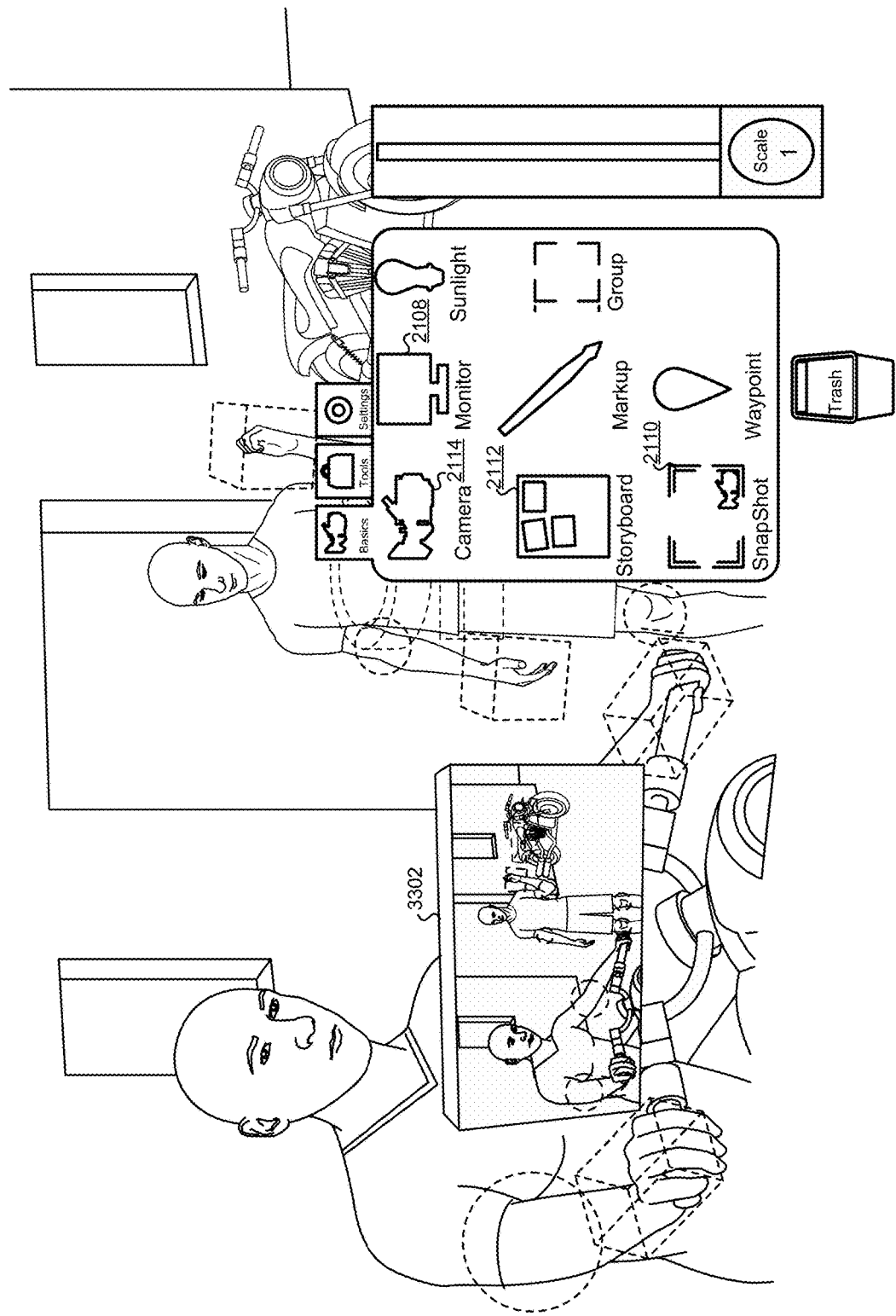
FIG. 34 illustrates how a virtual screen can be placed within the virtual environment, according to some embodiments.

FIG. 34 illustrates how a virtual screen can be placed within the virtual environment, according to some embodiments. After the virtual camera 3302 is instantiated and positioned in the virtual scene, the user may use that virtual camera image feed as a source to a virtual screen. After again instantiating the graphical interface 1402, the user can select the monitor control 2108 to instantiate a monitor or virtual screen object in the virtual environment.

Figure 35:
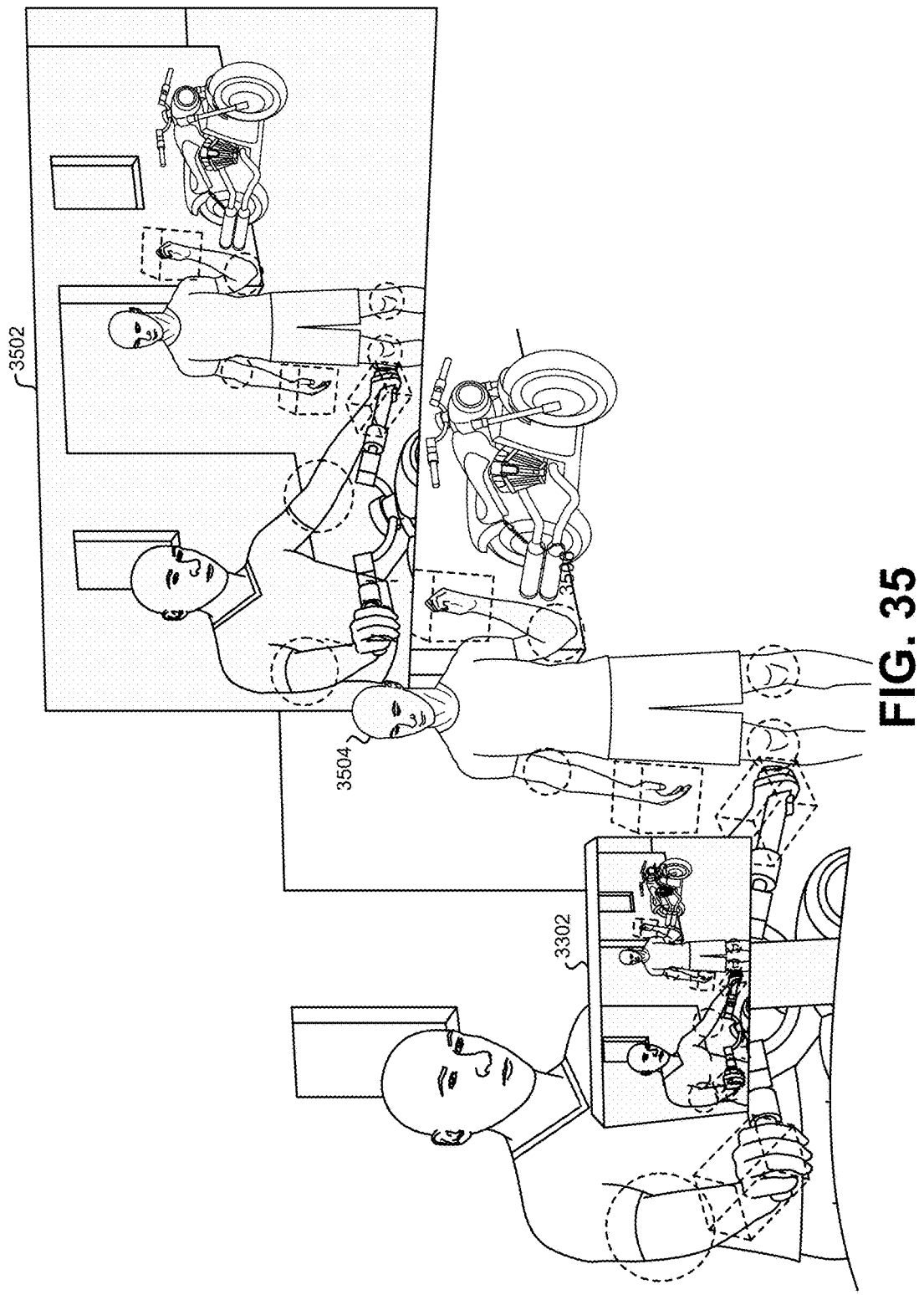
FIG. 35 illustrates how the image of a virtual camera can be displayed on a virtual screen within the virtual environment, according to some embodiments.

FIG. 35 illustrates how the image of a virtual camera 3302 can be displayed on a virtual screen 3502 within the virtual environment, according to some embodiments. The virtual screen 3502 can be placed at any location in the virtual environment. For example, in FIG. 35, the virtual screen 3502 is placed behind the character 3504, but in from the motorcycle 3506. Thus, the virtual screen 3502 is not merely a two-dimensional representation that is inserted into the display of the user, but rather a 3-D object that is rendered as part of the virtual scene. If the user were to walk behind the virtual screen 3502, the virtual screen 3502 would block character 3504 from view, and the user would see the backside of the virtual screen 3502. As the user begins to walk around the virtual screen 3502, the display of the screen will begin to skew just as would happen in a real-world environment.

Although the virtual camera 3302 and the virtual screen 3502 appear similar in FIG. 35, they may differ in a number of ways. The virtual camera 3302 acts as a source for video or still images. The image displayed on the virtual camera 3302 is what would be seen through a viewfinder of a virtual camera from the position of the virtual camera 3302. Thus, panning, rotating, tilting, and/or moving the virtual camera 3302 will change the image displayed on the screen of the virtual camera 3302 if the display is real-time. In contrast, the image displayed on the virtual screen 3502 may be received from some other source. For example, in FIG. 35, the image displayed on the virtual screen 3502 is sourced from the image captured by the virtual camera 3302. Panning, rotating, tilting, and/or moving the virtual screen 3502 would not change the image displayed on the virtual screen 3502.

The virtual screen 3502 can be useful in a number of ways during content creation and/or content experiences. In some embodiments, a screen can be placed in view of a director, such that the director can watch the scene captured through the virtual camera as the scene plays out. The virtual screen 3502 can be placed outside of the view of the virtual camera 3302. For example, some of the virtual characters in the scene can be animated or puppeteered by other users to perform animated sequences. Other participants in the virtual environment can then interact with the animated virtual characters to practice a scene that will be found in the real-world environment. During an immersive experience, such as a game environment, participants can interact with virtual characters as part of an interactive session. In any case, the actors, users, and/or directors can watch these performances in real-time or after the fact on the virtual screen 3502. For example, an actor can interact with a virtual character to practice performing a scene. Afterwards, the director and the actor can gather around the virtual screen 3502 in the virtual environment to watch and discuss the performance. In a game environment, a user can interact with the virtual environment or virtual characters, and then watch a replay of the interaction on a virtual screen in the virtual environment without losing the immersive environment experience.

In some embodiments, the virtual screen 3502 can be the size of a standard television screen relative to the size of the user in the virtual environment. The virtual screen 3502 can also be shrunk down to a smaller size, such that the virtual screen 3502 can be placed on the virtual selection element or other small item. In some embodiments, the virtual screen 3502 can be attached to a spline or path generated using the markup tool and move in a predetermined path throughout the virtual environment. In some embodiments, the virtual screen can be attached to an object, character, or other elements of the virtual environment and move with that object, character, or element. The virtual screen 3502 can also be enlarged to any size within the virtual environment. For example, instead of creating a detailed 3-D landscape as a background during a particular scene, the virtual screen 3502 can be enlarged as a backdrop behind the performance of the scene. A still image of a background environment, such as a city or desert environment can then be played by the virtual screen 3502 to act as a backdrop to the scene. This is analogous to the painted backdrops that are used in the real-world environments to film scenes against backgrounds that would otherwise be unavailable. In some embodiments, the virtual screen 3502 can act as a backdrop and display video sequences that are loaded from a content data store as a background. For example, as a spaceship accelerates through space, a video of stars rapidly moving past the spaceship can be displayed on the virtual screen 3502 while the virtual characters and/or actors remain stationary to give the effect of rapid motion.

In addition to displaying still/static or video images from a data store, as well as live video/image streams from any virtual camera 3302 in the virtual environment, the virtual screen 3502 can display any available video or image feed. For example, some embodiments may display performances of other real-world or virtual actors in front of a live actor's view in the virtual environment. This can provide the interaction the may be necessary for the live participant to perform the scene in a realistic fashion. Some embodiments may display a rolling teleprompter of lines to be recited by a live participant. In some cases, the virtual screen 3502 can be rendered only in selected user' mobile devices. For example, two live users can talk to each other, each having a virtual screen in front of them displaying their lines or with other scene elements. Each user's virtual screen can be removed from the rendering of the view provided to the other user. This would allow actors to read their lines without having cue cards or teleprompters that are visible to a virtual camera recording the scene or to other users.

Figure 36:
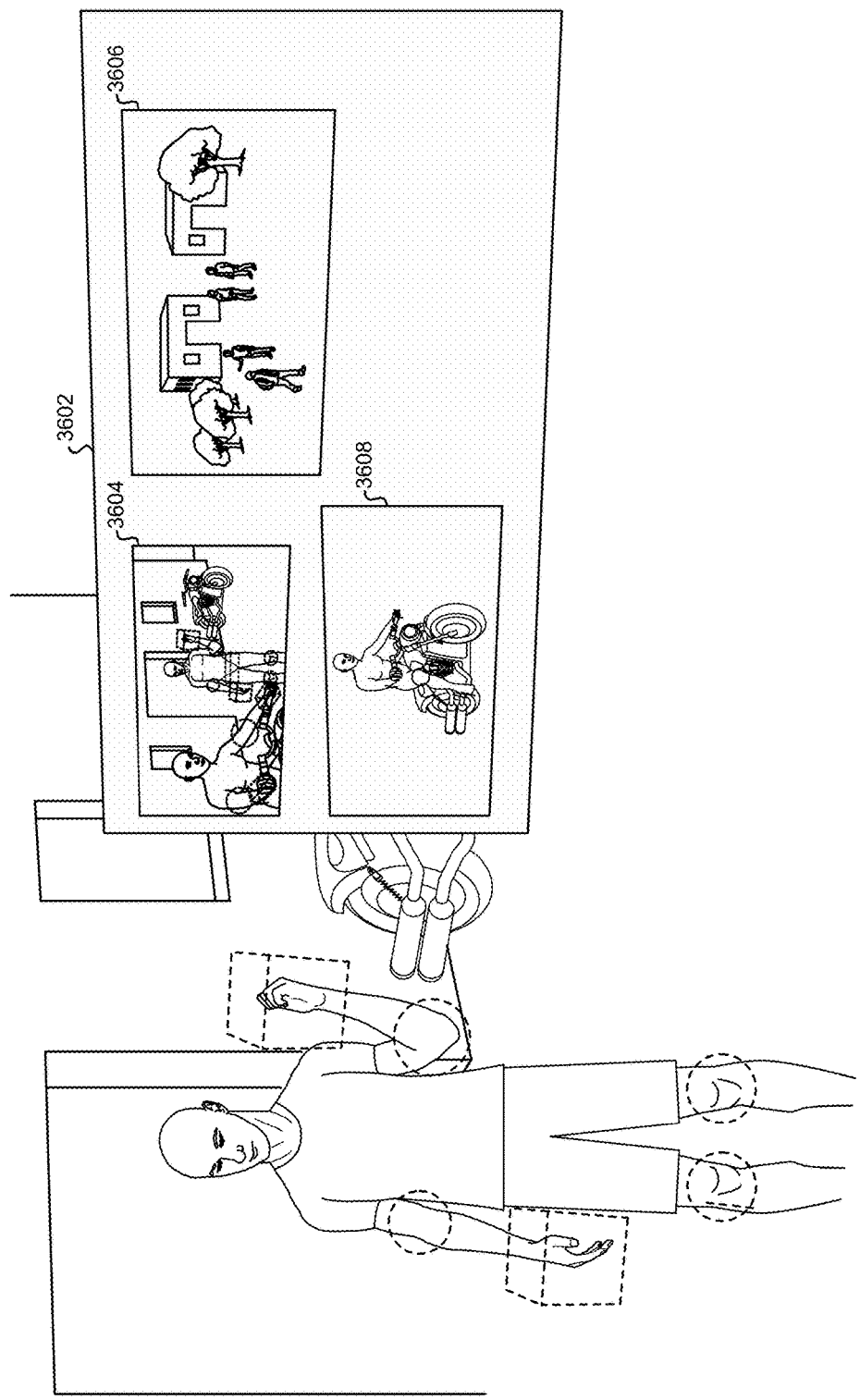
FIG. 36 illustrates how a storyboard of images and/or videos can be created in the virtual environment for generating feature content, according to some embodiments.

FIG. 36 illustrates how a storyboard 3602 of images and/or videos can be created in the virtual environment for generating feature content, according to some embodiments. Traditionally, a storyboard is a sequence of drawings, typically with some directions and dialogue, representing the shots plan for a movie or television production. For complex or expensive scenes, storyboarding the scenes beforehand can ensure that the scenes are correct before they are filmed. Storyboards also allow a director to rearrange the sequence, point-of-view, and other characteristics of different camera angles and shot sequences during the scene. To generate feature content, the virtual environment described herein may include a storyboard function that allows a director to plan and document the scene prior to final shooting and/or rendering.

The storyboard control 2112 from the graphical interface 1402 can be used to generate a storyboard 3602 that is placed in the virtual environment. Like other elements of the virtual environment, such as the virtual camera and video display described above, the storyboard 3602 may be an actual rendered object in the virtual scene that is visible to any participating users. The storyboard 3602 may include different images and/or video sequences that are recorded by virtual cameras in the virtual environment. For example, a user can capture an image or video sequence from the virtual camera 3302 in FIG. 35 using the snapshot function and select that image or video sequence from a set of saved snapshots for inclusion in the storyboard 3602.

Images and/or video sequences in the storyboard 3602 can come from a variety of different sources. For example, image 3604 may be captured as a snapshot from a virtual camera and included in the storyboard 3602. Image 3606 may include an image from a live recording in the real-world environment. Images from external or real-world cameras can be loaded from a content data store and included in the storyboard 3602. Image 3608 can be a video sequence or animated sequence that is rendered from a different virtual environment and included in the storyboard 3602. Other image sources may include virtual cameras representing users that are displayed on the mobile devices, displays on virtual screens in the virtual environment, live performances in either the virtual or real-world environments, and so forth.

The storyboard 3602 can be viewed and manipulated in the virtual environment. Thus, a user can watch various performances of a production recorded live, then use captured images and/or videos from those performances along with other content to put together the storyboard 3602. Using the virtual selection element, the user can select and activate any of the images or videos 3604, 3606, 3608 to move, rearrange, add, copy, delete, etc., any of the elements of the storyboard 3602. Annotation, text, or additional content can be added to the storyboard 3602 and/or to specific videos and/or images in the storyboard 3602. These annotations can be added by drawing with the virtual selection element, or by providing keyboard inputs from the mobile device and/or selection device in the real-world environment. Once completed, the storyboard 3602 can be exported from the virtual environment to a workstation in the real-world environment. The exported storyboard can then be manipulated using traditional storyboard software.

Figure 37:
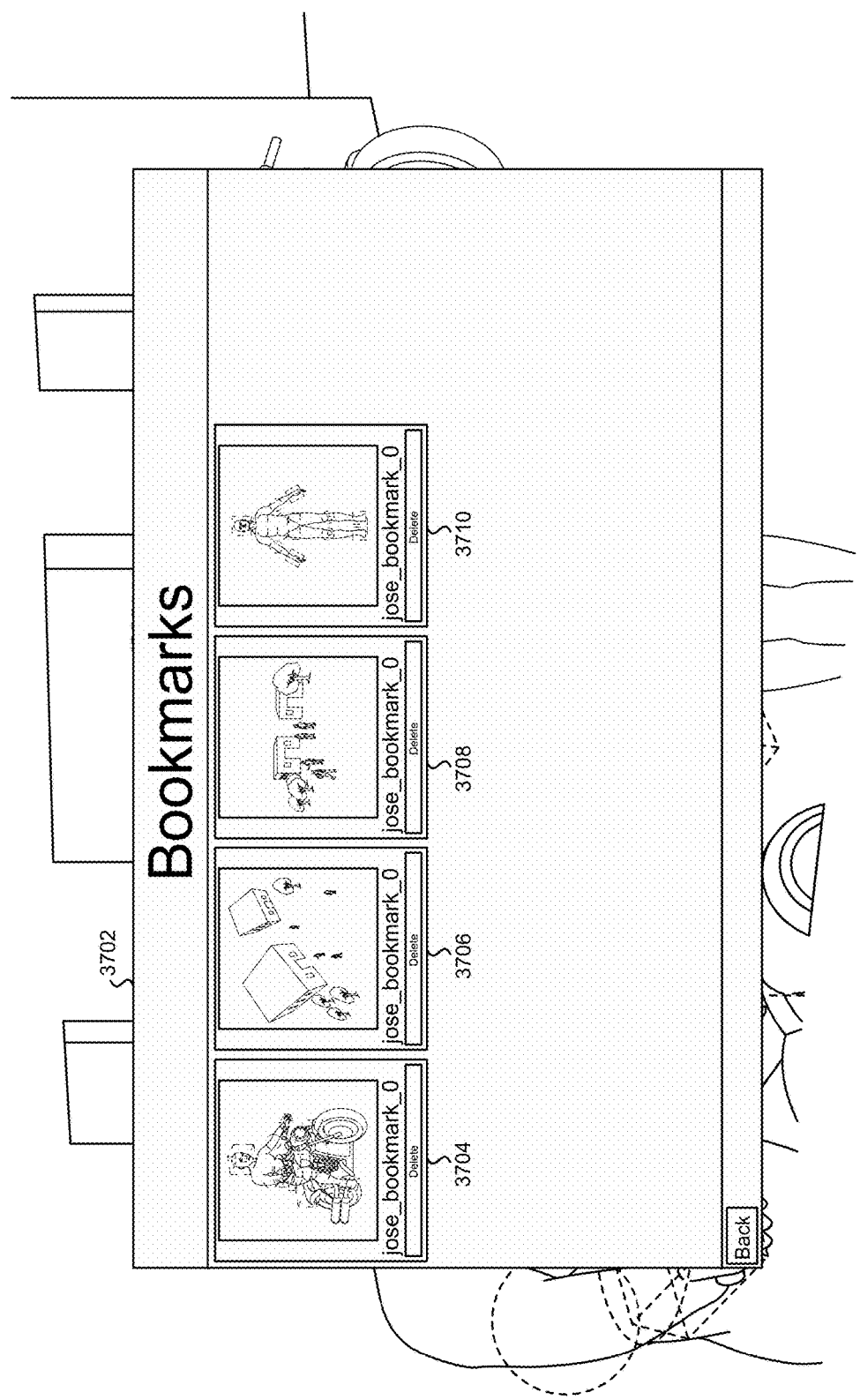
FIG. 37 illustrates how bookmarks can save a state of the virtual environment, according to some embodiments.

FIG. 37 illustrates how bookmarks can save a state of the virtual environment, according to some embodiments. A bookmark menu 3702 can be displayed in the virtual environment as a rendered object in the same way that the storyboard 3602 was displayed as a rendered object. However, the view in FIG. 37 shows the bookmark menu 3702 presented as a 2-D image on a computer workstation. Any of the graphical interface items described above can also be displayed as 2-D objects on a device screen in the real-world environment. A user at a workstation viewing the virtual environment from any angle can save bookmarks of the scene. Any user in the virtual environment can also use the virtual selection element and the graphical interface to save bookmarks for the scene. A bookmark generally saves every characteristic of the scene, including virtual camera locations, orientations, and characteristics; character locations; lighting effects; character locations and poses; virtual screen locations; user locations; and so forth.

In some embodiments, as the user is moving the primary virtual camera around the 3-D virtual environment, he or she may indicate to the mobile device to save a "bookmark" of the virtual camera's current location, orientation, and any associated parameters. In effect, the bookmark saves a shot taken from the virtual camera using specific camera parameters. In some embodiments, the user interface provided by the first mobile device may additionally enable the user to annotate or include notes for the bookmark. For example, the user can provide an overall annotation or annotations for the bookmark. As another example, the user can select different areas of the bookmarked shot and place separate annotations at those areas. The annotations can include text, drawings, tags, etc. In some embodiments, the user may also attach a rating to the bookmark. The bookmarks may be sorted according to the rating when later accessed as described below. In some embodiments, a user can pull up a menu and search for annotations based on text, similarity of drawings to certain pictures or shapes, etc.

In some embodiments, the generated bookmarks and any annotations may later be used to re-load the 3-D virtual environment from the perspective of the virtual camera with the associated parameters by the rendering system and/or content creation system. When re-loaded by the rendering system, the virtual camera is placed at the position and orientation indicated by the bookmark with any associated camera parameters. Thereafter, the user can begin moving and/or interacting with the virtual camera from the position in the 3-D virtual environment. In some embodiments, any previously generated bookmarks may be presented in a list sorted by rating and/or by most recent modification. In some embodiments, the bookmarks presented to a user may have been created by several different other users across several different 3-D virtual environments. The user may organize such bookmarks into a playlist in which each shot is present to the user in the order of the playlist.

Bookmarks can also be used in multi-user sessions. When loading a bookmark saved by a first user, a second user can jump into the virtual scene in the same circumstance as the first user when bookmark was saved. This may include beginning at the same position in the environment with the same camera view as the first user when bookmark was saved. Some bookmarks can be saved that only affect a single user. For example, if three users are participating simultaneously in a virtual environment, one user can load a bookmark to return to a position and camera angle that they previously saved without affecting the other users. Other bookmarks can affect all users in the scene, returning each user to a previously saved position.

Figure 38:
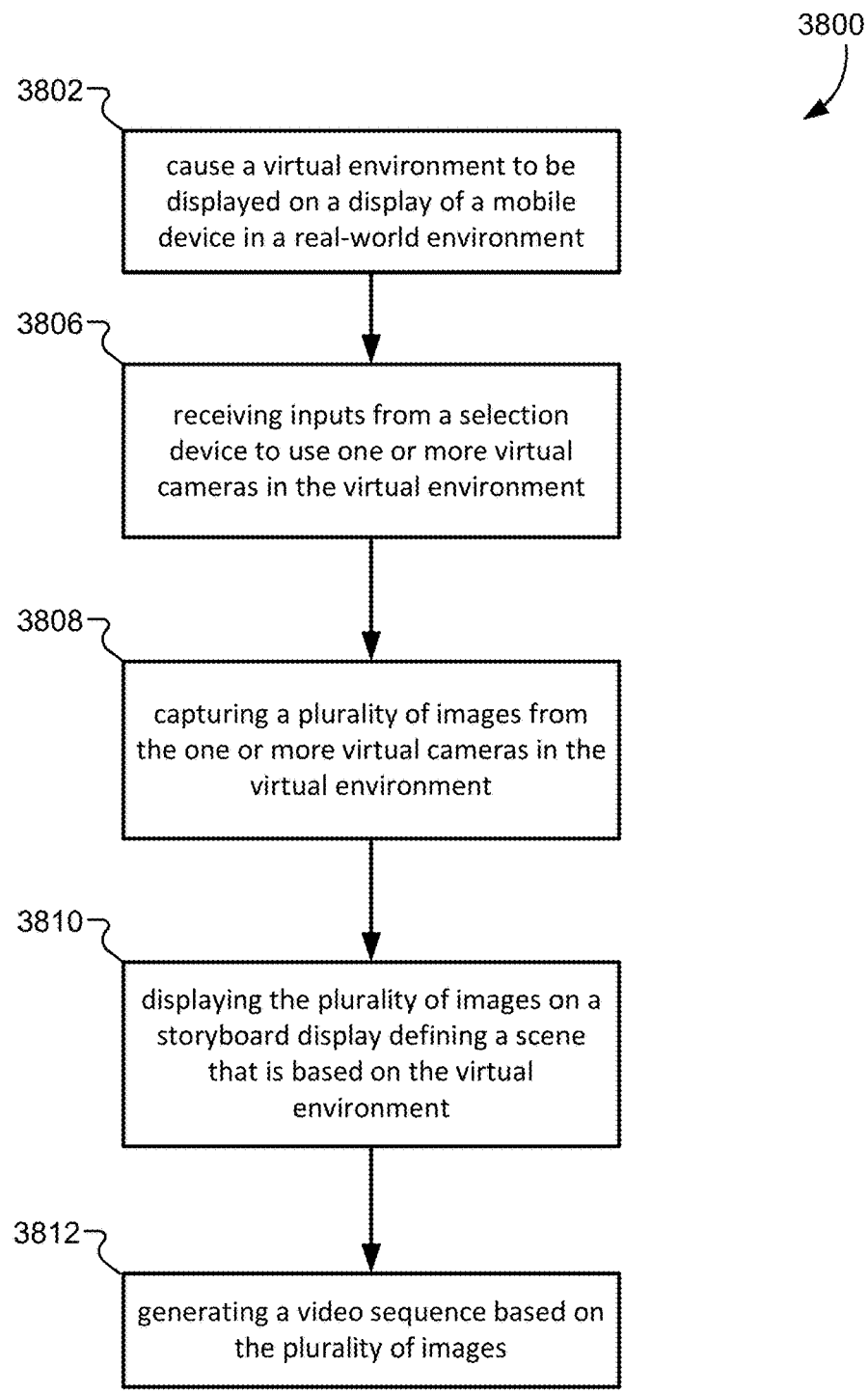
FIG. 38 illustrates a flowchart of a method for using the virtual environment to generate content, according to some embodiments.

FIG. 38 illustrates a flowchart of a method for using the virtual environment to generate content, according to some embodiments. The method may include causing a virtual environment to be displayed on the display of a mobile device in a real-world environment (3802). The method may further include receiving inputs from the selection device to use one or more virtual cameras in the virtual environment (3806). Using the virtual cameras may include adjusting any characteristic of the virtual cameras, including position, orientation, f-stop, focus, aspect ratio, color palette, lens distortion, and so forth. The method may also include capturing a plurality of images from the one or more virtual cameras in the virtual environment (3808). The plurality of images may be individual static/still images, as well as video sequences of images. Images can be used from any virtual camera in the virtual environment, including cameras representing user views, as well as cameras placed into the virtual environment using the graphical interface as described above.

The method may additionally include displaying a plurality of images on the storyboard display defining a scene that is based on the virtual environment (3810). The storyboard display may be displayed as described above in relation to FIG. 36. The storyboard may include images, video sequences, and/or annotations from virtual cameras and users in the virtual environment. The storyboard may also include other content loaded from an external content data store, such as live performances, live video sequences, animated sequences from other virtual environments or previous renderings, annotations or live feedback from users in the real-world environment, and so forth.

The method may further include generating a video sequence based on the plurality of images (3812). Generating the video sequence may include rendering a sequence from the virtual environment. Generating the video sequence may also include shooting a live scene in the real-world environment using the storyboard generated in the virtual environment. Generating the video sequence may also include recording a live performance of an actor or a motion capture performer that is inserted into a rendering of the virtual environment. In any of these situations, the storyboard sequence generated above can be used to generate these video sequences.

It should be appreciated that the specific steps illustrated in FIG. 38 provide particular methods of using the virtual environment to generate content according to various embodiments of the present invention. Other sequences of steps may also be performed according to alternative embodiments. For example, alternative embodiments of the present invention may perform the steps outlined above in a different order. Moreover, the individual steps illustrated in FIG. 38 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 39:
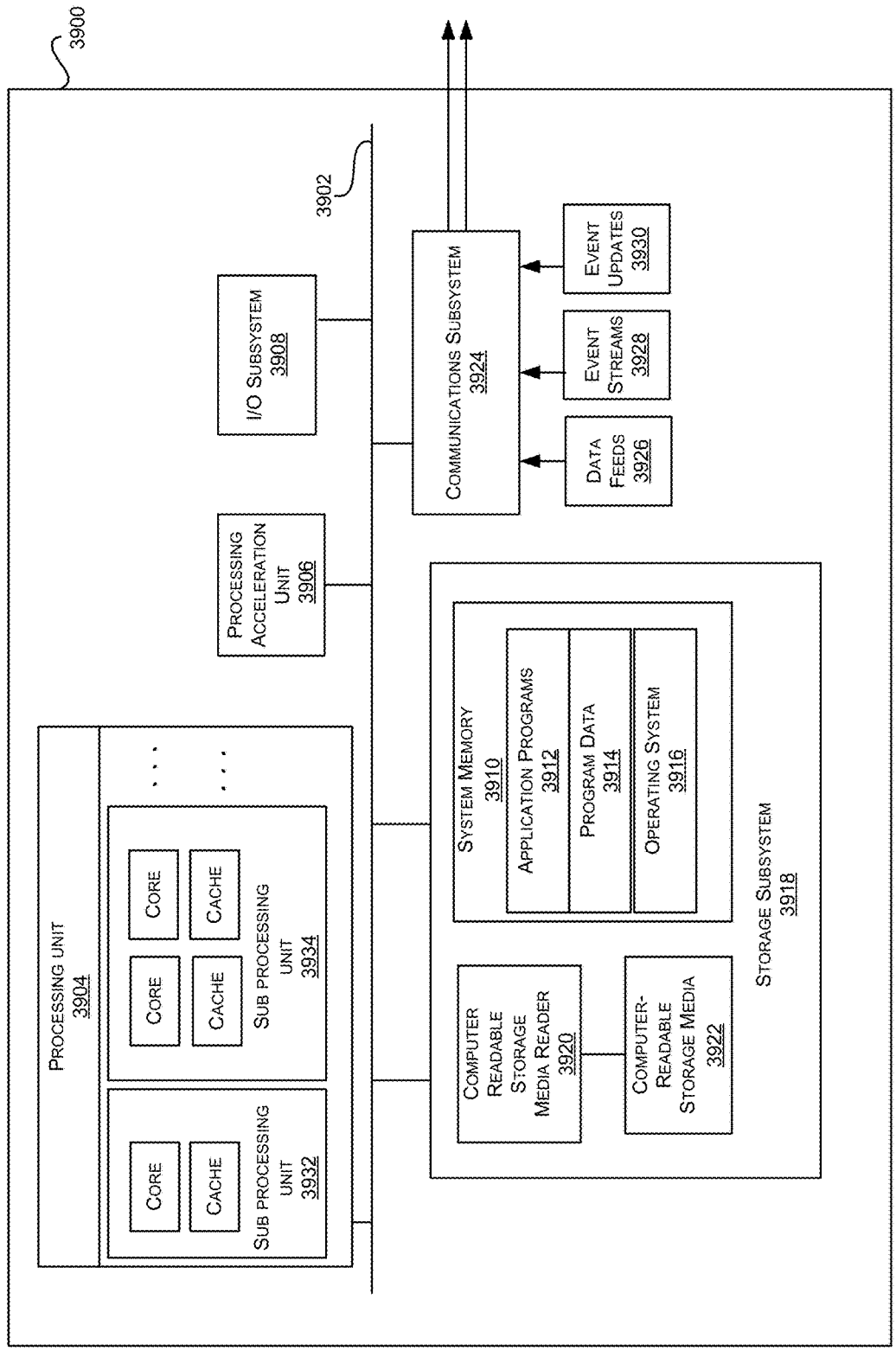
FIG. 39 illustrates a computer system, in which various embodiments described herein may be implemented.

FIG. 39 illustrates a computer system 3900, in which various embodiments described herein may be implemented. The system 3900 may be used to implement any of the computer systems described above. As shown in the figure, computer system 3900 includes a processing unit 3904 that communicates with a number of peripheral subsystems via a bus subsystem 3902. These peripheral subsystems may include a processing acceleration unit 3906, an I/O subsystem 3908, a storage subsystem 3918 and a communications subsystem 3924. Storage subsystem 3918 includes tangible computer-readable storage media 3922 and a system memory 3910.

Bus subsystem 3902 provides a mechanism for letting the various components and subsystems of computer system 3900 communicate with each other as intended. Although bus subsystem 3902 is shown schematically as a single bus, alternative embodiments of the bus subsystem may utilize multiple buses. Bus subsystem 3902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 3904, which can be implemented as one or more integrated circuits (e.g., a conventional microprocessor or microcontroller), controls the operation of computer system 3900. One or more processors may be included in processing unit 3904. These processors may include single core or multicore processors. In certain embodiments, processing unit 3904 may be implemented as one or more independent processing units 3932 and/or 3934 with single or multicore processors included in each processing unit. In other embodiments, processing unit 3904 may also be implemented as a quad-core processing unit formed by integrating two dual-core processors into a single chip.

In various embodiments, processing unit 3904 can execute a variety of programs in response to program code and can maintain multiple concurrently executing programs or processes. At any given time, some or all of the program code to be executed can be resident in processor(s) 3904 and/or in storage subsystem 3918. Through suitable programming, processor(s) 3904 can provide various functionalities described above. Computer system 3900 may additionally include a processing acceleration unit 3906, which can include a digital signal processor (DSP), a special-purpose processor, and/or the like.

I/O subsystem 3908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3900 may comprise a storage subsystem 3918 that comprises software elements, shown as being currently located within a system memory 3910. System memory 3910 may store program instructions that are loadable and executable on processing unit 3904, as well as data generated during the execution of these programs.

Depending on the configuration and type of computer system 3900, system memory 3910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3904. In some implementations, system memory 3910 may include multiple different types of memory, such as static random access memory (SRAM) or dynamic random access memory (DRAM). In some implementations, a basic input/output system (BIOS), containing the basic routines that help to transfer information between elements within computer system 3900, such as during start-up, may typically be stored in the ROM. By way of example, and not limitation, system memory 3910 also illustrates application programs 3912, which may include client applications, Web browsers, mid-tier applications, relational database management systems (RDBMS), etc., program data 3914, and an operating system 3916. By way of example, operating system 3916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3918 may also provide a tangible computer-readable storage medium for storing the basic programming and data constructs that provide the functionality of some embodiments. Software (programs, code modules, instructions) that when executed by a processor provide the functionality described above may be stored in storage subsystem 3918. These software modules or instructions may be executed by processing unit 3904. Storage subsystem 3918 may also provide a repository for storing data used in accordance with the present invention.

Storage subsystem 3900 may also include a computer-readable storage media reader 3920 that can further be connected to computer-readable storage media 3922. Together and, optionally, in combination with system memory 3910, computer-readable storage media 3922 may comprehensively represent remote, local, fixed, and/or removable storage devices plus storage media for temporarily and/or more permanently containing, storing, transmitting, and retrieving computer-readable information.

Computer-readable storage media 3922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 3900.

By way of example, computer-readable storage media 3922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 3922 may include, but is not limited to, Zip® drives, flash memory cards, universal serial bus (USB) flash drives, secure digital (SD) cards, DVD disks, digital video tape, and the like. Computer-readable storage media 3922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3900.

Communications subsystem 3924 provides an interface to other computer systems and networks. Communications subsystem 3924 serves as an interface for receiving data from and transmitting data to other systems from computer system 3900. For example, communications subsystem 3924 may enable computer system 3900 to connect to one or more devices via the Internet. In some embodiments communications subsystem 3924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 3924 can provide wired network connectivity (e.g., Ethernet) in addition to or instead of a wireless interface.

In some embodiments, communications subsystem 3924 may also receive input communication in the form of structured and/or unstructured data feeds 3926, event streams 3928, event updates 3930, and the like on behalf of one or more users who may use computer system 3900.

By way of example, communications subsystem 3924 may be configured to receive data feeds 3926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 3924 may also be configured to receive data in the form of continuous data streams, which may include event streams 3928 of real-time events and/or event updates 3930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3924 may also be configured to output the structured and/or unstructured data feeds 3926, event streams 3928, event updates 3930, and the like to one or more databases that may be in communication with one or more streaming data source computers coupled to computer system 3900.

Computer system 3900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
   causing a virtual environment to be displayed on a display of a virtual-reality headset in a real-world environment;
   receiving first inputs from a selection device to use one or more virtual cameras in the virtual environment;
   capturing a plurality of images from the one or more virtual cameras in the virtual environment;
   displaying the plurality of images on a virtual storyboard display in the virtual environment;
   receiving second inputs from the selection device to select or reorder the plurality of the images on the virtual storyboard display in the virtual environment such that the plurality of images on the virtual storyboard define a scene that is based on the virtual environment; and
   generating a video sequence based on the plurality of images.

2. The method of claim 1, wherein the one or more virtual cameras comprise a plurality of virtual cameras at different locations in the virtual environment.

3. The method of claim 2, wherein each of the plurality of virtual cameras are different from virtual cameras that capture a view displayed on the virtual-reality headset.

4. The method of claim 1, further comprising adding a virtual screen as a rendered object in the virtual environment.

5. The method of claim 4, wherein the virtual screen displays a view captured from the one or more virtual cameras in real-time.

6. The method of claim 4, wherein the virtual screen displays a static image that is loaded from outside of the virtual environment.

7. The method of claim 4, wherein the virtual screen displays a video sequence that is loaded from outside of the virtual environment.

8. A system comprising:
   one or more processors; and
   one or more memories comprising instructions that, when executed by the one or more processors, cause the one or more processors to perform operations comprising:
   causing a virtual environment to be displayed on a display of a virtual-reality headset in a real-world environment;
   receiving first inputs from a selection device to use one or more virtual cameras in the virtual environment;
   capturing a plurality of images from the one or more virtual cameras in the virtual environment;
   displaying the plurality of images on a virtual storyboard display in the virtual environment;
   receiving second inputs from the selection device to select or reorder the plurality of the images on the virtual storyboard display in the virtual environment such that the plurality of images on the virtual storyboard define a scene that is based on the virtual environment; and
   generating a video sequence based on the plurality of images.

9. The system of claim 8, wherein the inputs to use the one or more virtual cameras in the virtual environment comprise inputs that cause change a focal length of at least one of the one or more virtual cameras.

10. The system of claim 8, wherein at least one of the one or more virtual cameras is displayed in the virtual environment as a screen that plays a view captured by the at least one of the one or more virtual cameras.

11. The system of claim 8, wherein the virtual environment is a model of a real-world set.

12. The system of claim 11, wherein the virtual environment is generated by scanning the real-world set.

13. The system of claim 11, wherein generating the video sequence based on the plurality of images comprises filming a scene in the real-world set.

14. The system of claim 8, wherein generating the video sequence based on the plurality of images comprises rendering a scene from the virtual environment.

15. The system of claim 8, wherein the operations further comprise receiving an input that adjusts a sunlight source in the virtual environment.

16. The system of claim 15, wherein adjusting the sunlight source comprises adjusting a position of the sunlight source in a sky of the virtual environment.

17. A non-transitory computer-readable medium comprising instructions that, when executed by one or more processors, cause the one or more processors to perform operations comprising:
   causing a virtual environment to be displayed on a display of a virtual-reality headset in a real-world environment;
   receiving first inputs from a selection device to use one or more virtual cameras in the virtual environment;
   capturing a plurality of images from the one or more virtual cameras in the virtual environment;
   displaying the plurality of images on a virtual storyboard display in the virtual environment;
   receiving second inputs from the selection device to select or reorder the plurality of the images on the virtual storyboard display in the virtual environment such that the plurality of images on the virtual storyboard define a scene that is based on the virtual environment; and
   generating a video sequence based on the plurality of images.

18. The non-transitory computer-readable medium of claim 17,
   wherein the one or more virtual cameras comprise a plurality of virtual cameras at different locations in the virtual environment, and wherein each of the plurality of virtual cameras are different from virtual cameras that capture a view displayed on the virtual-reality headset.

19. The non-transitory computer-readable medium of claim 17, wherein the operations further comprise adding a virtual screen as a rendered object in the virtual environment, wherein the virtual screen displays a view captured from the one or more virtual cameras in real-time.

20. The non-transitory computer-readable medium of claim 17, wherein at least one of the one or more virtual cameras is displayed in the virtual environment as a screen that plays a view captured by the at least one of the one or more virtual cameras.

* * * * *